(12) United States Patent
Shoji et al.

(10) Patent No.: US 9,739,895 B2
(45) Date of Patent: Aug. 22, 2017

(54) DEPOSITION SUBSTRATE AND SCINTILLATOR PANEL

(71) Applicant: Konica Minolta, Inc., Tokyo (JP)

(72) Inventors: Takehiko Shoji, Tokyo (JP); Kiyoshi Hagiwara, Tokyo (JP); Tadashi Arimoto, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/088,562

(22) Filed: Apr. 1, 2016

(65) Prior Publication Data

US 2016/0216383 A1 Jul. 28, 2016

Related U.S. Application Data

(63) Continuation of application No. 14/183,854, filed on Feb. 19, 2014, now Pat. No. 9,329,281.

(30) Foreign Application Priority Data

Feb. 28, 2013 (JP) .................................. 2013-38773

(51) Int. Cl.
*G01T 1/20* (2006.01)
*G02B 5/02* (2006.01)
(Continued)

(52) U.S. Cl.
CPC ............ *G01T 1/2002* (2013.01); *G01T 1/202* (2013.01); *G01T 1/2023* (2013.01); *G02B 1/14* (2015.01); *G02B 5/0221* (2013.01); *G02B 5/0242* (2013.01); *G02B 5/0263* (2013.01); *G02B 5/0278* (2013.01); *G02B 5/0284* (2013.01); *G21K 4/00* (2013.01)

(58) Field of Classification Search
CPC ..... G01T 1/2002; G01T 1/202; G01T 1/2023; G02B 1/14; G02B 5/0221; G02B 5/0242; G02B 5/0263; G02B 5/0278; G02B 5/0284; G21K 4/00
See application file for complete search history.

(56) References Cited

U.S. PATENT DOCUMENTS

| 3,135,762 A | 6/1964 | Maeder et al. |
| 3,352,681 A | 11/1967 | Ohi et al. |

(Continued)

FOREIGN PATENT DOCUMENTS

| GB | 786234 A | 11/1955 |
| JP | 57-35855 A | 2/1982 |

(Continued)

OTHER PUBLICATIONS

J. Rowlands, et al; Amorphous semiconductor usher in digital x-ray imaging; Physics Today; Nov. 1997; pp. 23-30.

(Continued)

*Primary Examiner* — Mark R Gaworecki
(74) *Attorney, Agent, or Firm* — Lucas & Mercanti, LLP

(57) ABSTRACT

The scintillator panel includes a support, a reflective layer on the support, and a scintillator layer formed on the reflective layer by deposition. The reflective layer includes light-scattering particles and a binder resin. The light scattering particles are buried in the binder resin such that there is an area free of light scattering particles in the reflective layer.

13 Claims, 7 Drawing Sheets

(51) Int. Cl.
*G21K 4/00* (2006.01)
*G01T 1/202* (2006.01)
*G02B 1/14* (2015.01)

(56) References Cited

U.S. PATENT DOCUMENTS

| | | |
|---|---|---|
| 3,533,794 A | 10/1970 | Ohi et al. |
| 4,789,785 A | 12/1988 | Yamazaki et al. |
| 5,276,328 A | 1/1994 | Yoshida et al. |
| 2012/0181436 A1 | 7/2012 | Mollov |

FOREIGN PATENT DOCUMENTS

| | | |
|---|---|---|
| JP | 62-025753 A | 2/1987 |
| JP | 62-103635 A | 5/1987 |
| JP | 62-260152 A | 11/1987 |
| JP | 1-240887 A | 9/1989 |
| JP | 5-312961 A | 11/1993 |
| JP | 6-331749 A | 12/1994 |
| JP | 7-21560 B2 | 3/1995 |
| JP | 09-050093 A | 2/1997 |
| JP | 52-035625 | 3/1997 |
| JP | 2000356679 A | 12/2000 |
| JP | 2005283299 A | 12/2000 |
| JP | 200159899 A | 3/2001 |
| JP | 2002116258 A | 4/2002 |
| JP | 3566926 B2 | 6/2004 |
| JP | 3126715 B2 | 3/2006 |
| JP | 2006-226912 A | 8/2006 |
| JP | 2006335887 A | 12/2006 |
| JP | 2008209124 A * | 9/2008 |

OTHER PUBLICATIONS

L. E. Antonuk, et al; Development of a high-resolution active-matrix flat-panel imager with enhanced fill factor; SPIE; 1997; pp. 1-13.
Notification of Reasons for Refusal dated Jan. 24, 2017 from corresponding Japanese Patent Application No. JP 2016-086912 English translation of Notification of Reasons for Refusal; Total of 5 pages.
Notification of Reason for Refusal dated Jun. 20, 2017 from corresponding Japanese Patent Application No. JP 2016-086912 and English translation; Total of 5 pages.

* cited by examiner

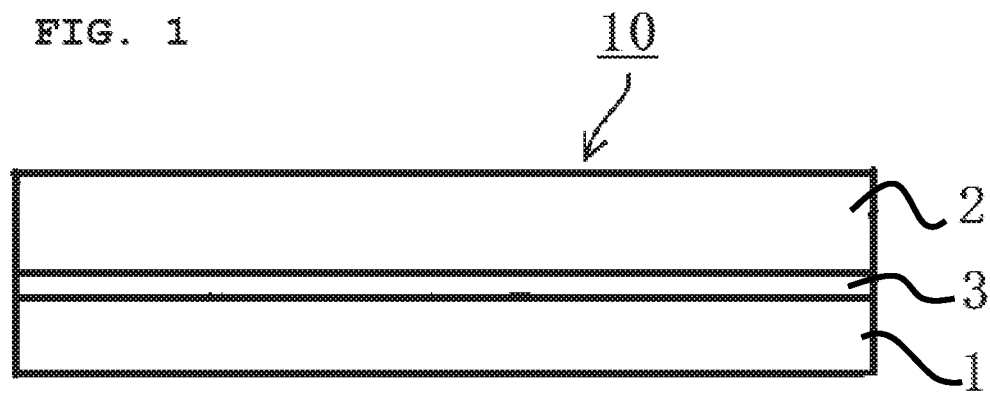
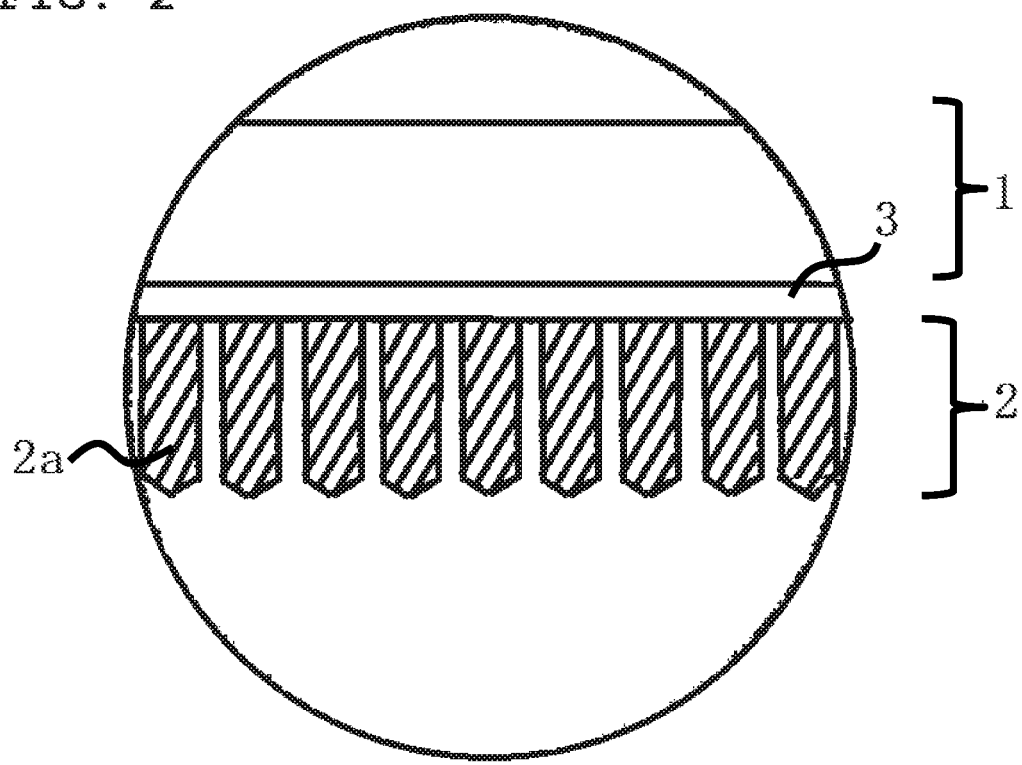

FIG. 7
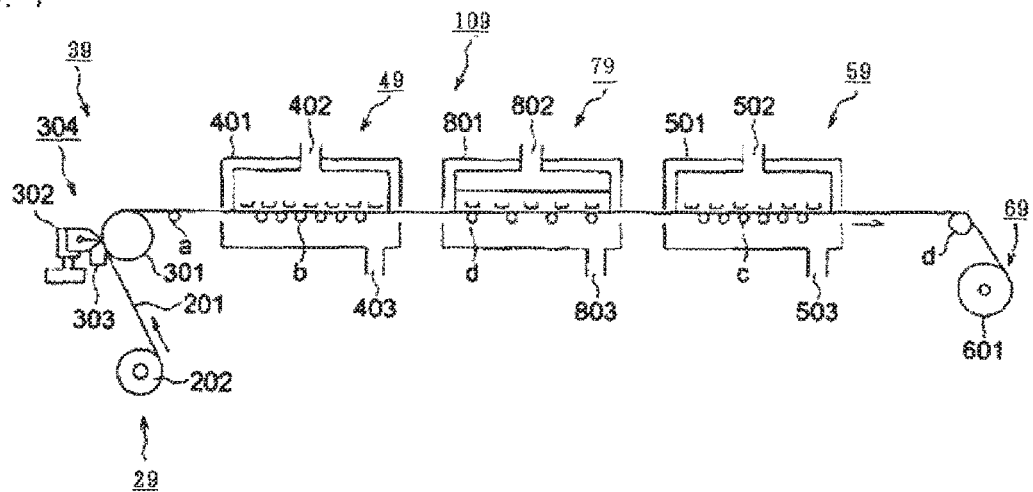
FIG. 8A
FIG. 8B
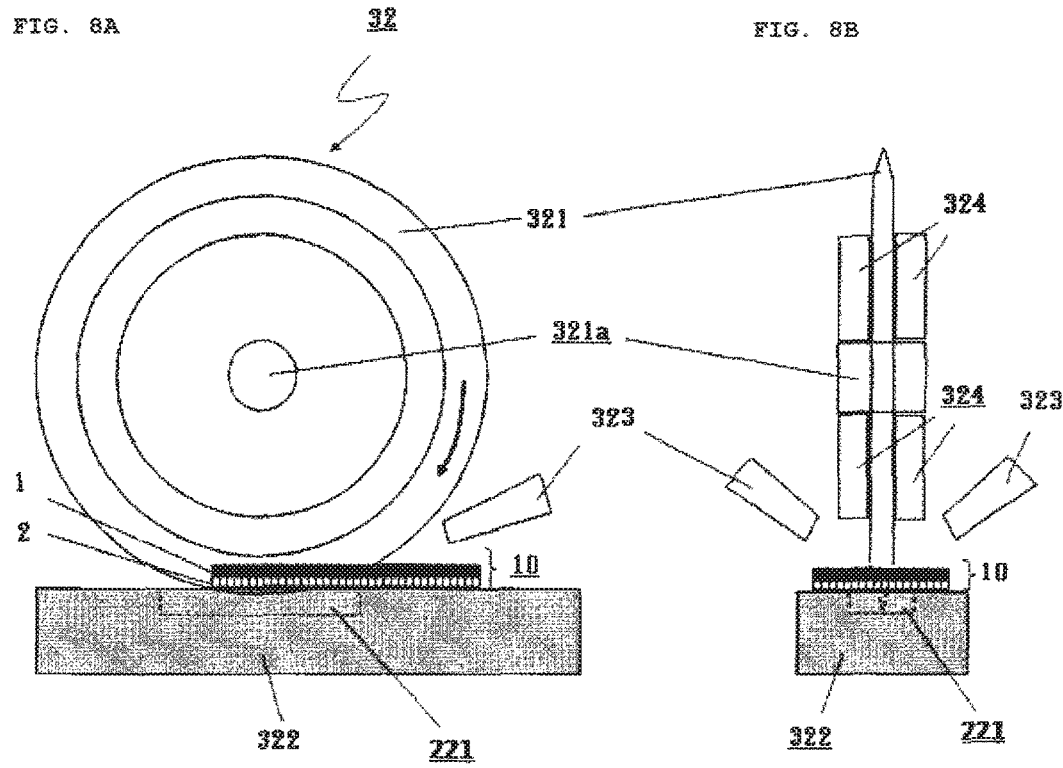

DEPOSITION SUBSTRATE AND SCINTILLATOR PANEL

CROSS REFERENCE TO RELATED APPLICATION

This is a continuation of U.S. patent application Ser. No. 14/183,854 filed Feb. 19, 2014, which claimed the priority under the Paris Convention of Japanese Patent Application No. 2013-38773 filed on Feb. 28, 2013, the entirety of both applications are incorporated herein by reference.

BACKGROUND OF THE INVENTION

1. Field of the Invention

The present invention relates to deposition substrates and to scintillator panels used in the formation of radiographic images of subjects.

2. Description of the Related Art

Radiographic images such as X-ray images have been widely used in medical diagnosis of disease conditions. In particular, radiographic images based on intensifying screen-film combinations have undergone enhancements in terms of sensitivity and image quality during a long history and consequently remain in use in the medical field worldwide as the imaging system with high reliability and excellent cost performance. However, this image information is analogue and thus cannot be processed freely or transmitted instantaneously in contrast to digital image information which has been developed currently.

Recently, digital radiographic image detectors such as computed radiography (CR) systems and flat panel detectors (FPDs) have come in use. These radiographic image detectors directly give digital radiographic images and allow the images to be directly displayed on displays such as cathode ray tube panels and liquid crystal panels. Thus, there is no need for the images to be created on photographic films. Consequently, the digital X-ray image detectors have decreased a need for the image formation by silver halide photography and have significantly enhanced diagnostic convenience at hospitals and clinics.

The computed radiography (CR) is one of the digital X-ray image techniques currently used in medical practice. However, CR X-ray images are less sharp and are insufficient in spatial resolution as compared to screen film system images such as by silver halide photography, and the level of their image quality compares unfavorably to the quality level of screen film system images. Thus, new digital X-ray image techniques, for example, flat panel detectors (FPDs) involving a thin film transistor (TFT) have been developed (see, for example, Non Patent Literatures 1 and 2).

In principle, a FPD converts X-rays into visible light. For this purpose, a scintillator panel is used which has a scintillator layer made of an X-ray phosphor that, when illuminated with X-rays, convert the radiations into visible light that is emitted. In X-ray photography using a low-dose X-ray source, it is necessary to use a scintillator panel with high luminous efficiency (X-ray to visible light conversion) in order to enhance the ratio (the SN ratio) of signal to noise detected from the scintillator panel. In general, the luminous efficiency of scintillator panels is determined by the thickness of the scintillator layer (the phosphor layer) and the X-ray absorption coefficient of the phosphor. The light produced in the phosphor layer upon illumination with X-rays is scattered more markedly in the scintillator layer with increasing thickness of the phosphor layer, and consequently the sharpness of X-ray images obtained via the scintillator panel is lowered. Thus, setting of the sharpness required for the quality of X-ray images automatically determines the critical thickness of the phosphor layer in the scintillator panel.

On the other hand, some kinds of phosphors permit the critical thickness of phosphor layers in scintillator panels to be increased. Cesium iodide (CsI) is a phosphor that has a relatively high X-rays to visible light conversion ratio and is easily deposited to form a columnar phosphor crystal layer which can suppress the scattering of light in the phosphor crystals (namely, in the scintillator layer) by light guide effects. Thus, the thickness of the phosphor layer can be increased corresponding to the amount of suppressed scattering.

Because the luminous efficiency obtained with CsI alone is low, however, an approach to increasing the visible light conversion efficiency of the scintillator layers is generally adopted. For example, (1) CsI crystals and a sodium compound activator, (2) CsI crystals and a thallium compound activator, or (3) CsI crystals and an indium compound activator are deposited onto substrates to form scintillator layers, and the scintillator layers are annealed in the subsequent step.

Other approaches which have been proposed to increase the optical output of scintillator panels include a method in which scintillator layers are formed on reflective substrates (see, for example, Patent Literature 1), a method in which reflective layers are provided on substrates by depositing metal films (see, for example, Patent Literature 2), and a method in which reflective thin metal films are provided on substrates and coated with transparent organic films, and scintillator layers are formed on the transparent organic films (see, for example, Patent Literature 3). Although scintillator panels obtained by these methods achieve an increase in optical output, the light produced in the scintillator layer is scattered at the interface between the reflective layer and the scintillator layer, with the result that the X-ray image data obtained via the scintillator panels are disturbed and the sharpness of the obtainable X-ray images is markedly deteriorated.

Meanwhile, methods are proposed in which X-ray image detectors are manufactured by arranging scintillator panels on the surface of planar light-receiving elements (see, for example, Patent Literatures 4 and 5). However, the productivity of such detectors is low because of the need that the scintillator panels have to be produced in different sizes in accordance with various sizes of the planar light-receiving elements. Further, such an approach does not solve the aforementioned problem that the sharpness of X-ray images is deteriorated by the scattering of light at the interface between the reflective layer and the scintillator layer.

In the conventional production of scintillator panels by a gas-phase method, it is a general practice to form a scintillator layer on a rigid substrate made of such a material as aluminum or amorphous carbon, and cover the entire surface of the scintillator with a protective film (see, for example, Patent Literature 6). However, such scintillator panels having a scintillator layer on an inflexible and rigid substrate cause a difficulty in obtaining a uniform contact between the scintillator panel and a planar light-receiving element when they are bonded to each other. In detail, such a scintillator panel has irregularities ascribed to the unevenness of the substrate itself as well as to different heights of the columnar phosphor crystals in the scintillator layer, and the inflexible substrate significantly reflects the influence of such irregularities (a flexible substrate may cancel the irregularities by deformation) to make it difficult for the scintillator panel to be tightly and uniformly attached to a planar light-receiving element. To solve this problem, methods are proposed in which a spacer is used at the plane of contact between the scintillator panel and a planar light-receiving element (see, for example, Patent Literatures 4 and 5). However, this approach, which prioritizes the solution of problematic attachment between the scintillator panel and a planar light-receiving element over productivity, has a problem in that because the scintillator panel and the planar light-receiving element are spaced apart by a gap, the light produced in the scintillator layer of the scintillator panel is scattered in the gap to inevitably deteriorate the sharpness of the obtainable X-ray images. This problem has become more serious with the recent enlargement of flat panel detectors.

In order to solve the problems of loose attachment between scintillator panels and planar light-receiving elements as well as the problems associated with the use of spacers, methods have been generally adopted in which a scintillator layer is directly formed on an imaging element by deposition or in which a less sharp but flexible material such as a medical intensifying screen is used instead of a scintillator panel. Further, a method has been adopted in which a flexible protective layer made of such a material as a polyparaxylylene is used to protect layers such as scintillator layers in scintillator panels (see, for example, Patent Literature 7).

However, the substrates used in the above method are rigid materials such as aluminum and amorphous carbon. Even if the protective layer is formed with a thickness of about 10 µm on the scintillator layer or the substrate, the surface of the protective layer will show irregularities ascribed to the unevenness of the substrate itself as well as to different heights of the columnar phosphor crystals in the scintillator layer. Thus, even the adoption of such protective layers with the above thickness does not eliminate the influences of the irregularities on the substrates or the scintillator layers, and it remains difficult to achieve a uniform and close contact between the surface of the scintillator panel and the surface of a planar light-receiving element. On the other hand, increasing the thickness of the flexible protective layer increases the gap between the scintillator panel and a planar light-receiving element, resulting in a deterioration of the sharpness of the obtainable X-ray images.

Under such circumstances, there has been a demand for the development of radiographic flat panel detectors that have excellent luminous efficiency of scintillator panels and have small deteriorations in the sharpness of X-ray images due to factors such as the size of the gap between the scintillator panel and a planar light-receiving element.

Patent Literature 8 discloses a scintillator panel which includes a reflective layer on a substrate and a scintillator layer formed on the top by deposition, the reflective layer including a white pigment and a binder resin. Patent Literature 8 also discloses that because the reflective layer is formed of a white pigment and a binder resin, the scintillator panel exhibits high light-emitting efficiency and consequently sharp X-ray images are obtained. This scintillator panel can solve the aforementioned problem. That is, even when this scintillator panel is used in combination with a planar light-receiving element, the sharpness of X-ray images is negligibly decreased by factors such as the scattering of the emitted light at the interface between the scintillator panel and the planar light-receiving element.

However, the scintillator panels disclosed in Patent Literature 8 still have many problems to be solved such as that the sharpness of X-ray images obtained in the plane of the scintillator panel is nonuniform and that the scintillator panels are poor in cuttability.

CITATION LIST

Patent Literature

[Patent Literature 1] JP-B-H07-21560
[Patent Literature 2] JP-A-H01-240887
[Patent Literature 3] JP-A-2000-356679
[Patent Literature 4] JP-A-H05-312961
[Patent Literature 5] JP-A-H06-331749
[Patent Literature 6] Japanese Patent No. 3566926
[Patent Literature 7] JP-A-2002-116258
[Patent Literature 8] JP-A-2008-209124

Non Patent Literature

[Non Patent Literature 1] John Rowlands, "Amorphous Semiconductor Usher in Digital X-ray Imaging", Physics Today, November issue, 24 (1997)
[Non Patent Literature 2] L. E. Antonuk, "Development of a High-Resolution Active-Matrix Flat-Panel Imager with Enhanced Fill Factor", SPIE, 32, 2 (1997)

SUMMARY OF THE INVENTION

The scintillator panels proposed in the art which have a scintillator layer on a conventional deposition substrate have drawbacks in that the scintillator panels are unsatisfactory in terms of cuttability and the amount of emitted light, that the X-ray images obtained with the scintillator panels are poor in sharpness, and that the sharpness in the entirety of an X-ray image is not uniform (the sharpness differs from point to point in the X-ray image). That is, the scintillator panels which have a scintillator layer on a conventional deposition substrate are disadvantageously cracked when they are cut, and are also problematic in that the obtainable X-ray images have poor and nonuniform sharpness.

The present invention is aimed at solving the above problems. In more detail, an object of the invention is to provide a scintillator panel which exhibits excellent cuttability and can be cut without the occurrence of fractures such as cracks, which can give sharp and uniform (the sharpness does not vary in the image) radiographic images such as X-ray images, and which realizes, for example, a flat panel detector having uniform image quality characteristics in the light-receiving plane. Another object of the invention is to provide a deposition substrate that allows for the manufacturing of such scintillator panels.

The present inventors carried out extensive studies in order to solve the aforementioned problems. As a result, the present inventors have found that a scintillator panel in which a scintillator layer comprised of columnar phosphor crystals is disposed on a deposition substrate exhibits poor cuttability (fractures such as cracks occur during cutting) and the sharpness of radiographic images obtained via the scintillator panel as well as the uniformity of the sharpness in the plane of the scintillator panel are deteriorated when the crystal columns have a diameter in excess of 5.0 µm at the plane of contact between the deposition substrate and the scintillator layer.

The reason why the above scintillator panel is problematic is probably that abnormal growth of columnar phosphor crystals has taken place during the process in which a phosphor is deposited and grown to the columnar crystals (columnar phosphor crystals) (and the abnormally grown columnar phosphor crystals have come to be present in the total of the columnar crystals in such an amount that the above properties are deteriorated).

Here, the term "abnormal growth" means that a phosphor is deposited and grown to columnar crystals while the crystals grow locally with a different rate of change of column diameter and in a different direction (inclination) from the normal portions. For example, the occurrence of abnormal growth results in the formation of crystal defects or the formation of a nonuniform crystal structure as a result of the columnar crystals growing not only in the perpendicular direction to the reflective layer but also in oblique directions.

When such a scintillator panel which has a scintillator layer (a phosphor layer) containing abnormally grown crystal portions is subjected to cutting, fragile portions such as crystal defect portions are collapsed or the obliquely grown columnar phosphor crystals are fractured as a result of being cut at an angle relative to the longitudinal direction of the columnar phosphor crystals, thus failing to maintain the normal and uniform crystal structure at such portions. This is probably how poor cuttability is exhibited. (As will be described later, the cuttability of scintillator panels is evaluated based on the presence or absence of image defects in radiographic images obtained via the scintillator panels having been cut. The presence of image defects is understood to indicate that cracks have occurred.)

Further, the above scintillator panel, when illuminated with radiations such as X-rays on the scintillator layer, exhibits nonuniform emission of light as a whole due to the different states of light emitted from the normal crystal portions (the portions providing excellent sharpness) and the abnormally grown crystal portions (the portions providing poor sharpness). This is probably the reason why the radiographic images obtained via the above scintillator panels have low and nonuniform sharpness.

In addition, the abnormally grown crystal portions in the above scintillator panel have formed respective random structures and consequently differences in height from the reflective layer are produced not only between the normal crystal portions and the abnormally grown crystal portions but also among the abnormally grown crystal portions. As a result, the surface of the scintillator layer shows irregularities. Even if a film such as a protective layer made of a specific resin is provided on the surface of such a scintillator layer of the scintillator panel, the film cannot cancel the irregularities on the surface of the scintillator layer and fails to establish a uniform contact between the surface of the film and the surface of a planar light-receiving element, probably resulting in optical nonuniformity at the plane of contact. Further, this fact too probably affects the sharpness and the uniformity thereof in the obtainable radiographic images. That is, portions poor in interlayer adherability serve as starting points of cracks when scintillator panels are cut, and the cracks appear as image defects (or defective images). Even if the occurrence of cracks is avoided, the presence of nonuniformity in interlayer adherability disadvantageously causes the light produced in the scintillator layer to be scattered in the portions poor in interlayer adherability. As a result, it is considered that the emission of light becomes nonuniform between these portions having different strengths of interlayer adherability, and consequently the obtainable radiographic images show poor and nonuniform sharpness.

The present inventors have found that the surface state of a layer on which a phosphor will be deposited (hereinafter, the surface on which a scintillator layer will be formed will be also referred to as "scintillator layer formation scheduled surface") is responsible for the formation by deposition of columnar phosphor crystals with a column diameter exceeding 5.0 µm. During further studies, the present inventors have assumed the following: When a scintillator layer including a phosphor such as CsI is formed by deposition on a reflective layer including light-scattering particles and a binder resin, columnar crystals of the phosphor start to grow from the seed crystals into the columnar crystals with a specific column diameter. During this phosphor deposition process, irregularities with a specific size present on the scintillator layer formation scheduled surface not only serve as the base for crystal growth but also probably cause the seed crystals to grow to a column diameter exceeding 5.0 µm at the plane of contact between the deposition substrate and the scintillator layer.

In view of the above assumption, the present inventors carried out further studies and consequently have found that the problems can be solved by the following approach. That is, because such specific irregularities cause the phosphor crystals to grow to a column diameter exceeding 5.0 µm, the removal of such irregularities from the scintillator layer formation scheduled surface of the reflective layer will suppress the formation of columnar phosphor crystals with a column diameter exceeding 5.0 µm on the scintillator layer formation scheduled surface. Consequently, it will become possible to provide scintillator deposition substrates and scintillator panels which can give radiographic images excellent in sharpness and uniformity of sharpness and also exhibit excellent cuttability. In detail, the present inventors have found the following.

(1) First, the present inventors have found that in a deposition substrate having a support and a reflective layer disposed on the support, the deposition of a phosphor into a scintillator layer suffers abnormal growth and results in a scintillator layer including columnar phosphor crystals with a column diameter exceeding 5.0 µm at the plane of contact with the reflective layer if the scintillator layer formation scheduled surface of the reflective layer has large irregularities (larger than "small irregularities" described later) that do not become softened at a temperature experienced during deposition (for example, the substrate heating temperature or the temperature of the phosphor or the activator which has been volatilized).

It has been further found that even if large irregularities are present on the scintillator layer formation scheduled surface of the reflective layer, the abnormal growth of columnar phosphor crystals is substantially suppressed and there will be formed no columnar phosphor crystals with a column diameter exceeding 5.0 µm at the plane of contact with the surface of the reflective layer by configuring the reflective layer such that a specific region of the reflective layer extending from the scintillator layer formation scheduled surface to a depth toward the support is formed of a resin that becomes softened by heat, and also such that the region is allowed to contain no light-scattering particles by, for example, burying the light-scattering particles deep into the binder resin. This configuration allows the large irregularities to disappear by being softened when heated during the deposition. (The phrase that the abnormal growth of columnar phosphor crystals is substantially suppressed indicates that abnormally grown columnar phosphor crystals are absent or are present only in such a content that the objects of the invention are not deteriorated.)

The present inventors have also found that the region of the reflective layer free from light-scattering particles is appropriately present when the scintillator layer is formed on the reflective layer. That is, a deposition substrate may be directly subjected to deposition when the light-scattering particles are buried in the binder resin. In the case where the reflective layer has large irregularities that are not softened by heat during deposition, such a deposition substrate may be subjected to deposition after a region free from light-scattering particles is formed by, for example, stacking on the reflective layer a resin layer that includes a binder resin and is free from light-scattering particles.

It has been further found that the deposition substrate having a reflective layer which contains a specific region including a binder resin and free from light-scattering particles realizes the production of scintillator panels capable of giving sharp and uniform radiographic images as well as excellent cuttability irrespective of whether or not irregularities (of any sizes) are present on the scintillator layer formation scheduled surface and irrespective of the arithmetic average roughness of the scintillator layer formation scheduled surface described later.

According to the configuration in which the reflective layer includes a binder resin and light-scattering particles buried in the binder resin, large irregularities, if any, defined by the binder resin alone on the scintillator layer formation scheduled surface of the reflective layer are softened by heat applied during deposition and are flattened or reduced in size. Thus, it is considered that a scintillator layer can be formed by deposition on the reflective layer while no columnar phosphor crystals with a column diameter exceeding 5.0 µm are formed. With the inventive configuration, scintillator deposition substrates and scintillator panels excellent in terms of the aforementioned properties can be thus provided.

(2) Further, the present inventors have found the following. Even if the surface of the reflective layer has irregularities that do not become softened at the substrate heating temperature or the temperature of components such as the phosphor volatilized during deposition, the abnormal growth of columnar phosphor crystals will not substantially take place and no columnar phosphor crystals with a column diameter exceeding 5.0 µm will be formed by deposition as long as (2-1) the surface of the reflective layer that will be in contact with the columnar crystals grown on the reflective layer has sufficiently small irregularities, for example, small irregularities produced by the exposure of light-scattering particles with or finer than a specific average particle diameter from the reflective layer. It has been also found that the light-scattering particles with or finer than a specific average particle diameter are light-scattering particles having an area average particle diameter of 0.5 µm or less.

The reason why the columnar phosphor crystals with a column diameter exceeding 5.0 µm are not allowed to grow according to the above configuration is probably because the small irregularities on the scintillator layer formation scheduled surface of the reflective layer have so small projections that the columnar phosphor crystals cannot be grown to such a large diameter.

Further, the present inventors have found that even if the surface of the reflective layer has irregularities that do not become softened at the substrate heating temperature or the temperature of components such as the phosphor volatilized during deposition as well as even if the surface of the reflective layer has large and temperature-resistant irregularities such as those defined by the partial exposure of light-scattering particles having an area average particle diameter of more than 0.5 µm, the abnormal growth of columnar phosphor crystals will not substantially take place and no columnar phosphor crystals with a column diameter exceeding 5.0 µm will be formed by deposition as long as (2-2) the scintillator layer formation scheduled surface of the reflective layer has an arithmetic average roughness (Ra) of not more than 0.5 µm as measured in accordance with JIS B 0601-2001. According to the configuration in which the scintillator layer formation scheduled surface of the reflective layer has this arithmetic average roughness, there are no irregularities on the scintillator layer formation scheduled surface which are large enough for columnar crystals to be grown to a column diameter exceeding 5.0 µm. This is probably the reason why such a reflective layer suppresses the growth of columnar phosphor crystals with a column diameter exceeding 5.0 µm at the plane of contact with the reflective layer. (The state of irregularities on the scintillator layer formation scheduled surface of the reflective layer is probably substantially the same as the state of irregularities on the surface of the reflective layer of the deposition substrate discussed in (2-1) above.)

With use of the deposition substrates which include a support and a reflective layer disposed on the support and in which the reflective layer includes light-scattering particles and a binder resin, the present inventors have further found that the scintillator panels mentioned above may be produced with good efficiency by forming a scintillator layer on the reflective layer through the procedures described below in accordance with the conditions or states of the deposition substrates used.

(i) In the case where the deposition substrate is such that the light-scattering particles in the reflective layer are buried in the binder resin, the scintillator layer may be appropriately formed on the surface of the reflective layer.

(ii) In the case where the deposition substrate is such that the light-scattering particles in the reflective layer are not buried in the binder resin and the surface of the reflective layer has irregularities that do not become softened by heat during deposition:

(ii-1) the scintillator layer may be appropriately formed on the surface of the reflective layer after the deposition substrate is treated so as to satisfy the above requirement (i), for example, by providing on the reflective layer a resin layer including a binder resin and free from light-scattering particles.

(ii-2) Such a resin layer is not provided on the reflective layer, and other approaches are taken, for example:

(ii-2-1) Provided that the light-scattering particles on the scintillator layer formation scheduled surface of the reflective layer have an area average particle diameter of not more than 0.5 µm, the scintillator layer may be appropriately formed on the surface of the reflective layer.

(ii-2-2) Even if the light-scattering particles on the scintillator layer formation scheduled surface of the reflective layer have an area average particle diameter exceeding 0.5 µm, the scintillator layer may be appropriately formed on the surface of the reflective layer provided that the arithmetic average roughness of the reflective layer is not more than 0.5 µm. If the area average particle diameter exceeds 0.5 µm as well as the arithmetic average roughness of the reflective layer exceeds 0.5 µm, the scintillator layer may be appropriately formed on the surface of the reflective layer after the reflective layer is treated (for example, by calendering) such that its arithmetic average roughness is decreased to 0.5 µm or below.

The present inventors have furthermore found that even when available deposition substrates have a surface state of the reflective layer that would induce the abnormal growth of columnar phosphor crystals, the implementation of the above procedures makes it possible to provide scintillator deposition substrates and scintillator panels excellent in terms of the aforementioned performances.

Herein, the column diameter of the columnar phosphor crystals at the plane of contact with the reflective layer, or the diameter of columnar phosphor crystals at the interface between the scintillator layer and the reflective layer indicates the average circular equivalent diameter of phosphor crystals measured at a height of 10 μm from the reflective layer side toward the inside of the phosphor crystals, namely, from the plane of contact (the interface) between the scintillator layer and the reflective layer. The term "average circular equivalent diameter" means an average of the diameters of circles having the same areas as the cross sectional areas of the respective columnar phosphor crystals at the above height.

Herein, the uniformity in "interlayer adherability" means the uniformity of adhesion in the plane of contact between the scintillator layer formation scheduled surface and the scintillator layer. If the scintillator panel contains portions poor in interlayer adherability in the plane of contact, the phosphor layer is cracked or fractured at such portions during cutting (poor cuttability is encountered). Excellent uniformity in interlayer adherability in deposition substrates and scintillator panels is a requirement for the deposition substrates and the scintillator panels to exhibit excellent cuttability.

In order to solve the aforementioned problems, a first deposition substrate according to the present invention includes a support and a reflective layer disposed on the support, the reflective layer including light-scattering particles and a binder resin, the light-scattering particles being buried in the binder resin.

In the first deposition substrate of the present invention, it is preferable that the reflective layer include a region free from light-scattering particles extending from the surface of the reflective layer opposite to the surface in contact with the support toward the surface in contact with the support, and that the thickness of the region be 0.05 μm to 20 μm.

The first deposition substrate may further include a separate layer free from light-scattering particles on the surface of the reflective layer opposite to the surface in contact with the support.

In order to solve the aforementioned problems, a second deposition substrate according to the present invention includes a support and a reflective layer disposed on the support, the reflective layer including light-scattering particles and a binder resin, the light-scattering particles present in a region extending in a thickness of from 0 to 0.5 μm from the surface of the reflective layer opposite to the surface in contact with the support toward the surface in contact with the support having an area average particle diameter of not more than 0.5 μm.

In order to solve the aforementioned problems, a third deposition substrate according to the present invention includes a support and a reflective layer disposed on the support, the reflective layer including light-scattering particles and a binder resin, the surface of the reflective layer opposite to the surface in contact with the support having an arithmetic average roughness (Ra) of not more than 0.5 μm as measured in accordance with JIS B 0601-2001.

In the first to third deposition substrates of the invention (hereinafter, also referred to collectively as "deposition substrate(s)"), it is preferable that the light-scattering particles include at least one selected from alumina, yttrium oxide, zirconium oxide, titanium dioxide, barium sulfate, silica, zinc oxide, calcium carbonate, glasses and resins.

In the first to third deposition substrates of the invention, it is preferable that the light-scattering particles include at least one type of particles selected from hollow particles having a hollow portion within the particle, and porous particles.

In the first to third deposition substrates of the invention, it is more preferable that the light-scattering particles include at least titanium dioxide.

A scintillator panel according to the present invention includes the deposition substrate and a scintillator layer formed on the deposition substrate by deposition, the scintillator layer including cesium iodide and at least one activator selected from at least thallium compounds, sodium compounds and indium compounds, the scintillator layer having a columnar crystal structure.

In the scintillator panel of the invention, it is preferable that the entire surface of the scintillator layer and a portion of the reflective layer be covered with a continuous protective film.

In the scintillator panel of the invention, it is preferable that the protective film be a protective film formed by a gas-phase method and include at least one selected from at least polyparaxylylene, polyurea and silicon dioxide ($SiO_2$).

According to the deposition substrates of the invention, scintillator panels are provided which are excellent in cuttability as well as in the sharpness and the uniformity of sharpness of radiographic images such as X-ray images.

The scintillator panels of the present invention exhibit excellent cuttability and realize excellent sharpness and excellent uniformity of sharpness in radiographic images such as X-ray images. Due to these excellent characteristics, the scintillator panels of the invention may be coupled to planar light-receiving elements to provide flat panel detectors which have a uniform image quality in the light-receiving plane and a high luminous efficiency in the scintillator layer and which have negligible deteriorations in image characteristics (such as sharpness of the obtainable radiographic images) at the plane of contact between the scintillator layer and the planar light-receiving element.

Further, the scintillator panels of the invention are excellent in sensitivity and X-ray durability.

BRIEF DESCRIPTION OF THE DRAWINGS

FIG. 1 is a schematic sectional view illustrating a configuration of a radiographic scintillator panel 10 as an example of scintillator panels.

FIG. 2 is an enlarged sectional view of the radiographic scintillator panel 10.

FIG. 7 is a schematic view illustrating a typical example of methods for producing the deposition substrates of the invention.

FIGS. 8A and 8B are schematic views illustrating a typical example of methods used in a scintillator panel cutting step.

DESCRIPTION OF THE PREFERRED EMBODIMENTS

Figure 3:
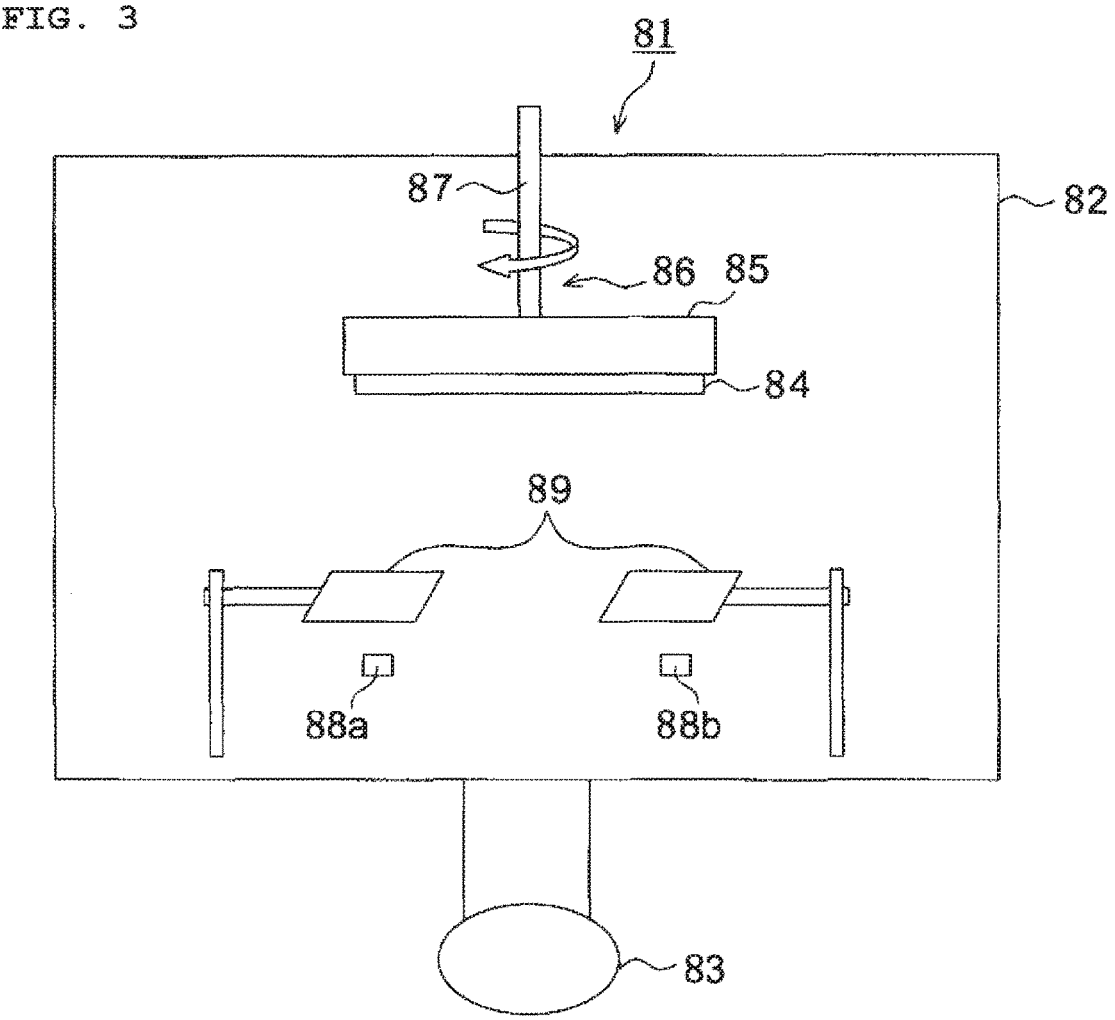
FIG. 3 is a schematic view illustrating a configuration of a deposition apparatus 81 as an example of deposition apparatuses.

Hereinbelow, deposition substrates and scintillator panels according to the present invention will be described in detail. The scope of the invention is not limited to the embodiments described below, and various modifications are possible without departing from the scope of the invention.

The deposition substrates of the invention include a support and a specific reflective layer disposed on the support.

The scintillator panels of the invention include the support, the reflective layer, and a scintillator layer formed by deposition.

Hereinbelow, configurations of the invention will be described.

The term "phosphors (scintillators)" in the invention refers to fluorescent materials that absorb energy of incident invisible radiations (the wave length is usually 10 nm or less) such as X-rays and γ-rays and emit electromagnetic waves having wavelengths of 300 nm to 800 nm, namely, electromagnetic waves (lights) mainly in the visible light region from ultraviolet light to infrared light.

1. Deposition Substrates (1) A first deposition substrate according to the present invention includes a support and a reflective layer disposed on the support. The reflective layer includes light-scattering particles and a binder resin. The light-scattering particles are buried in the binder resin.

(2) A second deposition substrate according to the present invention includes a support and a reflective layer disposed on the support. The reflective layer includes light-scattering particles and a binder resin. The light-scattering particles present in a region extending in a thickness of from 0 to 0.5 μm from the surface of the reflective layer opposite to the surface in contact with the support toward the surface in contact with the support have an area average particle diameter of not more than 0.5 μm.

(3) A third deposition substrate according to the present invention includes a support and a reflective layer disposed on the support. The reflective layer includes light-scattering particles and a binder resin. The surface of the reflective layer opposite to the surface in contact with the support has an arithmetic average roughness (Ra) of not more than 0.5 μm as measured in accordance with JIS B0601-2001.

Herein, the term "area average particle diameter" refers to a diameter obtained by dividing by the number of particles the sum of diameters of circles having the same areas as the projected areas of the particles. In the invention, the area average particle diameter is calculated by a flow process, in which the particles are dispersed homogeneously in a dispersion medium, the obtained dispersion is passed through a flow cell while applying light from a light source to the flow cell to record the projected images of the particles passing through the flow cell with a high-sensitivity CCD camera, and the area average particle diameter of the particles is calculated with an analytical PC. Any of various commercial flow process meters may be used.

Herein, the arithmetic average roughness (Ra) is measured with SURFCOM 1400D manufactured by TOKYO SEIMITSU CO., LTD. (cutoff: 0.08 mm, measurement length: 4.0 mm).

Hereinbelow, constituents such as layers and elements will be described.

1-1. Reflective Layers

In the first to third deposition substrates of the invention, a reflective layer is disposed on a support and includes light-scattering particles and a binder resin.

In the first to third deposition substrates of the invention, the support and the reflective layer may be each comprised of a single layer, or two or more layers.

The thickness of the reflective layer may be selected appropriately in accordance with desired reflectance. In order for the deposition substrates and scintillator panels produced therewith to achieve excellent cuttability as well as from the viewpoint of the adhesion between the surface of the scintillator panel and the surface of a light-receiving element, the thickness of the reflective layer is usually 5 to 300 μm, and preferably 30 to 150 μm.

The thickness of the entirety of the deposition substrate is preferably 100 to 1000 μm.

Figure 6:
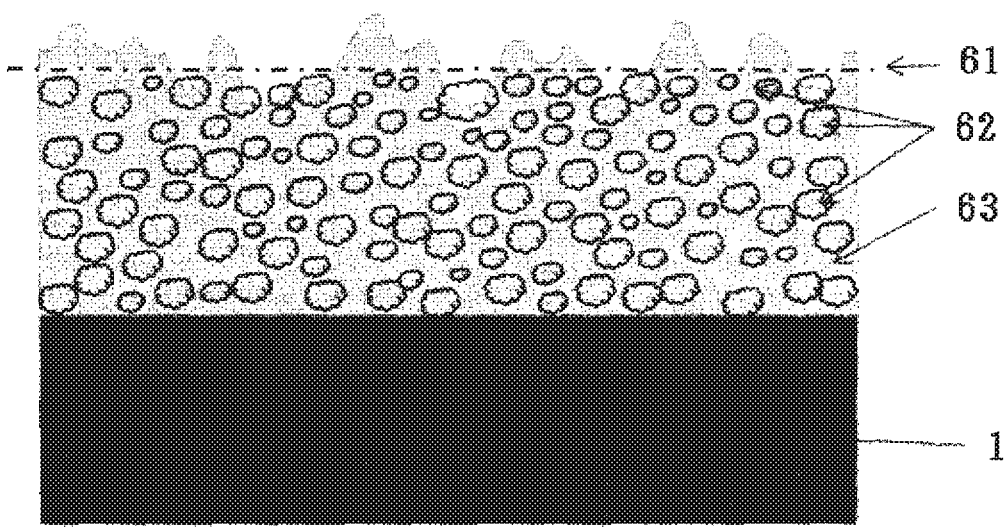
FIG. 6 is a sectional view illustrating an example of deposition substrates of the invention, wherein there are shown materials and a middle line (JIS B 0601-2001) at half the height of surface roughness on a scintillator layer formation scheduled surface of a reflective layer (the surface of the reflective layer opposite to the surface in contact with a support).

In the first deposition substrate of the invention, the light-scattering particles are buried in the binder resin. Here, the phrase "the light-scattering particles are buried in the binder resin" indicates that the light-scattering particles are below (on the support side) the middle line (JIS B 0601-2001) at half the height of surface roughness on a scintillator layer formation scheduled surface (the surface opposite to the surface in contact with the support) of the reflective layer (see FIG. 6).

In the first deposition substrate of the invention, a portion of the reflective layer above the middle line is usually formed of a binder resin which does not contain light-scattering particles and becomes easily softened by heat applied to the substrate during deposition. The surface of this portion (the surface of the reflective layer opposite to the surface in contact with the support) is defined as the scintillator layer formation scheduled surface.

Large irregularities or the like present on the scintillator layer formation scheduled surface can be usually a factor causing abnormal growth of columnar phosphor crystals. According to the first deposition substrate of the invention, however, large irregularities, if any, present on the scintillator layer formation scheduled surface are most likely softened and flattened or reduced in size by the heat applied during the deposition of a phosphor into a scintillator layer.

In the first deposition substrate of the invention, columnar phosphor crystals may be grown normally and favorably by deposition without being affected by the presence or absence of large irregularities or the size of light-scattering particles on the scintillator layer formation scheduled surface. Thus, it becomes possible to provide devices such as scintillator panels which can give radiographic images excellent in sharpness and uniformity of sharpness and have excellent cuttability and high uniformity of sharpness in the light-receiving plane.

In the first deposition substrate of the invention, the reflective layer is preferably free from light-scattering particles in a region extending in a thickness of 0.05 μm to 20 μm from the middle line (JIS B 0601-2001) at half the height of roughness on the surface (the scintillator layer formation scheduled surface) opposite to the surface in contact with the support toward the surface in contact with the support. For example, this configuration advantageously significantly reduces the risk that the light-scattering particles will be exposed on the surface of the reflective layer during the deposition step, and also significantly reduces the risk that optical diffusion (halation: a factor causing a decrease in sharpness of the obtainable radiographic images) will occur in the obtainable scintillator panel in the region of the reflective layer composed of the resin alone.

As mentioned above, the reflective layer in the first deposition substrate of the invention may be comprised of a single layer, or two or more layers. In the reflective layer, the region free from light-scattering particles may be, for example, a region defined in the single reflective layer as a result of the light-scattering particles being buried in the binder resin, or a region formed by stacking a separate binder resin layer free from light-scattering particles onto the first reflective layer in which the light-scattering particles are exposed from the binder resin. (In the invention, layers forming the reflective layer are regarded as constituents of the reflective layer even when they do not contain light-scattering particles.) In the case where a separate resin layer is stacked onto the reflective layer as described above, the stack may be used as such or the obtained deposition substrate may be heat treated to increase the interface adhesion between the two layers in the reflective layer. Further, another reflective layer may be stacked onto the reflective layer.

The reflective layer may include additives such as fluorescent whitening agents, UV absorbers and coloring materials for controlling the reflectance. Such additives are described later.

In the second deposition substrate of the invention, the light-scattering particles present in a region extending in a thickness of from 0 to 0.5 µm from the middle line (JIS B 0601-2001) at half the height of roughness on the surface (the scintillator layer formation scheduled surface) of the reflective layer opposite to the surface in contact with the support toward the surface in contact with the support have an area average particle diameter of not more than 0.5 µm. Even when the light-scattering particles having such sizes are exposed on the scintillator layer formation scheduled surface of the reflective layer, they do not probably provide large irregularities causing the abnormal growth of columnar phosphor crystals during the deposition of a phosphor onto the scintillator layer formation scheduled surface of the reflective layer. That is, even when (small) irregularities are present due to such light-scattering particles on the surface (the scintillator layer formation scheduled surface) of the reflective layer opposite to the surface in contact with the support, such irregularities do not serve as a factor causing the abnormal growth of columnar phosphor crystals during the formation of a scintillator layer on the surface by deposition.

Thus, similarly to the first deposition substrate, it becomes possible according to the second deposition substrate of the invention to provide devices such as scintillator panels which can give radiographic images excellent in sharpness and uniformity of sharpness and have excellent cuttability and high uniformity of sharpness in the light-receiving plane.

In order to increase the reflectance of the reflective layer more effectively, the region other than the region extending in a thickness of from 0 to 0.5 µm from the middle line (JIS B 0601-2001) at half the height of roughness on the surface (the scintillator layer formation scheduled surface) of the reflective layer opposite to the surface in contact with the support toward the surface in contact with the support, namely, the region on the support side preferably contains light-scattering particles having an area average particle diameter of more than 0.5 µm.

In the third deposition substrate of the invention, the reflective layer has an average length of a roughness curve element (Ra) of not more than 0.5 µm as measured in accordance with JIS B 0601-2001. Thus, even if some of the light-scattering particles present on the surface of the reflective layer (on the deposition side above the middle line at half the height of surface roughness, namely, the scintillator layer formation scheduled surface) have an area average particle diameter exceeding 0.5 µm, the satisfaction of the above condition indicates that the scintillator layer formation scheduled surface of the reflective layer as a whole is free from large irregularities that will cause the abnormal growth of columnar phosphor crystals during deposition. Thus, the abnormal growth of scintillator crystals does not probably take place when a scintillator layer is formed by deposition on the scintillator layer formation scheduled surface of the reflective layer.

Thus, similarly to the first and second deposition substrates, it becomes possible according to the third deposition substrate of the invention to provide devices such as scintillator panels which can give radiographic images excellent in sharpness and uniformity of sharpness and have excellent cuttability and high uniformity of sharpness in the light-receiving plane.

From the viewpoint of transmission of radiations such as X-rays, the reflective layer in the first to third deposition substrates of the invention may have voids, such as those formed by a method described later.

In this case, the void volume in the reflective layer (the proportion of the volume of the voids to the volume of the reflective layer) is preferably 5% to 30% from the above viewpoint. The void volume may be easily calculated based on the difference between the theoretical density (without voids) and the actual density of the reflective layer.

From viewpoints such as the sharpness of the obtainable radiographic images, the reflectance of the reflective layer in the first to third deposition substrates of the invention is preferably 5% to 98%, and more preferably 10% to 95%.

Herein, the reflectance is a value calculated from the spectral reflectivity in the 300 to 700 nm wavelength band with spectrocolorimeter SE-2000 (manufactured by NIPPON DENSHOKU INDUSTRIES CO., LTD.) in accordance with JIS Z-8722. The reflectance is a value at 550 nm wavelength in the absence of any indication of reflection wavelength.

The following elements are common to the first to third deposition substrates of the invention.

1-1-1. Light-Scattering Particles

The light-scattering particles present in the reflective layer in the inventive deposition substrate serve to prevent the light produced in the scintillator layer from being diffused in the reflective layer as well as to effectively return the light which has reached the reflective layer into the columnar crystals of the scintillator layer.

Such light-scattering particles may be commercial products or may be produced by known methods as will be described later.

The light-scattering particles are not particularly limited as long as the particle material has a different refractive index from the binder resin which in combination therewith constitutes the reflective layer. Examples of such materials include alumina, yttrium oxide, zirconium oxide, titanium dioxide, barium sulfate, silica, zinc oxide, calcium carbonate, glasses and resins. These materials may be used singly, or two or more may be used as a mixture. (The mixture may include two or more materials belonging to different categories such as a glass and a resin; two or more materials belonging to the same category such as an acrylic resin and a polyester resin; or one or more materials belonging to a category and one or more materials belonging to another category such as a glass, an acrylic resin and a polyester resin.)

Of the above materials, for example, glass beads and resin beads, in particular, glass beads are preferable because the refractive index can be set to a desired value more freely and thus optical diffusion characteristics can be controlled more easily than metal oxides.

Glass beads having a higher refractive index are more preferable. Examples thereof include $BK_7$ (n (relative refractive index, the same applies hereinafter)=about 1.5); $LaSFN_9$ (n=about 1.9); $SF_{11}$ (n=about 1.8); $F_2$ (n=about 1.6): BaK1 (n=about 1.6); barium titanate (n=about 1.9); high refractive index blue glass (n=about 1.6 to 1.7); $TiO_2$—BaO (n=about 1.9 to 2.2); borosilicate (n=about 1.6); and chalcogenide glass (n=about 2 or more). Examples of the resin beads include acrylic particles, polyester resin particles, polyolefin particles and silicone particles, with specific examples including CHEMISNOW (registered trademark) (manufactured by Soken Chemical & Engineering Co., Ltd.), Silicone Resins KR Series (manufactured by Shin-Etsu Chemical Co., Ltd.), and TECHPOLYMER (registered trademark) (manufactured by SEKISUI PLASTICS CO., LTD.).

White pigments such as titanium dioxide ($TiO_2$) have high opacifying properties and a high refractive index, and can easily scatter the light emitted from the scintillator by reflecting and refracting the light. Thus, the use of such pigments allows for marked improvements in the sensitivity of devices such as radiographic image conversion panels including scintillator panels in which scintillator layers are disposed on the inventive deposition substrates.

The light-scattering particles are particularly preferably titanium dioxide ($TiO_2$) in view of the facts that this material is easily available and has a high refractive index.

When titanium dioxide is used as the light-scattering particles, the titanium dioxide may be one which has been surface treated with inorganic compounds or organic compounds in order to improve dispersibility and workability. For example, the surface-treated titanium dioxide and the surface treatment methods are disclosed in JP-A-S52-35625, JP-A-S55-10865, JP-A-S57-35855, JP-A-S62-25753, JP-A-S62-103635 and JP-A-H09-050093. For the surface treatments, inorganic compounds such as aluminum oxide hydrate, hydrous zinc oxide and silicon dioxide, and organic compounds such as dihydric to tetrahydric alcohols, trimethylolamine, titanate coupling agents and silane coupling agents may be preferably used as surface-treatment agents. The amounts of the surface-treatment agents may be determined appropriately in accordance with the purposes as described in the above patent literatures.

The crystal structure of the titanium dioxide may be any of rutile, brookite and anatase forms. However, the rutile form is particularly preferable because its refractive index has a high ratio to that of resins to realize high brightness as well as from the viewpoint of the reflectance with respect to visible light.

Specific examples of titanium oxides include those produced by a hydrochloric acid process such as CR-50, CR-50-2, CR-57, CR-80, CR-90, CR-93, CR-95, CR-97, CR-60-2, CR-63, CR-67, CR-58, CR-58-2 and CR-85; and those produced by a sulfuric acid process such as R-820, R-830, R-930, R-550, R-630, R-680, R-670, R-580, R-780, R-780-2, R-850, R-855, A-100, A-220 and W-10 (product names, manufactured by ISHIHARA SANGYO KAISHA, LTD.).

From the viewpoint of high availability of commercial products, the area average particle diameter of the titanium oxide is preferably 0.1 to 10.0 μm. From the viewpoint of cuttability, the area average particle diameter of the titanium oxide used is more preferably 0.1 to 5.0 μm, further more preferably 0.2 to 3.0 μm and particularly preferably 0.2 to 0.3 μm. In order to improve the affinity and dispersibility for polymers as well as to suppress a degradation of polymers, the titanium oxide is particularly preferably one which has been surface treated with oxides of metals such as Al, Si, Zr and Zn.

The use of titanium oxide as the light-scattering particles tends to cause a decrease in the reflectance to light with wavelengths of 400 nm or less and also a degradation of the binder due to the photocatalytic action of titanium oxide. In view of these facts, it is preferable to use the titanium oxide in combination with at least one kind of light-scattering particles selected from barium sulfate, alumina, yttrium oxide and zirconium oxide which have a high reflectance even to light with wavelengths of at least 400 nm or less. Of these materials, barium sulfate is more preferable because its reflectance in the wavelengths of 400 nm or less is particularly high. For the same reason, the mass ratio of barium sulfate to titanium dioxide is preferably 95:5 to 5:95, more preferably 20:80 to 5:95 and particularly preferably 20:80 to 80:20.

Further, it is preferable that the light-scattering particles include at least one selected from solid particles and void particles.

The void particles are not particularly limited as long as the particles have voids. Examples thereof include single-hollow particles having one hollow portion within the particle, multi-hollow particles having a number of hollow portions within the particle, and porous particles. These particles may be selected appropriately in accordance with the purpose.

Of the void particles, single-hollow particles and multi-hollow particles are preferable because they are free from the risk that the voids will be filled with the binder resin.

Here, the term "void particles" refers to particles having voids such as hollow portions and pores.

The term "hollow portions" refers to holes (air layers) in the inside of particles.

Due to the difference in refractive index between the holes (the air layers) and the shells (such as resin layers), the hollow particles can add optical reflection and diffusion characteristics to the reflective layer which cannot be obtained with solid particles.

The term "multi-hollow particles" refers to particles having a plurality of such holes in the inside of particles. The term "porous particles" refers to particles having pores in the particle. The term "pores" refers to portions that are inwardly curved or recessed from the surface toward the inside of the particle. Examples of the shapes of the pores include cavities, and needle-like shapes or curved shapes which are tapered or choked toward the inside or the core of the particles. The pores may be present across the particles. The sizes and the volumes of the pores may be variable and are not particularly limited.

The materials of the void particles are not particularly limited and may be selected appropriately in accordance with the purpose. Examples thereof include the aforementioned materials. In particular, suitable examples include thermoplastic resins such as styrene/acryl copolymers.

The void particles may be appropriately produced or are available in the market. Examples of the commercially available products include ROPAQUE HP1055 and ROPAQUE HP433J (manufactured by ZEON CORPORATION), and SX866 (manufactured by JSR Corporation).

Suitable examples of the multi-hollow particles include Sylosphere (registered trademark) and Sylophobic (registered trademark) manufactured by FUJI SILYSIA CHEMICAL LTD.

Of the void particles, single-hollow particles are particularly preferable in terms of void content.

When the void particles are used as the light-scattering particles, the light-scattering particles may be a collection of a single form of the above particles or may include two or more kinds of void particles. The void particles may be used in combination with solid particles.

The void particles may be advantageously used in combination with white pigments such as titanium dioxide, alumina, yttrium oxide, zirconium oxide and barium sulfate. This combined use prevents deteriorations in scintillator characteristics due to the white pigments adsorbing water ($H_2O$) and carbon dioxide ($CO_2$) to their surface and releasing them when exposed to heat or X-ray energy. That is, the combined use of the void particles and the white pigments suppresses the release of impurity gases such as water ($H_2O$) and carbon dioxide ($CO_2$) from the white pigments and thus prevents deteriorations in scintillator characteristics.

Alternatively, deteriorations in scintillator characteristics due to the detachment of water ($H_2O$) and carbon dioxide ($CO_2$) from the surface of white pigments may be effectively prevented by forming a large number of bubbles in the reflective layer including a white pigment and a binder resin. According to this method, the white pigment and the bubbles having a large difference in refractive index are placed in contact with each other in the reflective layer, and the reflectance of the reflective layer is improved by this increased difference in refractive index between the materials constituting the reflective layer. Details are described in the section of "Deposition substrate production methods".

From viewpoints such as the reflectance of the reflective layer, the occurrence of cracks on the surface of the reflective layer, and the stability of a coating liquid prepared for the formation of the reflective layer (hereinafter, also referred to as "reflective coating liquid", the same applies to coating liquids for other purposes), the area average particle diameter of the light-scattering particles is preferably 0.1 μm to 10.0 μm, and more preferably 0.1 to 5.0 μm. This area average particle diameter of the light-scattering particles ensures that optical scattering occurs efficiently in the reflective layer to lower the transparency and increase the reflectance, as well as that the reflective coating liquid exhibits improved stability over time and the occurrence of cracks in the dry reflective layer is avoided. However, as mentioned above, the upper limit of the area average particle diameter of the light-scattering particles is 0.5 μm in the case of the second deposition substrate.

From the viewpoint of the stability of the reflective coating liquid, the grain size distribution of the light-scattering particles is preferably in the range of 0.05 to 20.0 μm.

The volume fraction of the light-scattering particles is preferably 10 to 60 vol % in 100 vol % of the total volume of the components constituting the reflective layer.

Further, it is preferable that the reflective layer in the inventive deposition substrate contain voids in a proportion of 5 to 30 vol %.

In particular, when a white pigment such as titanium oxide is used as the light-scattering particles, the content of the titanium oxide is preferably 40 to 95 wt %, and particularly preferably 60 to 90 wt % in 100 wt % of the total of the components constituting the reflective layer. This content of the titanium oxide in the reflective layer ensures that the reflectance of the reflective layer is improved and the adhesion of the reflective layer with respect to the support and the phosphor is improved.

1-1-2. Binder Resins

The binder resins are not particularly limited as long as the objects of the invention are not deteriorated. The binder resins may be appropriately purchased or produced.

Examples of the binder resins include polyurethane resins, vinyl chloride copolymers, vinyl chloride vinyl acetate copolymers, vinyl chloride vinylidene chloride copolymers, vinyl chloride acrylonitrile copolymers, butadiene acrylonitrile copolymers, polyamide resins, polyvinylbutyrals, polyester resins, cellulose derivatives (such as nitrocellulose), styrene butadiene copolymers, various synthetic rubber resins, phenolic resins, epoxy resins, urea resins, melamine resins, phenoxy resins, silicone resins, acrylic resins and urea formamide resins. Of these, hydrophobic resins such as polyester resins, polyurethane resins and acrylic resins are preferable and hydrophobic resins such as polyester resins and polyurethane resins are more preferable because of excellent interlayer adherability with respect to columnar phosphor crystals formed by deposition and to the support.

The glass transition temperature (Tg) of the binder resins is not particularly limited as long as the objects of the invention are not deteriorated. In view of easy softening of the resins during deposition, the glass transition temperature is preferably less than the temperature of vapor cluster generated during deposition (usually 400° C. or above), and is more preferably not more than the substrate temperature during deposition.

A resin with a glass transition temperature of not more than the substrate temperature is more preferable for use as the binder resin. However, because the temperature of the vapor cluster of phosphor such as CsI generated during deposition is usually 400° C. or above and the binder resin can be softened also by the heat applied by this cluster, a resin whose glass transition temperature is higher than the substrate temperature but is not more than the cluster temperature may also be suitably used as the binder resin.

The binder resin is preferably a polymer having a glass transition temperature (Tg) of −30 to 100° C. because such a polymer exhibits excellent interlayer adherability with respect to columnar phosphor crystals formed by deposition and to the support.

Of the binder resins, hydrophobic resins such as polyester resins and polyurethane resins having the above glass transition temperature are particularly preferable because of higher interlayer adherability with respect to columnar phosphor crystals formed by deposition and to the support.

The binder resins may be used singly, or two or more may be used in combination.

The binder resins contained in the refractive layer preferably contain at least two binder resins showing different glass-transition temperatures of not less than 5° C., and more preferably 10 to 100° C., from the viewpoint that the film properties of the refractive layer may be easily controlled.

Here, the plural binder resins may be the same kinds of or different kinds of binder resins as long as the glass transition temperatures of these binder resins are difference from each other.

1-1-3. Other Components

In the deposition substrates of the invention, the reflective layer may contain additives such as UV absorbers, fluorescent whitening agents and antistatic agents in addition to the light-scattering particles and the binder resin while still achieving the objects of the invention. Examples of the additives further include organic and/or inorganic fine particles (excluding the light-scattering particles and specific additives described in the specification), crosslinking agents, heat stabilizers, antioxidants, organic lubricants, nucleating agents and coupling agents. These additives may be contained in any region in the reflective layer. For example, the additives may be contained in the light-scattering particle-free region of the reflective layer in the first deposition substrate, in the vicinity of the surface opposite to the surface in contact with the support, or may be present in any other region.

(Fluorescent Whitening Agents and UV Absorbers)

In order to improve the reflectance of the reflective layer and to prevent yellowing of the binder in the reflective layer, the reflective layer preferably includes at least one of fluorescent whitening agents and UV absorbers.

The fluorescent whitening agents are agents which absorb 300 to 400 nm wavelength UV rays and convert them to visible rays with 400 to 450 nm blue wavelengths that are emitted.

Functions and effects of the fluorescent whitening agents will be described below referring to CsI as an example of the phosphors.

The maximum emission wavelengths of CsI activated with thallium, CsI(Tl), and of CsI activated with sodium, CsI(Na), are about 560 nm and about 420 nm, respectively. On the other hand, the maximum emission wavelength of inactivated CsI (pure) is about 315 nm. Thus, even a system doped with activators has an emission around a central wavelength of 315 nm ascribed to CsI (pure) that is the matrix. In radiation conversion panels, it is preferable in terms of energy conversion efficiency that a light-receiving element be designed so as to be sensitive to central wavelength bands of activator-doped CsI. With a thus-designed light-receiving element, light having low wavelengths of 400 nm or less is not effectively utilized in the formation of radiographic images. In view of this fact, the use of fluorescent whitening agents is advantageous in that when the light-scattering particles are titanium dioxide, the fluorescent whitening agents compensate for the low reflectance of the titanium dioxide with respect to 400 nm or less wavelength light (the fluorescent whitening agents convert 300 to 400 nm UV rays to 400 to 450 nm visible rays, which are reflected by the titanium dioxide at an appropriate reflectance) as well as in that the fluorescent whitening agents prevent the binder resin constituting the reflective layer from being degraded by the photocatalytic action of the titanium dioxide illuminated with 400 nm or less wavelength light (the fluorescent whitening agents convert 300 to 400 nm UV rays to 400 to 450 nm visible rays, and there will be no light having wavelengths that allow the titanium oxide to exhibit the photocatalytic action).

From viewpoints such as the reflection efficiency, the prevention of degradation of the binder resin, and the whiteness degree of the reflective layer, it is preferable that the fluorescent whitening agents be distributed in the light-scattering particle-free region of the reflective layer on the side opposite to the surface in contact with the support in the first deposition substrate.

In the first deposition substrate, a scintillator layer is disposed on the surface of the reflective layer on the light-scattering particle-free region side. Thus, the light-scattering particle-free region is located closer to the scintillator layer than is the titanium dioxide-containing region. With this configuration, the fluorescent whitening agents can convert 300 to 400 nm wavelength UV rays emitted from the scintillator layer into visible rays before the light reaches the titanium dioxide particles as the light-scattering particles. As a result, the visible rays can be reflected by the titanium dioxide in the reflective layer at an appropriate reflectance, and the binder resin can be thus prevented from being degraded by the UV-induced photocatalytic action of the titanium oxide.

If certain types of fluorescent whitening agents are used in combination with certain types of light-scattering particles and pigments and these are brought into contact with each other, an undesired reaction takes place between the fluorescent whitening agents and the light-scattering particles as well as the pigments with the result that the whiteness degree of a reflective layer is lowered. In contrast, the inventive deposition substrates are configured such that the above fluorescent whitening agents are distributed in the region free from light-scattering particles (and also pigments) and thus there is no contact of the fluorescent whitening agents with the light-scattering particles or pigments distributed in a separate region, thereby preventing a decrease in whiteness degree of the reflective layer.

From the viewpoint of, for example, solvent resistance, substituted stilbenes and substituted coumarins described in British Patent No. 786,234, and substituted thiophenes described in U.S. Pat. No. 3,135,762 are particularly useful as the fluorescent whitening agents in the invention. Examples of the fluorescent whitening agents further include, but are not limited to, those described in JP-B-S45-37376 and JP-A-S50-126732. Specific examples include those sold under the trade names of "Uvitex" (manufactured by Ciba-Geigy), "OB-1" (manufactured by Eastman Chemical Company), "TBO" (manufactured by SUMITOMO SEIKA CHEMICALS CO., LTD.), "Kaycoll" (manufactured by NIPPON SODA CO., LTD.), "Kayalight" (manufactured by NIPPON KAYAKU CO., LTD.) and "Leucophor EGM" (manufactured by Clariant Japan). The fluorescent whitening agents may be used singly, or two or more may be used in combination. Particularly preferred fluorescent whitening agents are those which have excellent heat resistance, exhibit high compatibility with the binder resins and are homogeneously dispersed in the resins, and have small coloration and little adverse effects on resins. Of such fluorescent whitening agents, "OB-1" (manufactured by Eastman Chemical Company) is particularly preferable because of high effectiveness in the above performance.

From the viewpoint of concentration quenching (if the concentration of the fluorescent whitening agents in the reflective layer is too high, energy transfer occurs mainly between the fluorescent whitening agent molecules rather than for fluorescent emission, and obtaining fluorescent intensity becomes difficult), the fluorescent whitening agents are preferably added in amounts of 0.005 to 2 parts by weight, and more preferably 0.05 to 1 part by weight with respect to 100 parts by weight of the binder resin.

UV absorbers may be used in order to absorb the UV electromagnetic waves produced in the scintillator layer before they reach the titanium dioxide and thereby to prevent the degradation of the binder resin. Any UV absorbers may be selected appropriately without limitation in accordance with the purpose. Examples of the organic UV absorbers include benzotriazole compounds (see U.S. Pat. No. 3,533,794), 4-thiazolidone compounds (see U.S. Pat. No. 3,352,681), benzophenone compounds (see JP-A-S46-2784) and UV-absorbing polymers (see JP-A-S62-260152). Examples of the inorganic UV absorbers include known such agents such as zinc oxide and cerium oxide. In terms of durability, inorganic agents are more preferable than organic agents. Of the UV absorbers, zinc oxide and cerium oxide are more suitable because they are unlikely to bleed out from the reflective layer. In particular, zinc oxide is most preferable in terms of economic advantage and UV absorbing performance. Examples of zinc oxide include FINEX-25LP and FINEX-50LP (manufactured by SAKAI CHEMICAL GROUP). Commercially available UV absorbers may be used. For example, a reflective layer including a UV absorber may be formed by applying onto the support UV-absorbing coating "SUMICEFINE (registered trademark) ZR-133" (manufactured by SUMITOMO OSAKA CEMENT CO., LTD.) which is a dispersion coating including zinc oxide and a polyester resin. Alternatively, an organic UV absorber such as HALSHYBRID (registered trademark) UV-G13 (manufactured by NIPPON SHOKUBAI CO., LTD.) may be added to the reflective layer.

When inorganic UV absorbers are used, the surface of the UV absorbers is preferably subjected to chemical treatment in order to improve the dispersibility of the UV absorber particles. The chemical treatments are not particularly limited, but are preferably capable of giving resistance to X-ray degradation or yellowing as well as giving good dispersibility to the inorganic UV absorbers. From the viewpoint of higher effectiveness in the above performance, the most preferred method is to treat the surface of the inorganic UV absorbers with oxides or hydroxides of Al or Si.

<Coloring Materials>

In order to adjust the reflectance of the reflective layer, the reflective layer may be colored with coloring materials.

Suitable coloring materials are those capable of absorbing long-wavelength red light which is more prone to scatter than other wavelength light, and blue coloring materials are preferred, with examples including ultramarine blue and Prussian blue (iron ferrocyanide). Further, organic blue pigments such as phthalocyanine, anthraquinone, indigoid and carbonium may also be used as the coloring materials. Of these, phthalocyanine is more preferable from viewpoints such as radiation durability and UV durability. Furthermore, titanium black that is a titanium-containing black pigment may be suitably used. Titanium black is a black substance resulting from partial removal of oxygen from titanium dioxide. Because its specific gravity is the same as titanium dioxide, a reflective coating liquid including titanium dioxide as the light-scattering particles and titanium black exhibits high stability. The reflectance of the deposition substrate can be advantageously adjusted easily by regulating the mixing ratio of titanium dioxide and titanium black.

1-2. Supports

Exemplary materials of the supports include various glasses, ceramics, semiconductors, polymer materials and metals which are transmissive to radiations such as X-rays. Specific examples include plate glasses such as quartz, borosilicate glass and chemically reinforced glass; ceramics such as amorphous carbon, sapphire, silicon nitride and silicon carbide; semiconductors such as silicon, germanium, gallium arsenide, gallium phosphide and gallium nitride; polymer films (plastic films) such as cellulose acetate films, polyester resin films, polyethylene terephthalate films, polyamide films, polyimide films, triacetate films, polycarbonate films and carbon fiber-reinforced resin sheets; metal sheets such as aluminum sheets, iron sheets and copper sheets, as well as metal sheets having layers of oxides of the metals; and bio-nanofiber films. These materials may be used singly or may be stacked to be used.

Of the above support materials, flexible polymer films having a thickness of 50 to 500 µm are particularly preferable.

Here, the term "flexible" means that the elastic modulus at 120° C. (E120) is 1000 to 6000 N/mm$^2$.

Here, the "elastic modulus" is a value obtained by testing a JIS-C2318 sample with a tensile tester in accordance with JIS K 7161, and calculating the ratio of the stress over the strain indicated by the gauge marks on the sample, in the range in which the strain stress curve shows a straight relationship. This ratio is called the Young's modulus. In the specification, this Young's modulus is defined as the elastic modulus.

The support preferably has an elastic modulus at 120° C. (E120) of 100 N/mm$^2$ to 20000 N/mm$^2$, and more preferably 1000 N/mm$^2$ to 6000 N/mm$^2$.

Examples of the flexible polymer films include polymer films formed of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyetherimide (E120=1900 N/mm$^2$), polyarylate (E120=1700 N/mm$^2$), polysulfone (E120=1800 N/mm$^2$), polyether sulfone (E120=1700 N/mm$^2$) and polyimide (E120=4900 N/mm$^2$). The values of E120 are variable even in polymer films of the same material, and the values in parenthesis are not absolutely correct and should be considered as a guide.

In particular, polymer films including polyimide or polyethylene naphthalate are suitable in the case where columnar crystals of a phosphor (scintillator) are formed on the reflective layer by a gas-phase method using cesium iodide as the raw material.

The flexible polymer film may be a single polymer film, a film of a mixture of the above polymers, or a stack of two or more identical or different polymer layers.

The use of a bio-nanofiber film as the support provides benefits in terms of support characteristics and environmental friendliness because the bio-nanofiber films have characteristics which are not possessed by existing glasses or plastics such as (i) low weight, (ii) strength five times or more greater than iron (high strength), (iii) resistance to swelling by heat (low thermal expansion properties), (iv) being flexible (excellent flexibility), (v) feasibility of various treatments such as mixing, coating and film production, and (vi) combustibility of plant fiber materials.

The support of the deposition substrate is advantageously a polymer film having a thickness of 50 µm to 500 µm. Such a support allows a scintillator panel including the deposition substrate to be bonded to a planar light-receiving element in such a manner that the scintillator panel changes its shape in accordance with the shape of the surface of the planar light-receiving element. Thus, the scintillator panel can be uniformly bonded tightly to the planar light-receiving element even in the presence of deformation or warpage of the deposition substrate caused by deposition. The resultant flat panel detectors can achieve uniform sharpness of radiographic images in the entirety of the light-receiving plane. (Because the bonding between the scintillator panel and the planar light-receiving element is tight and uniform, the entire light-receiving plane of the flat panel detector provides uniform sharpness in the obtainable radiographic images.)

In order to, for example, adjust the reflectance of the support, the support may include a light-shielding layer and/or a light-absorbing pigment layer in addition to the layer of the aforementioned material. Further, the support may be one imparted with light-absorbing properties or light-reflecting properties or may be a colored support for the purpose of, for example, adjusting the reflectance.

The light-shielding layer and the pigment layer may be provided as separate films. This configuration will be described later in the section of "Additional layers".

Examples of the supports imparted with light-shielding properties or light-reflecting properties include various metal plates and amorphous carbon plates. When the metal plates are used as the supports, aluminum plates having a thickness of 0.2 mm to 2.0 mm are preferable from the viewpoints of X-ray transmission properties and handling properties.

From the viewpoint of adjusting the reflectance of the deposition substrates, preferred colored supports are resin films containing coloring materials such as pigments and dyes (pigments are more preferable).

Examples of such resins include the binder resins described hereinabove. Examples of the pigments include common organic and inorganic coloring pigments such as hardly soluble (usually less than 1 g is dissolved in 100 g of water at 20° C.) azo pigments, phthalocyanine blue and titanium black.

Specific examples include insoluble azo pigments such as First Yellow, Disazo Yellow, Pyrazolone Orange, Lake Red 4R and Naphthol Red; condensed azo pigments such as Cromophtal Yellow and Cromophtal Red; azo lake pigments such as Lithol Red, Lake Red C, Watching Red, Brilliant Carmine 6B and Bordeaux 10B; nitroso pigments such as Naphthol Green B; nitro pigments such as Naphthol Yellow S; phthalocyanine pigments such as Phthalocyanine Blue, First Sky Blue and Phthalocyanine Green; threne pigments such as Anthrapyrimidine Yellow, Perinone Orange, Perylene Red, Thioindigo Red and Indanthrone Blue; quinacridone pigments such as Quinacridone Red and Quinacridone Violet; dioxadine pigments such as Dioxadine Violet; isoindolinone pigments such as Isoindolinone Yellow; acidic dye lakes such as Peacock Blue Lake and Alkali Blue Lake; and basic dye lakes such as Rhodamine Lake, Methyl Violet Lake and Malachite Green Lake.

The pigments are preferably used in amounts of 0.01 to 10 parts by weight with respect to 100 parts by weight of the binder resin. This amount of the pigments ensures sufficient coloring of the films and prevents deteriorations in mechanical properties such as elongation and strength of the support resin due to excessive addition of the pigments over the saturated coloration.

1-3. Additional Layers

Where necessary, the deposition substrates may include additional layers in addition to the reflective layer and the support.

In a scintillator panel obtained by forming a scintillator layer on the deposition substrate, it is generally preferable that the luminous efficiency of the scintillator and the sharpness of the obtainable radiographic images be adjusted to desired levels in accordance with the purpose of use of the radiographic image detector. In oral radiography as an example, radiographic images with high sharpness are required because the imaging subjects include dental nerves having fine and complicated structures. Further, the scintillators are required to have high luminous efficiency in pediatric radiography in order to minimally reduce radiation exposure on children susceptible to radiation effects.

According to the invention, the reflectance of the deposition substrates is adjusted as required in the following manner, whereby the scintillator luminous efficiency of scintillator panels obtained by forming scintillator layers on the deposition substrates and the sharpness of the obtainable radiographic images can be adjusted to desired levels.

For example, the reflectance of the deposition substrate may be adjusted by providing at least one of light-shielding layers and light-absorbing pigment layers in addition to the reflective layer and the support. Alternatively, the reflectance of the deposition substrate may be adjusted by coloring the reflective layer or the support layer in the deposition substrate so as to obtain an appropriate reflectance.

In a configuration in which a light-shielding layer or a light-absorbing pigment layer is provided in the deposition substrate, the light-shielding layer or the pigment layer is disposed on the side of the support on which the reflective layer will be formed.

The light-shielding layer or the pigment layer may be provided by stacking a film including a light-shielding layer or a pigment layer.

The reflectance of the deposition substrates may also be adjusted by adopting a support which itself has light-shielding properties or light-absorbing properties. Alternatively, as mentioned earlier, the reflectance of the deposition substrates may be adjusted by coloring the reflective layer or the support. Details in these cases of reflectance adjustment are as described in the sections of "Supports" and "Reflective layers".

In particular, the reflectance is preferably adjusted by coloring the reflective layer itself with a coloring material because this adjustment may be performed by a simple method in which the coloring material is added to the dispersion of the white pigment and the binder resin, and the resultant coating liquid is applied onto the support.

The above techniques for adjusting the reflectance of the deposition substrates may be adopted singly. However, at least two techniques are preferably adopted in combination for reasons such as that the reflectance of the deposition substrates may be accurately adjusted to a desired value more easily. When both the light-shielding layer and the pigment layer are used, they are preferably disposed in the order of the light-shielding layer and the pigment layer from the support side for the same reason as above.

Hereinbelow, the light-shielding layers and the light-absorbing pigment layers will be described.

The light-absorbing pigment layers are not particularly limited as long as the layers have light-absorbing properties and are pigmented. For example, layers including a pigment and a binder resin may be used. The pigments in the pigment layers may be any known pigments. Suitable pigments are those capable of absorbing long-wavelength red light which is more prone to scatter, and blue pigments are preferred, with examples including ultramarine blue and Prussian blue (iron ferrocyanide). Further, organic blue pigments such as phthalocyanine, anthraquinone, indigoid and carbonium may also be used. Of these, phthalocyanine is more preferable from viewpoints such as radiation durability and UV durability of the light-absorbing pigment layers. Examples of the binder resins in the pigment layers include those described in the section of "Reflective layers". The pigments are preferably used in amounts of 0.01 to 30 parts by weight, preferably 0.01 to 10 parts by weight with respect to 100 parts by weight of the binder resin from the viewpoint of the enhancement in the sharpness of radiographic images.

The light-shielding layers include materials having light-shielding properties.

Preferred light-shielding materials for the light-shielding layers are stainless steel and metal materials including one, or two or more elements of aluminum, silver, platinum, palladium, gold, copper, iron, nickel, chromium and cobalt from the viewpoint that the reflectance of the deposition substrates can be adjusted more accurately. In particular, aluminum- or silver-based metal materials are particularly preferable because such light-shielding layers exhibit excellent light-shielding properties and corrosion resistance. The light-shielding layer may be comprised of a single film of the metal material, or may include two or more films of the metal materials.

In order to increase the adhesion between the support and the light-shielding layer, an intermediate layer is preferably disposed between the support and the light-shielding layer. Examples of the materials of the intermediate layer include general anchor coating agents (such as isocyanate compounds, polyethyleneimines, modified polybutadienes and organic titanate compounds), as well as metals different from the metals in the light-shielding layers (dissimilar metals). Examples of the dissimilar metals include nickel, cobalt, chromium, palladium, titanium, zirconium, molybdenum and tungsten. The intermediate layer may include one, or two or more kinds of these dissimilar metals. In particular, it is preferable that nickel or chromium, or both of these metals be contained because such an intermediate layer achieves higher adhesion between the support and the light-shielding layer. From the viewpoint of luminous efficiency, the thickness of the light-shielding layer is preferably 0.005 to 0.3 μm, and more preferably 0.01 to 0.2 μm.

The light-shielding layer made of such a metal material also serves as an antistatic layer and thus may be suitably used for antistatic purposes. Such an antistatic layer may be formed instead of or in combination with the addition of an antistatic agent to the reflective layer. In this case, from the viewpoint of antistatic properties of the deposition substrates, the surface resistivity measured with respect to the surface of the reflective layer opposite to the surface in contact with the support is preferably not more than $1.0 \times 10^{12} \Omega/\square$, more preferably not more than $1.0 \times 10^{11} \Omega/\square$, and most preferably not more than $1.0 \times 10^{10} \Omega/\square$ ($\square$ in the unit $\Omega/\square$ means square and has no dimension. The same applies hereinafter.)

According to the deposition substrates of the invention, as discussed above, the scintillator layer formation scheduled surface (the surface of the reflective layer opposite to the surface in contact with the support) is configured to allow a scintillator layer to be formed uniformly by deposition without the occurrence of problems such as abnormal growth of columnar phosphor crystals. Thus, it becomes possible to provide devices such as scintillator panels which can give radiographic images with excellent sharpness and excellent uniformity of sharpness. Further, the inventive deposition substrates exhibit excellent cuttability. As a result, problems such as local cracks do not occur even when the inventive deposition substrates and scintillator panels including the substrates are subjected to a cutting treatment. Furthermore, the deposition substrates and scintillator panels including the substrates may be manufactured in a specific size without the need for fabricating individual deposition substrates with the specific size separately, and may be manufactured in such a manner that the deposition substrates and scintillator panels are manufactured with a larger size than the desired size and are thereafter cut into individual substrates or panels having the desired size. Thus, the deposition substrates and scintillator panels including the substrates ensure uniform quality within the lot or between the lots.

2. Scintillator Panels

A scintillator panel according to the present invention includes the deposition substrate and a scintillator layer which is disposed on the deposition substrate by deposition and includes cesium iodide and at least one activator. The scintillator layer has a columnar crystal structure.

In the scintillator panel of the invention, it is preferable that a protective layer described later be provided in addition to the reflective layer and the scintillator layer. In the inventive scintillator panel, a light-absorbing pigment layer may be disposed on the surface of the reflective layer opposite to the surface on which the scintillator layer is disposed. Further, the scintillator panel of the invention may be supported on a support plate having higher rigidity than the support.

Hereinbelow, constituents such as layers and elements in the inventive scintillator panels will be described.

2-1. Supports and Reflective Layers

The supports and the reflective layers are similar to those in the deposition substrates, and thus will not be described anew.

In the scintillator panel of the invention, the reflective layer is located between the support and the scintillator layer. The reflective layer, which includes the light-scattering particles and the binder resin, increases the luminous efficiency of the scintillator panel.

2-2. Scintillator Layers

In the scintillator panel of the invention, the scintillator layer is preferably formed by the growth of columnar crystals from the reflective layer so as to form an interface between the reflective layer and the scintillator layer.

In the scintillator panel of the invention, the average circular equivalent diameter of the phosphor crystals is preferably not more than 5.0 μm, and more preferably from 0.1 μm to 0.5 μm wherein the average circular equivalent diameter is an average of the diameters of circles having the same areas as the cross sectional areas of the columnar phosphor crystals at a position 10 μm away from the interface between the scintillator layer and the reflective layer.

Examples of the materials for the scintillator layers include known phosphors such as NaF, NaCl, NaBr, NaI, KF, KCl, KBr, KI, RbF, RbCl, RbBr, RbI, CsF, CsCl, CsBr and CsI. Of these, cesium iodide (CsI) is preferable from the viewpoints that the X-rays to visible light conversion ratio is relatively high, that columnar crystals can be formed easily by deposition, and that the scattering of light in the crystals is suppressed by the light guide effects ascribed to the crystal structure and consequently the thickness of the phosphor layer can be increased corresponding to the amount of suppressed scattering.

The scintillator panels will be further discussed below referring to CsI as an example of the phosphors.

Because the luminous efficiency obtained with CsI alone is low, the scintillator layer preferably includes CsI in combination with any of various activators. Examples of such scintillator layers include a scintillator layer disclosed in JP-B-S54-35060 which contains CsI and sodium iodide (NaI) in an appropriate molar ratio. Further, an example of preferred scintillator layers is one disclosed in JP-A-2001-59899 which contains CsI and activators such as thallium (Tl), europium (Eu), indium (In), lithium (Li), potassium (K), rubidium (Rb) and sodium (Na) in an appropriate molar ratio.

In the scintillator panel of the invention, a particularly preferred scintillator layer includes cesium iodide and an activator(s) including one or more thallium compounds. In particular, thallium-activated cesium iodide (CsI:Tl) is preferable because this material has a wide emission wavelength range from 300 nm to 750 nm.

Various thallium compounds (thallium (I) compounds and thallium (III) compounds) may be used, with examples including thallium iodide (TlI), thallium bromide (TlBr), thallium chloride (TlCl) and thallium fluoride (TlF and $TlF_3$). In particular, thallium iodide (TlI) is preferable because CsI is activated to achieve excellent emission intensity.

The thallium compounds preferably have a melting point in the range of 400 to 700° C. This melting point of the thallium compounds ensures that the activator is uniformly distributed in the columnar crystals in the scintillator layer formed by deposition, resulting in an improvement in luminous efficiency. Herein, the melting point is measured at normal pressure (usually about 0.101 MPa).

In the scintillator panel of the invention, the relative content of the activators in the scintillator layer is preferably 0.1 to 5 mol %.

Herein, the relative content of the activators is the molar percentage of the activators relative to 1 mole of the phosphor matrix compound taken as 100 mol %.

The term "phosphor matrix compound" refers to the phosphor itself such as CsI that is not activated with activators. The raw materials for the scintillator layers such as the phosphor matrix compounds and the activators are collectively referred to as phosphor raw materials.

The scintillator layer may be comprised of one, or two or more layers.

A more preferred scintillator layer includes a scintillator main layer containing a phosphor matrix compound and an activator, and a columnar crystalline scintillator underlayer which is disposed between the substrate and the scintillator main layer, contains a phosphor matrix compound and an activator, and has a higher void content than the scintillator main layer. In this case, the average circular equivalent diameter of the scintillator underlayer is preferably from 0.1 µm to 0.5 µm.

Herein, the term "void content" refers to the ratio of the total cross sectional area of voids to the total cross sectional area of the columnar phosphor crystals plus the voids with respect to a cross section of the scintillator layer that has been cut parallel to the plane of the support at an arbitrary position in the columnar crystals including the scintillator underlayer. In general, the void content is variable depending on the position of the cross section of the columnar phosphor crystals. From the viewpoints of cuttability and emission intensity, the void content is preferably 10 to 30% at a position 10 µm away from the reflective layer, and is preferably 2 to 20% at a position 10 µm away from the end of the columnar phosphor crystals toward the support.

The void content may be determined by cutting the phosphor layer of the scintillator panel parallel to the plane of the support, and analyzing a scanning electron micrograph of the cross section with use of an image processing software to obtain the cross sectional areas of the phosphor portions and the voids.

In the scintillator underlayer, the relative content of the activator is preferably 0.01 to 1 mol %, and more preferably 0.1 to 0.7 mol %.

In particular, the relative content of the activator in the underlayer is highly preferably not less than 0.01 mol % in terms of the enhancement of emission brightness as well as the storage properties of the scintillator panels.

In the invention, it is highly preferable that the relative content of the activator in the scintillator underlayer be lower than the relative content of the activator in the scintillator main layer. The ratio of the relative content of the activator in the scintillator underlayer to the relative content of the activator in the scintillator main layer ((relative content of activator in scintillator underlayer)/(relative content of activator in scintillator main layer)) is preferably 0.1 to 0.7.

From viewpoints such as the luminous efficiency of the scintillator layer, the degree of orientation based on an X-ray diffraction spectrum with respect to a plane of the phosphor in the scintillator layer having a certain plane index is preferably in the range of 80 to 100% at any position in the direction of layer thickness. For example, the plane index in the columnar crystals of thallium-activated cesium iodide (CsI:Tl) may be any of indices including (100), (110), (111), (200), (211), (220) and (311), and is preferably (200). (For the plane indices, refer to X-Sen Kaiseki Nyuumon (Introduction to X-ray analysis) (Tokyo Kagaku Dojin), pp. 42-46.)

Herein, the "degree of orientation based on an X-ray diffraction spectrum with respect to a plane having a certain plane index" indicates the proportion of the intensity Ix of the certain plane index relative to the total intensity I of the total including planes with other plane indices. For example, the degree of orientation of the intensity I200 of the (200) plane in an X-ray diffraction spectrum is obtained by: "Degree of orientation=I200/I".

For example, the plane indices for the determination of the orientation degree may be measured by X-ray diffractometry (XRD) (crystal X-ray diffractometry or powder X-ray diffractometry). The X-ray diffractometry is a versatile analytical technique capable of identifying substances or giving information about structures such as crystal phase structures by utilizing a phenomenon in which a characteristic X-ray having a specific wavelength is diffracted by crystalline substances according to the Bragg's equation. The illumination targets may be Cu, Fe and Co, and the illumination outputs are generally about 0 to 50 mA and about 0 to 50 kV in accordance with the performance of the apparatus.

The columnar crystals may be formed by a gas-phase method. Examples of the gas-phase methods include deposition and sputtering. Several gas-phase methods may be performed in combination. For example, the phosphor matrix (CsI) may be deposited by deposition and the activator raw material by sputtering. Even activator raw materials having a high melting point (compounds having a melting point of 1000° C. or above and are hardly vaporized by deposition) may be used by adopting sputtering for the vaporization of the activator raw materials.

The thickness of the scintillator layer is preferably 100 to 1000 µm, and more preferably 120 to 700 µm because this thickness ensures that a good balance is obtained between the brightness of the scintillator panel and the sharpness of the obtainable radiographic images.

The thickness of the scintillator underlayer is preferably 0.1 µm to 50 µm, and more preferably 5 µm to 40 µm from the viewpoints of high brightness of the scintillator panel and ensuring the sharpness of the obtainable radiographic images.

From the viewpoint of the cuttability of the scintillator panels, the columnar phosphor crystals in the scintillator layer preferably satisfy $1.5 \leq b/a \leq 30$ wherein the letter a is the average circular equivalent diameter of the columnar phosphor crystals at a position 10 µm away from the interface between the scintillator layer and the reflective layer, and the letter b is the average circular equivalent diameter of the columnar phosphor crystals on the uppermost surface.

From the viewpoint of the sharpness of the obtainable radiographic images, the scintillator layer preferably satisfies $3 \leq d/c \leq 1000$, and more preferably $10 \leq d/c \leq 1000$ wherein the letter c is the thickness of the scintillator underlayer and the letter d is the thickness of the scintillator main layer.

In order to improve the sharpness of the obtainable radiographic images, the columnar phosphor crystals preferably have a diameter of 0.1 µm to 5.0 µm at the interface between the scintillator layer and the reflective layer (this diameter is the average circular equivalent diameter at a position (height) of 10 µm from the plane of contact between the scintillator layer and the reflective layer along the direction extending from the reflective layer toward the scintillator layer).

2-2. Protective Layers

Where necessary, the scintillator panels of the invention may have a protective layer which physically or chemically protects the phosphor layer. From viewpoints such as the prevention of deliquescence of the scintillator in the scintillator layer described later, it is preferable that the entire surface of the phosphor layer opposite to the support side be covered with a continuous protective layer, and it is more preferable that the entire surface of the scintillator layer and a portion of the reflective layer of the scintillator panel be covered with a continuous protective layer.

Here, the "entire surface of the phosphor (scintillator) layer" refers to all the regions of the columnar phosphor crystal scintillator layer including the surface opposite to the surface in contact with the substrate as well as the lateral sides (in other words, all the surfaces which are not in contact with the substrate). Further, the "portion of the reflective layer" refers to all the regions of the reflective layer which are not in contact with the scintillator layer or the support and are exposed to the atmosphere (in other words, the surface and the lateral sides of the reflective layer free from the scintillator layer). The term "continuous protective layer" means that the protective layer covers the region completely without any exposure or whatsoever.

The protective layer may be formed of a single material, a mixed material, or a plurality of films or the like including different materials.

As mentioned above, the main purpose of the protective layer in the invention is to protect the scintillator layer. In detail, cesium iodide (CsI) as an example of the phosphors is highly hygroscopic and deliquesces when left in the air by absorbing vapor in the air. To prevent this, the protective layer is disposed in the scintillator panel.

The protective layer also functions to block substances (such as halogen ions) released from the phosphor in the scintillator panel and to prevent the corrosion of a light-receiving element placed in contact with the scintillator layer.

In a configuration in which the columnar phosphor crystal scintillator layer of the scintillator panel and a light-receiving element are coupled together through a medium such as an adhesive or an optical oil, the protective layer also serves as an anti-penetration layer preventing the penetration of the adhesive or the optical oil between the columnar phosphor crystals.

As will be described below, the protective layer may be directly formed on the scintillator layer by a CVD method or a coating method, or may be provided by stacking a preliminarily prepared polymer film (or protective film) onto the scintillator layer.

When the protective layer is directly formed on the scintillator layer by a CVD method or a coating method, preferred materials for forming the protective layer include polyolefin resins, polyacetal resins, epoxy resins, polyimide resins, silicone resins and polyparaxylylene resins. The polyparaxylylene resins may be applied by a CVD method, and the other materials may be applied by a coating method. Examples of the polyparaxylylene resins include polyparaxylylene, polymonochloroparaxylylene, polydichloroparaxylylene, polytetrachloroparaxylylene, polyfluoroparaxylylene, polydimethylparaxylylene and polydiethylparaxylylene.

From the viewpoints of appropriate protection of the scintillator layer as well as the strength and the flexibility of the scintillator panel, the thickness of the protective layer is preferably 0.1 µm to 2000 µm.

In the case where the protective layer is a film including a polyparaxylylene resin, the film thickness is preferably 2 µm to 15 µm from the viewpoints of the sharpness of radiographic images and the moisture proofness of the protective layer. In the case where the protective layer is bonded to a light-receiving element, the thickness of the adhesive layer is preferably not less than 5 µm, more preferably not less than 10 µm in order to ensure adhesion, and the total thickness of the protective layer and the adhesive layer is preferably not more than 20 µm. When the total thickness of the polyparaxylylene layer and the adhesive layer is not more than 20 µm, the protective layer and a light-receiving element may be bonded while the scattering of light in the gap between the planar light-receiving element and the scintillator panel is suppressed and thus a decrease in sharpness can be advantageously prevented.

Examples of the polymer films which may be disposed on the scintillator layer include polyester films, polymethacrylate films, nitrocellulose films, cellulose acetate films, polypropylene films, polyethylene terephthalate films and polyethylene naphthalate films. These polymer films are easily available in the market. In terms of transparency and strength, these polymer films may be suitably used as the protective layers in the inventive scintillator panels.

The polymer film may be preferably applied onto the scintillator layer (onto all the surfaces of the scintillator layer which are not in contact with other surfaces such as the reflective layer and are exposed to the atmosphere, or further onto the exposed portion of the reflective layer) by a method in which the polymer film is bonded to the scintillator surface through the adhesive layer, or a method in which the polymer films larger than the scintillator panel are arranged to vertically interpose the scintillator panel therebetween, and the regions of the upper and lower polymer films outside of the periphery of the scintillator panel are bonded together by fusion or with an adhesive in a vacuum environment. The thickness of the polymer film is preferably 12 µm to 120 µm, and more preferably 20 µm to 80 µm from viewpoints such as the protection and moisture proofness for the scintillator layer, the sharpness of the obtainable radiographic images, and the workability during the production of scintillator panels.

In another embodiment, a hot melt resin layer may be formed on the phosphor layer so as to serve as a protective layer. In this case, the hot melt resin also functions to bond the surface of the scintillator layer of the scintillator panel to the surface of a light-receiving element, in addition to the function as a protective layer.

Herein, the term "hot melt resin" refers to an adhesive resin which is free from water or solvents and is solid at room temperature (usually about 25° C.) and which includes a nonvolatile thermoplastic material. The hot melt resins become molten when the resin temperature is raised to or above the melting onset temperature by heating or the like, and become solid when the resin temperature falls to or below the solidification temperature. Further, the hot melt resins exhibit tackiness in the thermally molten state and have no tackiness (become non-tacky) in the solid state when the resin temperature is decreased to or below the solidification temperature (for example, to normal temperature).

Suitable hot melt resins are those based on polyolefin resins, polyester resins or polyamide resins, but are not limited thereto. Of these, polyolefin resins are more preferable in view of light transmission properties.

From viewpoints such as continuous use characteristics and the prevention of adhesive separation in planar light-receiving elements such as thin film transistors (TFTs), the melting onset temperature of the hot melt resins is preferably 60° C. to 150° C. The melting onset temperature of the hot melt resins may be adjusted by the addition of plasticizers. The thickness of the hot melt resin layer is preferably not more than 20 μm.

Preferably, the entirety of the top and lateral sides of the scintillator layer as well as the peripheral surface of the reflective layer in the substrate is covered with polyparaxylylene. According to this configuration, high moisture proofness is obtained.

The haze of the protective layer is preferably 3% to 40%, and more preferably 3% to 10% in view of factors such as the sharpness and uniformity in the obtainable radiographic images, as well as the production stability and workability in the production of scintillator panels. (The haze is a value measured with NDH5000W manufactured by NIPPON DENSHOKU INDUSTRIES CO., LTD.) Materials having a haze in the above range may be easily selected from such polymer films in the market, or may be fabricated in accordance with appropriate manufacturing methods.

The optical transmittance of the protective layer is preferably not less than 70% with respect to 550 nm light in view of factors such as the photoelectric conversion efficiency of the scintillator panels and the emission wavelengths of the phosphors (scintillators). Because materials (such as films) having an optical transmittance of 99% or more are difficult to obtain in the industry, however, a practical preferred range of the optical transmittance is from 99% to 70%.

The moisture permeability of the protective layer measured at 40° C. and 90% RH in accordance with JIS Z 0208 is preferably not more than 50 g/m$^2$·day, and more preferably not more than 10 g/m$^2$·day from viewpoints such as the protection of the scintillator layer and the prevention of deliquescence. Because films having a moisture permeability of 0.01 g/m$^2$·day or less are difficult to obtain in the industry, however, a practical preferred range of the moisture permeability is from 0.01 g/m$^2$·day to 50 g/m$^2$·day, and more preferably from 0.1 g/m$^2$·day to 10 g/m$^2$·day.

2-3. Support Plates

When it is desired that the scintillator panel of the invention do not exhibit flexibility in accordance with the purpose of use or the like, the scintillator panel may be held on a support plate having higher rigidity than the deposition substrate.

Here, the term "rigidity" refers to the degree of resistance to dimensional changes (deformation) when materials are subjected to a bending or torsional force. Higher (greater) rigidity permits a smaller deformation by such a force, and lower (smaller) rigidity causes a larger deformation. In terms of the selection of materials, the rigidity may be increased by using materials having a high elastic modulus.

In order to make sure that the scintillator panel will not exhibit flexibility, the elastic modulus of the support plate on which the scintillator panel is held is preferably not less than 10000 N/mm$^2$ as measured by the same method as the elastic modulus of the support. Any materials such as metals, glasses, carbons and composite materials may be suitably used for the support plates without limitation.

From the viewpoint of transmission of radiations such as X-rays, the thickness of the support plate is preferably adjusted such that the X-ray transmittance will be 80% or more when the scintillator panel is illuminated with X-rays at a tube voltage of 80 kV. In detail, the thickness is preferably about 0.3 mm to 2.0 mm for amorphous carbon plates, and about 0.3 mm to 1.0 mm for glass plates.

According to the scintillator panels of the invention, as discussed above, the columnar phosphor crystals constituting the scintillator layer are uniform and are free from crystal defects which can cause problems such as irregular collapse of the crystals during cutting. Consequently, the obtainable radiographic images are substantially free from image defects or similar defects ascribed to such problems as crystal defects. Thus, the scintillator panels of the invention can give radiographic images having excellent sharpness and excellent uniformity of sharpness, and also exhibit excellent cuttability. Because the inventive scintillator panels can substantially eliminate the occurrence of image defects or the like in the obtainable radiographic images due to crystal defects, flat panel detectors including the inventive scintillator panels can provide radiographic images with uniform quality in the light-receiving planes. Further, the scintillator panels of the invention are excellent in cuttability and do not suffer problems such as cracks even when subjected to a cutting operation. Furthermore, the inventive scintillator panels may be manufactured in a specific desired size without the need for fabricating individual deposition substrates with the specific size separately, and may be manufactured in such a manner that the scintillator panels are manufactured with a larger size than the desired size and are thereafter cut into individual scintillator panels having the desired size. Thus, it becomes possible to manufacture scintillator panels having uniform quality within the lot or between the lots.

3. Deposition Substrate Production Methods 3-1. Procedures in Deposition Substrate Production Methods Next, methods for producing the deposition substrates of the invention will be described.

The deposition substrates of the invention may be produced by adopting an appropriate known method in accordance with the purpose. Here, a typical example will be described with reference to FIG. 7.

FIG. 7 is a schematic view illustrating a typical example of the methods for producing the deposition substrates of the invention.

In the typical example of the deposition substrate production methods, a deposition substrate production apparatus 109 schematically illustrated in FIG. 7 is used. The deposition substrate production method involving the production apparatus 109 preferably includes a workpiece (support) feed step 29, an application step 39, drying steps 49 and 79, a heat treatment step 59, and a recovery step 69.

In the feed step 29, a feeder (not shown) is used.

In the feed step 29, a roll 202 of a support 201 wound around a core is dispensed by the feeder and the support is fed to the subsequent application step 39.

In the application step 39, an applicator 304 is used which includes a backup roll 301, an application head 302, and a vacuum chamber 303 disposed upstream the application head 302.

In the application step 39, the support 201 continuously fed by the feeder in the feed step 29 is held by the backup roll 301, and the application head 302 applies a reflective coating liquid to the support 201, the reflective coating liquid including light-scattering particles, a binder resin, additives and a solvent. The reflective coating liquid is applied to the support 201 in such a manner that the vacuum chamber 303 disposed upstream the application head 302 generates a vacuum to stabilize the bead (a pool of the coating liquid) formed during the application between the support 201 and the coating liquid supplied from the application head 302.

The vacuum chamber 303 is configured such that the degree of vacuum can be adjusted. The vacuum chamber 303 is connected to a vacuum blower (not shown), which evacuates the inside of the vacuum chamber. The vacuum chamber 303 is airtight, is located adjacent to the backup roll 301 with a small gap, and is evacuated to an appropriate degree of vacuum to suction the upstream of the bead (on the feeder side relative to the application head), thus allowing the coating liquid to form a stable bead.

The flow rate of the coating liquid ejected from the application head 302 is adjusted as required via a pump (not shown).

Although extrusion coating is illustrated above as an example of the application methods, any of other known application methods may also be used, with examples including gravure coating, roll coating, spin coating, reverse coating, bar coating, screen coating, blade coating, air knife coating and dipping.

In the drying step 49, a dryer 401 is used.

In the drying step 49, the reflective coating film layer formed by the application of the reflective coating liquid onto the support 201 in the application step 39 is dried by the dryer 401. The drying step 49 is usually performed such that the surface temperature of the reflective coating film layer is raised to 80 to 200° C. In the drying step 49, the reflective coating film layer is dried with a drying gas. The drying gas is introduced through a drying gas inlet 402 and is discharged through an outlet 403. The dryer 401 is configured such that the temperature and the flow rate of the drying air including the drying gas can be determined appropriately.

The drying step 79 has the same configuration as in the drying step 49, and thus detailed description thereof will be omitted. The drying step 79, in combination with the drying step 49, allows for the adjustment of the speed of drying of the reflective coating film layer.

In the heat treatment step 59, the support 201 having the reflective coating film layer is heat treated with a heat treatment apparatus 501 to remove volatile components in the reflective coating film layer. The heat treatment is usually performed such that the surface temperature of the reflective coating film layer reaches 150° C. to 250° C. In the heat treatment step, the reflective coating film layer is heat treated with a heat treatment gas. The heat treatment gas is introduced through an inlet 502 and is discharged through an outlet 503. The heat treatment apparatus 501 is configured such that the temperature and the flow rate of the heat treatment gas can be determined appropriately.

Although not illustrated in FIG. 7, the heat treatment step 59 may be followed by a cooling step in which the support having the reflective layer (the deposition substrate) is cooled.

In the recovery step 69, the support 201 on which the reflective coating film layer has been formed is wound with a winding machine (not shown). The reference sign 601 in FIG. 7 indicates a recovered roll of the support wound on a core.

In the above steps, the support 201 having the coating film is conveyed on conveyor rolls a to d.

For example, the first deposition substrate of the invention (in which the light-scattering particles are buried in the binder resin) may be produced by, although not particularly limited to, any of the following methods. In one method, for example, the time required for the drying of the coating film is extended by adjusting conditions such as the type of the solvent in the reflective coating liquid, the drying temperature for the reflective coating liquid, and the convey speed (the application speed) of the support coated with the coating liquid so as to allow the light-scattering particles to be sedimented in the coating film. In another method, the support on which the reflective layer has been formed is wound into a roll in the recovery step 69, and the wound support 601 is again set as a support 201 in the feed step 29 and is subjected to the steps in which a resin coating liquid (including a binder resin and additives as required) free from light-scattering particles is applied onto the reflective layer, dried and heat treated to form a resin layer free from light-scattering particles (a layer including the binder resin and additives as required). Where necessary, the obtained deposition substrate may be heat treated to increase the adhesion of the interface between the two layers in the reflective layer.

For example, the second deposition substrate of the invention (in which the light-scattering particles present in the specific region of the reflective layer have an area average particle diameter of not more than 0.5 μm) may be produced by, although not particularly limited to, any of the following methods. In one method, for example, the time required for the drying of the coating film is extended by adjusting conditions such as the type of the solvent in the reflective coating liquid, the drying temperature for the reflective coating liquid, and the convey speed (the application speed) of the support coated with the coating liquid so as to allow particles having a larger average particle diameter (heavier particles) in the coating film to be selectively sedimented toward the support. In another method, the area average particle diameter of all the light-scattering particles used is preliminarily adjusted to not more than 0.5 μm. In a further method, the support on which the reflective layer has been formed (the light-scattering particles may have any average particle diameter at this stage) is wound into a roll in the recovery step 69, and the wound support 601 is again set as a support 201 in the feed step 29 and is subjected to the steps in which light-scattering particles having an area average particle diameter of not more than 0.5 μm and a binder resin are applied to form a binder resin layer.

For example, the third deposition substrate of the invention (in which the surface of the reflective layer opposite to the surface in contact with the support has a specific arithmetic average roughness) may be produced by, although not particularly limited to, any of the following methods. In one method, for example, a mixed solvent is used as the solvent in the reflective coating liquid and the types of the solvents forming the mixed solvent are adjusted such that the surface roughness (arithmetic average roughness) of the surface of the reflective layer opposite to the surface in contact with the support will be the specific value after drying. In another method, the surface may be planarized by adjusting the gas velocity in the drying step or by applying an external force to the surface of the dried reflective layer through a treatment such as calendering.

In the case where the third deposition substrate of the invention is produced by a method in which the gas velocity is adjusted, the gas velocity is particularly preferably not more than 3 m/sec. When the planarization by external force is adopted, the surface is preferably smoothed by such a treatment as calendering. In the calendering treatment, the calender temperature is preferably set to a temperature higher than the glass transition temperature (Tg) of at least one of the binder resin(s) used.

When layers other than those described above are applied or provided on the first to third deposition substrates, such layers may be provided in accordance with the method for forming the resin layer free from light-scattering particles in the first deposition substrate.

In the methods for producing the deposition substrates of the invention, the surface temperature of the reflective coating film layer is raised to 80° C. to 200° C. in the drying steps 49 and 79, and is elevated to 150° C. to 250° C. in the heat treatment step 59. In this manner, the volatile content in the deposition substrate (the support having the reflective layer) may be reduced to less than 5%. One of the characteristics of the inventive deposition substrate production methods is that the heat treatment step is carried out after the drying steps to remove volatile components.

The surface temperature of the reflective coating film layer formed on the support 201 may be measured with a known non-contact thermometer such as a laser thermometer or an infrared thermometer.

The temperature and the flow rate of the gases in the drying steps 49 and 79 and in the heat treatment step 59 are not particularly limited and may be appropriately adjusted based on the results of measurement with a non-contact thermometer such that the surface temperature of the coating film will fall in the above prescribed temperature range.

In the drying steps 49 and 79, it is preferable that the gas flow at a relative speed of 1 to 3 m/sec with respect to the support 201 in a direction parallel to the plane of the support, as measured at a position 5 mm above the surface of the coating film on the support 201. When the relative speed of the gas to the support 201 at a position 5 mm above the coating film surface is in the above range, the reflective layer can be dried without suffering problems such as roughening of the dried surface.

In the heat treatment step 59, the surface of the coating film may be heated with the heat treatment gas in combination with an infrared heater. Such a combined heat treatment advantageously increases the effects of the heat treatment on the reflective layer on the support.

By the inventive deposition substrate production methods described above, deposition substrates having small amounts of residual solvents and small amounts of gases adsorbed to the light-scattering particles may be obtained.

3-2. Materials Used in Deposition Substrate Production Methods

Hereinbelow, the supports and the reflective coating liquids used in the methods for producing the inventive deposition substrates will be described.

3-2-1. Supports

The materials of the supports used in the inventive deposition substrates are as described hereinabove. In particular, polymer films are preferable from viewpoints such as that the production apparatus 109 illustrated in FIG. 7 may be suitably used, that the polymer films can be easily processed from roll to roll, and that the flexibility of the polymer films allows the scintillator panels to be intimately coupled to planar light-receiving elements. In order to prevent the deformation of the supports by heat applied during the deposition of phosphors onto the polymer films, the glass transition temperature of the polymer films is preferably not less than 100° C. In detail, suitable such polymer films are polyimide films.

Where necessary, additional layers such as the aforementioned light-shielding layers and light-absorbing pigment layers may be appropriately disposed on the support. Further, the support itself may have light-shielding properties or reflecting properties as required.

The light-shielding layer may be provided on the support by any methods without limitation such as deposition, sputtering and metal foil lamination. From the viewpoint of the adhesion of the light-shielding layer with the support, sputtering is most preferable.

For example, the light-absorbing pigment layer may be provided on the support by applying a light-absorbing pigment coating liquid including a pigment and a solvent onto the support and drying the coating.

3-2-2. Reflective Coating Liquids

The reflective coating liquid may be prepared by dispersing or dissolving in a solvent individual components or a mixture of the components including light-scattering particles, a binder resin and optional additives such as coloring materials including pigments, UV absorbers, fluorescent whitening agents, antistatic agents and dispersants. The procedures such as the sequence of the addition of the components are not particularly limited as long as the objects of the invention are not deteriorated.

The light-scattering particles, the binder resin and the additives may be dispersed or dissolved by any known dispersion or dissolution methods. Exemplary dispersing machines which may be suitably used include sand mills, Attritor, Pearl Mill, Super Mill, ball mills, impellers, dispersers, KD mills, colloid mills, Dynatron mills, three roll mills and pressure kneaders.

The details of the light-scattering particles, the binder resin, the coloring materials such as pigments, the UV absorbers and the fluorescent whitening agents are as described hereinabove.

The dispersants are added in order to help the light-scattering particles be dispersed in the binder resin. Various dispersants may be used in accordance with the binder resin and the light-scattering particles used. Examples thereof include polyhydric alcohols, amines, silicones, phthalic acid, stearic acid, caproic acid, and lipophilic surfactants. The dispersants may remain in or may be removed from the reflective layer that has been formed.

The dispersants are preferably used in amounts of 0.1 to 20 parts by weight, and more preferably 1 to 5 parts by weight with respect to 100 parts by weight of the binder resin.

The light-scattering particles, the binder resin and the additives may be dispersed or dissolved in any solvents without limitation. Examples of the solvents include lower alcohols (preferably alcohols having 1 to 6 carbon atoms) such as methanol, ethanol, n-propanol and n-butanol; chlorinated hydrocarbons such as methylene chloride and ethylene chloride; ketones such as acetone, methyl ethyl ketone and methyl isobutyl ketone; aromatic compounds such as toluene, benzene, cyclohexane, cyclohexanone and xylene; esters of lower fatty acids with lower alcohols such as methyl acetate, ethyl acetate and butyl acetate; ethers such as dioxane, ethylene glycol monoethyl ether and ethylene glycol monomethyl ether; and mixtures of these solvents.

The light-scattering particles, the binder resin and the additives may exhibit insufficient dispersibility in a single solvent. Further, the use of a single solvent may cause difficulties in controlling the solvent evaporation rate in the drying steps and tends to result in a reflective layer having a roughened surface. To prevent such problems, it is preferable to use a mixed solvent including a plurality of compatible solvents having different amounts of evaporation heat. In particular, a mixed solvent including toluene, methyl ethyl ketone (MEK) and cyclohexanone is preferable.

When voids are introduced into the reflective layer in the inventive deposition substrate, the methods for forming such voids are not particularly limited and may be selected appropriately in accordance with the purpose. Examples of the methods include (I) void particles are added to the reflective layer, and (II) a reflective coating liquid containing bubbles or a foaming agent is applied onto the support to form a reflective layer having a porous structure. In particular, the method (I) of adding void particles is preferable from the viewpoint of the easiness in the formation of the coating film. From the viewpoint of the void volume, the method (II) utilizing bubbles is preferable.

In the method (II) utilizing bubbles, the foaming agents may be appropriately selected from known foaming agents in accordance with the purpose. Suitable examples include carbon dioxide-generating compounds, nitrogen gas-generating compounds, oxygen gas-generating compounds, and microcapsule foaming agents. Examples of the carbon dioxide-generating compounds include bicarbonates such as sodium hydrogencarbonate. Examples of the nitrogen gas-generating compounds include a mixture of $NaNO_2$ and $NH_4Cl$; azo compounds such as azobisisobutylonitrile and diazoaminobenzene; and diazonium salts such as p-diazodimethylaniline chloride zinc chloride, morpholinobenzenediazonium chloride zinc chloride, morpholinobenzenediazonium chloride fluoroborate, p-diazoethylaniline chloride zinc chloride, 4-(p-methylbenzoylamino)-2,5-diethoxybenzenediazonium zinc chloride, and sodium 1,2-diazonaphthol-5-sulfonate. Examples of the oxygen gas-generating compounds include peroxides. Examples of the microcapsule foaming agents include microcapsule particulate foaming agents encapsulating low-boiling substances vaporized at low temperatures (which may be liquid or solid at normal temperature). Specific examples of the microcapsule foaming agents include microcapsules 10 to 20 μm in diameter in which low-boiling vaporizable substances such as propane, butane, neopentane, neohexane, isopentane and isobutylene are encapsulated in microcapsules made of polystyrene, polyvinyl chloride, polyvinylidene chloride, polyvinyl acetate, polyacrylate ester, polyacrylonitrile, polybutadiene or any copolymer of these polymers. The content of the foaming agents in the binder resin cannot be specified because it is variable in accordance with the types of the foaming agents. However, it is generally preferable that the content be 1 to 50 wt %.

In the method (I) in which void particles are added, the void volume in the reflective layer may be adjusted by adding the void particles to, for example, the reflective coating liquid in such an amount that the void particles will represent 5 to 30 vol % relative to the entirety of the reflective layer taken as 100 vol %. In the method (II) utilizing bubbles, the void volume in the reflective layer may be adjusted by adding the foaming agent to the reflective coating liquid in an amount of 1 to 50 wt % relative to the binder resin taken as 100 wt %. Voids may be introduced into the reflective layer by any of these methods.

From the viewpoint of X-ray transmission properties of the deposition substrates, part of or all the voids are preferably formed of hollow particles and bubbles.

The reflectance of the deposition substrates may be adjusted by, for example, the following methods.

(1) On the support, a light-shielding layer is provided which is formed of stainless steel or a material including one, or two or more elements of aluminum, silver, platinum, palladium, gold, copper, iron, nickel, chromium and cobalt.

(2) A light-absorbing pigment layer is provided on the support.

(3) A light-shielding layer, a pigment layer, or a film including at least one of these layers is stacked onto the support.

(4) Light-absorbing properties are imparted to the support.

(5) Light-reflecting properties are imparted to the support.

(6) The reflective layer is colored.

(7) The content of light-scattering particles in the reflective layer is controlled.

(8) At least two of the methods (1) to (7) are combined.

By combining the methods (1) to (7), the reflectance, the absorptance and the transmittance of the inventive deposition substrates with respect to the light (produced in the scintillator layer) may be adjusted freely. Further, the sensitivity of radiographic image detectors may be enhanced by increasing the reflectance of the deposition substrates. By increasing the absorptance of the deposition substrates, radiographic image detectors that include scintillator panels obtained by forming scintillator layers on the inventive deposition substrates may provide radiographic images with improved sharpness. When a metallic light-shielding layer is provided as the aforementioned light-shielding layer and the obtained deposition substrate is used in a scintillator panel, advantages are obtained in that because the deposition substrate has a lowered optical transmittance, it becomes possible to prevent the entry of external light or electromagnetic waves through the surface of the support opposite to the surface in contact with the reflective layer as well as to prevent the leakage of the light produced in the scintillator layer to the outside of the scintillator panel. In particular, the use of a highly reflective metal such as aluminum or silver as the aforementioned light-shielding layer is advantageous in that the reflectance of the reflective layer including the light-scattering particles and the binder resin can be further increased.

A light-shielding layer including the aforementioned metal material may be formed on surfaces such as the support by any methods without limitation such as deposition, sputtering and metal foil lamination. From the viewpoint of adhesion, sputtering is most preferable.

The reflective layer itself may be colored with a coloring material by any methods without limitation. From viewpoints such as simplicity, a colored reflective layer is more preferably formed on the support by adding the aforementioned coloring material to the reflective coating liquid and applying the resultant reflective coating liquid to the support.

Preferred pigments which may be added to the reflective coating liquid include titanium black that is a titanium-containing black pigment. Examples of the titanium blacks suitably used in the invention include Titanium Black S type, M type and M-C type manufactured by Mitsubishi Materials Corporation. A light-absorbing pigment layer may be provided on the support or a film to be stacked on the support in a similar manner as above. That is, a light-absorbing pigment layer may be formed easily by dispersing or dissolving the aforementioned coloring material and other components such as a binder resin in a solvent, and applying the resultant coating liquid onto the support or the film followed by drying.

At the start of the deposition for the formation of the scintillator layer on the inventive deposition substrate, the volatile content in the reflective layer is preferably less than 7.5%, more preferably less than 5%, still more preferably less than 2.5%, and particularly preferably less than 1% relative to the total mass of the reflective layer. This volatile content ensures that the abnormal growth of columnar phosphor crystals can be prevented.

Herein, the volatile content is defined by the following equation.

Volatile content(mass %)=[(M−N)/N]×100

M is the total mass of the reflective layer before heat treatment, and N is the total mass of the reflective layer after being heat treated at 200° C. for 3 minutes.

When the volatile content is in the aforementioned range, the release of gas by volatilization from the reflective layer is reduced during the process in which columnar phosphor crystals are grown by deposition under high temperature and high vacuum conditions. Thus, it becomes possible to suppress the abnormal growth of columnar phosphor crystals in portions from which the volatile components have flown out. Consequently, deteriorations in the sharpness and the uniformity of sharpness in the obtainable radiographic images can be prevented.

When the volatile content in the reflective layer of the deposition substrate is outside the aforementioned range, the deposition substrate may be subjected to a volatile component removal step to reduce the volatile content in the reflective layer to the above range.

The volatile component removal step is a step in which the volatile components in the reflective layer of the deposition substrate are removed in vacuum and/or at a high temperature. In the step, any known methods may be used as long as the volatile components can be removed. Due to easy operations, a more preferred method is performed in such a manner that the inventive deposition substrate is set to a substrate holder of a deposition apparatus, thereafter the substrate holder is heated to 100° C. or above and at the same time the deposition apparatus is evacuated to a vacuum of 100 Pa or less, and the reflective layer of the deposition substrate is heat treated for several minutes to several hours.

The volatile components are mainly residual solvents in the reflective layer formed by the application and drying of the reflective coating liquid, and also gases that have been adsorbed to the white pigment used as a raw material. In particular, gases such as vapor ($H_2O$) and carbon dioxide ($CO_2$) are easily adsorbed to the white pigment even in a low humidity environment. Thus, the volatile component removal step is more preferably performed immediately before the scintillator layer is formed by deposition.

3-3. Deposition Substrate Cutting Methods

The inventive deposition substrate, after being cut as required to the size of a substrate holder of a deposition apparatus, is set to the substrate holder and is subjected to deposition to forma scintillator layer on the reflective layer. The deposition substrate may be cut by any known cutting methods without limitation. From viewpoints such as workability and cutting accuracy, a cutting method using a decorative cutting machine, a punching machine or the like is preferable.

Because such a cutting method can perform cutting of the inventive deposition substrates while avoiding defects, if any, present in the deposition substrates, the deposition substrate production method utilizing the deposition substrate cutting method achieves excellent productivity.

4. Scintillator Panel Manufacturing Methods

The scintillator panels of the invention may be manufactured by any methods without limitation as long as the objects of the invention are not deteriorated. Preferably, the scintillator panels are manufactured by a deposition method which utilizes a deposition apparatus having a deposition source and a support rotating mechanism in a vacuum container and which includes a step in which the deposition substrate is set to the support rotating mechanism such that the support side of the deposition substrate is in contact with the mounting surface of the support rotating mechanism, and a phosphor raw material is deposited onto the scintillator layer formation scheduled surface of the deposition substrate while rotating the deposition substrate having the support.

A typical example of the methods for manufacturing the inventive scintillator panels will be described with reference to FIGS. 1 to 3. FIG. 1 is a schematic sectional view illustrating a configuration of a scintillator panel 10 as an example of the inventive scintillator panels. FIG. 2 is an enlarged sectional view of the scintillator panel 10 in FIG. 1. FIG. 3 is a schematic view illustrating a configuration of a deposition apparatus 81 as an example of the deposition apparatuses.

The scintillator panels of the invention may be preferably manufactured by a method utilizing the deposition apparatus 81 described in detail below. Hereinafter, a method for manufacturing radiographic scintillator panels 10 using the deposition apparatus 81 will be described.

4-1. Deposition Apparatuses

As illustrated in FIG. 3, the deposition apparatus 81 has a box-shaped vacuum container 82. Near the bottom of the inside of the vacuum container 82, deposition sources 88a and 88b for vacuum deposition are arranged opposite to each other on the circumference of a circle about the central line perpendicular to a deposition substrate 84. The deposition sources 88a and 88b are members into which a deposition material is packed. Electrodes are connected to the deposition sources 88a and 88b. In this case, the gap between the deposition substrate 84 and the deposition sources 88a and 88b is preferably 100 to 1500 mm, and more preferably 200 to 1000 mm. The gap between the central line perpendicular to the deposition substrate 84 and the deposition sources 88a and 88b is preferably 100 to 1500 mm, and more preferably 200 to 1000 mm. The deposition apparatus 81 is configured such that the deposition sources 88a and 88b generate heat by Joule heating by the passage of an electric current through the deposition sources 88a and 88b via the electrodes. In the manufacturing of the radiographic scintillator panels 10, a mixture including cesium iodide and an activator compound is packed in the deposition sources 88a and 88b, and the mixture is heated and vaporized by the passage of an electric current through the deposition sources 88a and 88b. Three or more (for example, eight, sixteen or twenty four) deposition sources 88 may be provided. The deposition sources 88 may be arranged at regular or irregular intervals. The radius of the circle about the central line perpendicular to the deposition substrate 84 may be selected freely.

In order to heat the phosphor contained therein by resistance heating, the deposition sources 88a and 88b may be comprised of alumina crucibles wrapped with a heater, or may be comprised of boats or heaters including high-melting metals or similar materials. The phosphor heating method is not limited to resistance heating and may be any of other methods such as electron beam heating and high frequency induced heating. However, a resistance heating method by the direct application of an electric current, or an indirect resistance heating method by indirect heating of the crucibles with a surrounding heater is preferable because of advantages such as that the method has a relatively simple configuration and is easy to operate, inexpensive and applicable to a very wide range of substances.

In the inside of the vacuum container 82, a holder 85 configured to hold the deposition substrate 84 is arranged above the deposition sources 88a and 88b. The holder 85 is provided with a heater (not shown) and is configured to heat the deposition substrate 84 attached to the holder 85 by the operation of the heater. The deposition apparatus 81 is configured, by performing heating of the deposition substrate 84, to detach or remove substances adsorbed to the surface of the deposition substrate 84, to prevent an impurity layer from occurring between the deposition substrate 84 and a scintillator layer (a phosphor layer) formed on the substrate surface, to increase the adhesion between the deposition substrate 84 and the scintillator layer formed on the substrate surface, and to control the quality of the scintillator layer formed on the surface of the deposition substrate 84.

The holder 85 is configured to hold the deposition substrate 84 such that the scintillator layer formation scheduled surface of the deposition substrate 84 is opposed to the bottom of the vacuum container 82 and in parallel to the bottom of the vacuum container 82. The holder 85 is provided with a rotating mechanism 86 capable of rotating the deposition substrate 84 together with the holder 85 in a horizontal direction. The rotating mechanism 86 is comprised of a rotating shaft 87 which supports the holder 85 and rotates the deposition substrate 84, and a motor (not shown) which is arranged outside the vacuum container 82 and serves as a power supply driving the rotating shaft 87. The deposition apparatus 81 is configured such that driving of the motor causes the rotation of the rotating shaft 87 and consequently the rotation of the holder 85 while keeping the holder 85 opposed to the deposition sources 88a and 88b.

Preferably, the holder 85 is fitted with a heater (not shown) for heating the deposition substrate 84. By heating the deposition substrate 84 with the heater, the adhesion of the support of the deposition substrate 84 with respect to the holder 85 can be increased, and the quality of the phosphor layer can be controlled. Such heating also detaches or removes substances which have been adsorbed to the surface of the deposition substrate 84, and prevents an impurity layer from occurring between the surface of the deposition substrate 84 and the phosphor layer. Further, the holder 85 may have a warm or hot medium circulating mechanism (not shown) as a unit for heating the deposition substrate 84. This heating unit is suitable when the temperature of the deposition substrate 84 is maintained at a relatively low temperature such as 50 to 150° C. during the deposition of the phosphor. Furthermore, the holder 85 may have a halogen lamp (not shown) as a unit for heating the deposition substrate 84. This heating element is suited when the temperature of the deposition substrate 84 is maintained at a relatively high temperature such as 150° C. or above during the deposition of the phosphor.

In addition to the above configuration, the deposition apparatus 81 includes a vacuum pump 83 connected to the vacuum container 82. The vacuum pump 83 evacuates the vacuum container 82 and introduces a gas to the inside of the vacuum container 82. The inside of the vacuum container 82 can be maintained in a constant pressure gas atmosphere by the operation of the vacuum pump 83. In order to evacuate the vacuum container 82 to a high vacuum, two or more types of vacuum pumps having different operating pressure ranges may be arranged. Examples of the vacuum pumps include rotary pumps, turbo-molecular pumps, cryogenic pumps, diffusion pumps and mechanical boosters.

The deposition apparatus 81 includes a mechanism configured to introduce a gas into the vacuum container 82 in order to adjust the pressure in the chamber. The gas introduced here is generally an inert gas such as Ne, Ar or Kr. The pressure in the vacuum container 82 may be adjusted by introducing the gas to the desired pressure while evacuating the vacuum container 82 with the vacuum pump 83, or may be adjusted in such a manner that the vacuum container 82 is evacuated to a vacuum lower than the desired pressure, the evacuation is then terminated, and the gas is introduced to the desired pressure. The pressure in the vacuum container 82 may be adjusted by another approach, for example, by providing a pressure control valve between the vacuum container 82 and the vacuum pump 83 so as to adjust the amount of gas evacuated by the pump.

Between the deposition substrate 84 and the deposition sources 88a and 88b, a shutter 89 is provided which can be opened and closed in a horizontal direction to block the space extending from the deposition sources 88a and 88b to the deposition substrate 84. The shutter 89 is closed at the initial stage of deposition, whereby even in the event that impurities, if any, which have become attached to the surface of the phosphor contained in the deposition sources 88a and 88b are vaporized at the initial stage of deposition, the attachment of such impurities to the deposition substrate 84 can be prevented. The shutter 89 is opened after the above purpose is fulfilled, and the phosphor raw material is successfully deposited to form a scintillator layer without allowing any impurities to be deposited to the deposition substrate 84.

4-2. Formation of Scintillator Layers

The deposition substrate 84 having the reflective layer 3 on the support 1 is set to the holder 85, whilst the deposition sources 88a and 88b are arranged near the bottom of the vacuum container 82 on the circumference of a circle about the central line perpendicular to the deposition substrate 84. Next, the same number of containers such as crucibles or boats as the deposition sources (two in this case) are filled with a phosphor raw material such as a powdery mixture including a phosphor matrix compound such as cesium iodide and an activator such as thallium iodide, and the filled containers are packed into the deposition sources 88a and 88b (preparation step). In the case where a scintillator underlayer and a scintillator main layer are sequentially formed on the reflective layer, the phosphor matrix compound such as cesium iodide and the activator such as thallium iodide may be separately packed into the deposition sources. In any of these cases, it is preferable that the gap between the surface of the reflective layer of the deposition substrate 84 and the deposition sources 88a and 88b be set to 100 to 1500 mm and the deposition step described later be performed while keeping the gap in the range that has been set.

Where necessary, preliminary heating may be performed prior to the deposition in order to remove impurities in the packed phosphor matrix and activator. The preliminary heating temperature is desirably not more than the melting point of the materials used. For example, the preliminary heating temperature is preferably 50 to 550° C., and more preferably 100 to 500° C. in the case of CsI, and is preferably 50 to 500° C., and more preferably 100 to 500° C. in the case of TlI.

To prevent the impurities from being deposited to the deposition substrate 84, the preliminary heating is preferably performed with the shutter 89 closed.

After the preparation step, the vacuum pump 83 is activated to evacuate the vacuum container 82 and the inside of the vacuum container 82 is brought to a vacuum atmosphere of 0.5 Pa or less (vacuum atmosphere creating step). Here, the term "vacuum atmosphere" refers to an atmosphere in a pressure of not more than 100 Pa, and the vacuum container 82 is preferably evacuated to a vacuum atmosphere in a pressure of not more than 0.5 Pa. Thereafter, the inert gas such as Ar is introduced into the vacuum container 82, and the inside of the vacuum container 82 is maintained in a vacuum atmosphere at 0.5 Pa or less. Next, the heater of the holder 85 as well as the motor of the rotating mechanism are driven, and thereby the deposition substrate 84 mounted to the holder 85 is rotated and heated while being opposed to the deposition sources 88a and 88b. (The rotational speed (rpm) is variable depending on the size of the apparatus, but is preferably 2 to 15 rpm, and more preferably 4 to 10 rpm.)

Next, the phosphor is deposited. For example, the phosphor such as CsI may be activated by a method in which the phosphor such as CsI and the activator such as a sodium compound, a thallium compound, an indium compound or a europium compound are vaporized simultaneously in the deposition apparatus and are deposited onto the deposition substrate. Particularly, in this method of deposition through the simultaneous vaporization of the phosphor and the activator, the phosphor is preferably CsI from viewpoints such as that the columnar crystal structure provides light guide effects, and the activator compound is preferably an iodide such as sodium iodide (NaI), thallium iodide (TlI) or indium iodide (InI) from viewpoints such as that these iodides do not inhibit the growth of columnar CsI crystals.

Alternatively, the phosphor may be activated by a method in which an activator-free scintillator layer comprised of columnar crystals of the phosphor such as CsI is formed by deposition on the deposition substrate, thereafter the substrate having the activator-free scintillator layer is placed in a closed space such as in a deposition apparatus together with the activator compound such as a sodium compound, a thallium compound, an indium compound or a europium compound, and the activator compound is heated to or above its sublimation temperature to activate the phosphor such as CsI, namely, to activate the scintillator layer. In this method in which the substrate having the scintillator layer is heat treated together with the activator, it is preferable that the substrate placed in the closed space, specifically, the scintillator layer formed of the phosphor such as CsI have been heated to a temperature of 100 to 350° C. The phosphor is preferably CsI from viewpoints such as that the columnar crystal structure provides light guide effects, and the activator compound is, although not particularly limited, preferably one having a low sublimation temperature for easy handling. In an embodiment, a scintillator layer may be formed by deposition of the phosphor activated with a specific compound (for example, thallium iodide (TlI)), and the thus-formed scintillator layer may be placed in a closed space together with an activator compound and subjected to additional activation in accordance with similar procedures. According to such an embodiment, the resultant scintillator layer contains different kinds of activators between the inside and the surface of the columnar crystals in the scintillator layer. In particular, the decay time of the radiation emitted from the scintillator layer may be shortened by using a europium compound as the activator.

When any scintillator underlayer is not formed on the reflective layer, an electric current is passed through the deposition sources 88a and 88b via the electrodes while the deposition substrate 84 is being heated and rotated, and thereby the phosphor raw material such as a mixture including cesium iodide and thallium iodide is vaporized by being heated at about 700° C. to 800° C. for a prescribed time. As a result, a great number of columnar phosphor crystals 2a are gradually grown on the surface of the deposition substrate 84, thus forming a scintillator layer 2 with a desired thickness (deposition step). The thickness of the scintillator layer may be variable in accordance with the purpose, but is preferably 120 to 700 µm.

When a scintillator underlayer is formed on the reflective layer, a crucible containing the phosphor matrix compound (such as CsI without activators (pure)) may be heated to allow the phosphor to be deposited into a scintillator underlayer (a first phosphor layer).

In this process, the temperature of the deposition substrate 84 is preferably 5 to 200° C., more preferably 5 to 100° C., and particularly preferably 15 to 50° C. The thickness of the scintillator underlayer may be variable depending on the crystal diameters or the thickness of the phosphor layers, but is preferably 0.1 to 50 µm. Subsequently, heating of the deposition substrate 84 is initiated to raise the temperature of the deposition substrate 84 to 150 to 250° C., and operations are started to vaporize a phosphor raw material including the remaining portion of the phosphor matrix compound (such as CsI without activators (pure)) and the activator (such as TlI), thus forming a scintillator main layer (a second phosphor layer). During this process, the activator is migrated by heat from the scintillator main layer to the scintillator underlayer, and consequently the relative content of the activator in the scintillator underlayer is adjusted to 0.01 to 1 mol %.

In this process, it is preferable from the viewpoint of productivity that the phosphor matrix compound be deposited at a higher deposition rate than that in the formation of the underlayer. Although variable depending on the thicknesses of the scintillator underlayer and the scintillator main layer, the rate of this deposition is preferably 5 to 100 times higher, and more preferably 10 to 50 times higher than the rate of deposition of the scintillator underlayer. The activator may be vaporized in such a manner that the activator alone is vaporized or that a deposition source including a mixture of CsI and TlI is prepared and heated to a temperature (for example, 500° C.) at which CsI is not vaporized but TlI is vaporized.

Because the deposition substrate 84 heated during the deposition is hot, its temperature needs to be cooled for the substrate to be removed. In the cooling step, the substrate may be cooled to 80° C. at an average cooling rate in the range of 0.5° C. to 10° C./min. This cooling rate advantageously ensures that the cooling can be performed without causing damages to the scintillator layer ascribed to dimensional changes due to the thermal shrinkage of the support by the quenching of the deposition substrate 84. The cooling of the deposition substrate 84 under this condition is particularly effective when, for example, the support in the deposition substrate 84 is a relatively thin film such as a polymer film having a thickness of 50 µm to 500 µm. In order to avoid any discoloration of the scintillator layer, this cooling step is particularly preferably performed in an atmosphere having a vacuum degree of $1 \times 10^{-5}$ Pa to 0.1 Pa. During the cooling step, an inert gas such as Ar or He may be introduced into the vacuum container of the deposition apparatus. Here, the average cooling rate is determined by continuously measuring the time and the temperature from the start of the cooling (the completion of the deposition) to when the temperature is cooled to 80° C., and calculating the cooling rate per 1 minute.

In the deposition method, reactive deposition may be carried out by introducing a gas such as $O_2$ or $H_2$ as required.

Of the aforementioned columnar phosphor crystal formation methods, the manufacturing method preferably includes a step in which a scintillator underlayer having a higher void content than a phosphor main layer is formed on the surface of the substrate, and a step in which the scintillator main layer is formed by a gas-phase deposition method on the surface of the scintillator underlayer. This configuration is preferable in order to satisfy the aforementioned requirement regarding the plane index.

The scintillator panels of the invention may be manufactured in the manner described above.

The formation of the scintillator layer on the reflective layer under the aforementioned deposition conditions is advantageous in that the scintillator layer is formed by the growth of columnar phosphor crystals at the interface thereof with the reflective layer.

According to the scintillator panel manufacturing method using the deposition apparatus 81, the arrangement of a plurality of deposition sources 88a and 88b allows the vapors from the deposition sources 88a and 88b to be corrected or put in order at their confluence with the result that the crystallinity of the phosphor deposited on the surface of the deposition substrate 84 becomes uniform. Increasing the number of deposition sources increases the number of confluences at which correction occurs, thus resulting in uniform crystallinity of the phosphor over a wider range. By the arrangement of the deposition sources 88a and 88b on the circumference of a circle about the central line perpendicular to the deposition substrate 84, the effects of the correction of vapors providing uniform crystallinity can be obtained isotropically on the surface of the deposition substrate 84.

From the viewpoints described later, the obtained scintillator panels are preferably subjected to post treatments such as the heat treatment and the pressure treatment described below.

4-3. Heat Treatment for Scintillator Layers

Preferably, the scintillator layer formed on the reflective layer of the deposition substrate is placed in a closed space evacuated to 1.0 Pa or below together with one or more activator compounds selected from sodium compounds, thallium compounds, europium compounds and indium compounds, and is subjected to additional activation by heating the activator compound(s) to or above the sublimation temperature to vaporize the compound(s). By this heat treatment, the emission characteristics of the scintillator layer may be adjusted. In this case, the phosphor such as CsI deposited on the deposition substrate is preliminarily heated to a temperature of 250° C. After the additional activation is performed for 1 hour, the deposition substrate having the additionally activated scintillator layer is cooled to 50° C. or below (preferably at an average cooling rate of 0.5° C. to 10° C./min) and the scintillator panel is removed from the closed space in the deposition apparatus. In this manner, scintillator panels having an additionally activated scintillator layer may be obtained. Without the use of any activator compounds, the heat treatment may be performed singly for 1 hour according to the similar procedures. In this case, the activator that has been added during the deposition is activated, and a scintillator panel having high emission intensity may be obtained.

4-4. Pressure Treatment for Scintillator Layers

When a scintillator layer is deposited on the reflective layer of the inventive deposition substrate, the layer formed is usually a collection of columnar phosphor crystals having a uniform height from the interface thereof with the reflective layer. However, problems such as the abnormal growth of phosphor crystals may take place locally and consequently the scintillator layer may have less uniform heights of the columnar phosphor crystals (but the objects of the invention are still achieved). For example, such abnormal growth of columnar phosphor crystals may be caused by factors such as dusts suspended in the deposition apparatus, splash during deposition, and substrate defects such as scratches or attachment of foreign substances. Here, the term "splash" during deposition indicates a phenomenon in which molecules of solid CsI are emitted before vaporization and become attached to the deposition substrate (see, for example, JP-A-2006-335887).

The abnormally grown columnar phosphor crystals can be a factor deteriorating the properties such as sharpness of radiographic images obtained through the scintillator panels (but the objects of the invention are still achieved). Thus, it is desirable to perform the following pressure treatment so that the abnormally grown columnar phosphor crystals will not be left as such. It is needless to mention that even when there are no abnormally grown columnar phosphor crystals, the implementation of the following pressure treatment is more preferable in order to obtain scintillator panels having a more uniform height of columnar crystals from the interface between the crystals and the reflective layer.

The surface of the scintillator layer of the scintillator panel obtained as described above may be subjected to a pressure treatment in which the height of the columnar phosphor crystals in the scintillator layer is aligned. By the treatment, it becomes possible to obtain scintillator panels which have a scintillator layer comprised of a collection of more uniform columnar phosphor crystals.

From the viewpoints described above, the pressure treatment is preferably carried out such that the maximum difference in the heights of the columnar crystals forming the scintillator layer will be about 20 μm.

In detail, the pressure treatment may be performed by a method in which the surface of the scintillator layer of the scintillator panel is pressed with a roller or a flat surface such as glass so as to crush the abnormal protrusions and thereby to align the heights of the columnar phosphor crystals, or may be performed by a method utilizing atmospheric pressure. However, the methods are not particularly limited thereto as long as uniform pressurization is feasible. (The magnitude of the pressure may be adjusted appropriately so that the purpose of this pressure treatment can be achieved.)

Particularly in the case where the heights of the columnar phosphor crystals are aligned by pressing the scintillator surface with a roller or a flat plate such as glass, the treatment is more preferably performed while giving a constant pressure force to the roller or the glass plate due to reasons which will be described later. The roller or the glass plate may be preliminarily heated to 80° C. to 200° C. Further, the treatment may involve a flat glass plate which is given quick oscillations by a device such as an ultrasonic vibrator. In this manner, the heights of the ends of the columnar phosphor crystals may be aligned with a less force.

In a specific example of the methods for aligning the heights of the columnar phosphor crystals, a flat glass plate is placed in close contact with the surface of the scintillator layer of the scintillator panel, then resin films are arranged on and under the assembly and the peripheries of the resin films are fusion bonded together in vacuum to seal the assembly, and thereafter the sealed assembly is recovered in atmospheric pressure and the scintillator panel in that state is heat treated at 50° C. to 200° C. for about 1 to 100 hours. This method is preferable from the viewpoint of the easiness of the pressure treatment.

Through the pressure treatment for the scintillator layer in the above manner, the abnormally grown columnar phosphor crystals are crushed and the heights of the columnar phosphor crystals are controlled. As a result, the scintillator layer achieves a uniform height of the columnar phosphor crystals (the maximum difference in heights being about 20 µm).

The pressure treatment for aligning the heights of the columnar phosphor crystals surpasses other methods such as adjusting the heights by grinding the abnormally grown portions of columnar phosphor crystals, in terms of the facts that high productivity is obtained because there is no generation of wastes such as dusts by the destruction of the columnar phosphor crystals and thus there are no needs for the removal of such wastes, as well as that the quality can be controlled in an advantageous manner.

According to the scintillator panel manufacturing methods of the invention, scintillator panels can be provided in which the phosphor crystals constituting the scintillator layer are uniform and have excellent uniformity in interlayer adherability and which consequently exhibit excellent cuttability and do not suffer problems such as cracks even when subjected to a cutting operation. With such scintillator panels, it becomes possible to provide devices such as flat panel detectors which show uniform image quality in the light-receiving plane and can give radiographic images excellent in sharpness and uniformity of sharpness. Further, because the inventive scintillator panel manufacturing methods can produce scintillator panels that do not suffer problems such as cracks even when subjected to a cutting operation, advantages such as excellent productivity can be obtained by performing the deposition in any scale possible in the deposition apparatus (preferably in the largest scale possible in view of the merits described later) and thereafter cutting the produced scintillator panels into desired sizes as required.

4-5. Scintillator Panel Cutting Methods

In the case where the area of the scintillator panel of the invention is larger than the area of the surface of a photoelectric element such as a light-receiving element, the scintillator panel is cut to a size corresponding to the area of the surface of the light-receiving element as required. Because the cutting takes place after the scintillator layer is formed on the reflective layer of the deposition substrate, there are no complicated procedures involved such as those encountered when a plurality of deposition substrates having different sizes are provided in conformity to the sizes of light-receiving elements in radiographic image detectors and these deposition substrates with respective sizes are separately subjected to the phosphor deposition. That is, the deposition may be performed in any scale possible in the deposition apparatus (preferably in the largest scale possible in view of the merits described below) and thereafter the produced scintillator panels may be cut into desired sizes as required. This provides merits in, for example, productivity, adherence to delivery deadlines, and uniformity in quality between the lots or within the lot.

A typical example of the methods used in a cutting step for cutting the inventive scintillator panels will be described.

FIGS. 8A and 8B illustrate an example of cutting of a scintillator panel 10 by blade dicing. The scintillator panel 10 is arranged on a dicing table 322 of a dicing apparatus 32 such that a scintillator layer 2 comes downward in contact with the dicing table 322. The scintillator panel 10 is cut with a blade 321 inserted from the support 1 side (the side opposite to the scintillator layer 2 side). The blade 321 cuts the scintillator panel 10 by rotating about a rotational shaft 321a. The dicing table 322 has a groove 221 for receiving the blade 321 which has penetrated the scintillator panel 10.

On both sides of the blade 321, support members 324 are provided in order to fix the blade 321. To cool the frictional heat generated during the cutting of the scintillator panel 10 with the blade 321, cooling air is blown to the cut from nozzles 323 disposed on both sides of the blade 321. The temperature of the cooling air is usually not more than 4° C. To prevent condensation, the indoor humidity is usually controlled to not more than 20%. Blade dicing may be suitably adopted when the supports in the scintillator panels are based on carbon, aluminum and glass.

Figure 9:
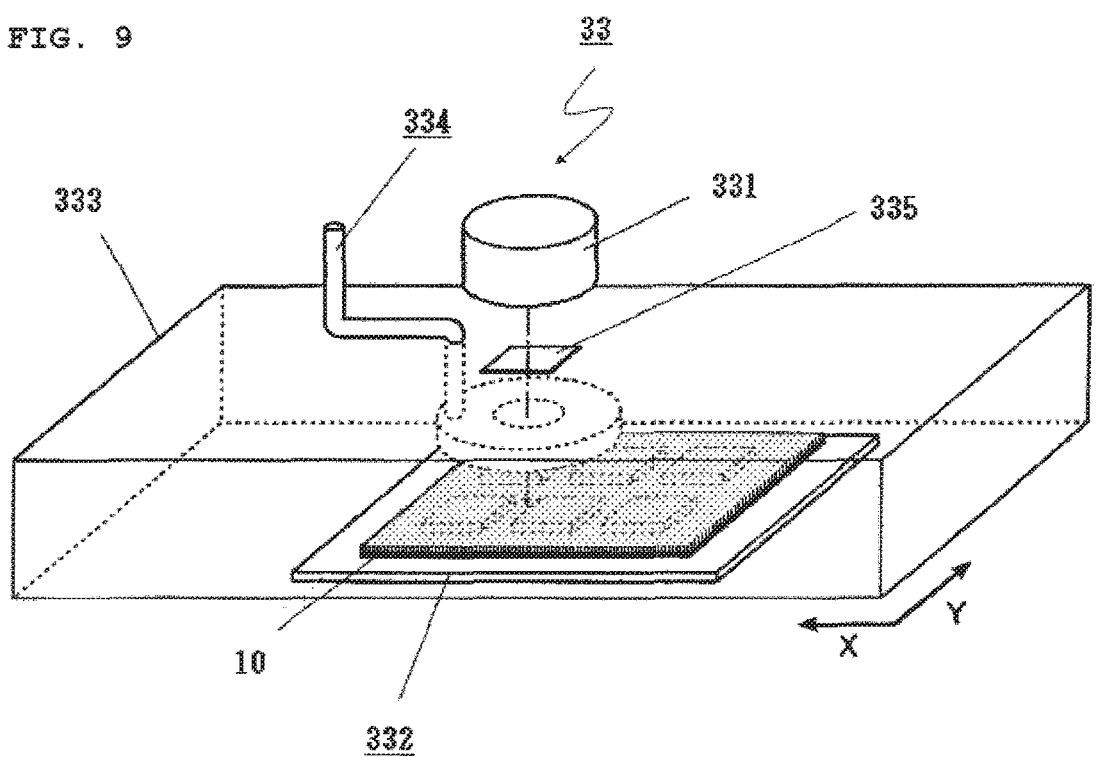
FIG. 9 is a schematic view illustrating a typical example of laser cutting of a scintillator panel with a laser.

FIG. 9 illustrates an example of laser cutting in which a scintillator panel 10 is cut with a laser. A laser cutting apparatus 33 includes a box-shaped purge chamber 333. The purge chamber 333 defines a substantially airtight space protected from the entry of dusts or whatsoever suspended in the outside space. The inside of the purge chamber 333 is preferably a low-humidity environment. The top face of the purge chamber 333 has a translucent window 335 through which a laser beam is transmitted. Further, the purge chamber 333 is fitted with a discharge pipe 334 through which suspended substances such as dusts are introduced to the outside of the purge chamber 333.

The scintillator panel 10 is mounted on a support table 332 of the laser cutting apparatus 33. In this case, the scintillator panel 10 may be mounted with the scintillator layer 12 upside or downside. The scintillator panel 10 is held on the support table 332 by suction. The scintillator panel 10 mounted on the support table 332 is guided by a support table moving unit (not shown) to a position immediately below a laser of a laser beam generator 331. The scintillator panel 10 is cut by the application of a laser beam from the laser beam generator 331. Usual laser beam application conditions are YAG-UV (yttrium aluminum garnet crystal, wavelength 266 nm) pulse laser beam, oscillation frequency 5000 Hz, beam diameter 20 µm, and output 300 mW. When the portion of the scintillator panel 10 illuminated with the laser beam has been cut, the scintillator panel 10 is moved by the support table moving unit (not shown) to slide the laser beam illumination position and another portion of the scintillator panel 10 is cut. These operations are repeated to cut the entire scintillator panel to desired shapes.

The laser beam used in the cutting of the inventive scintillator panels is desirably an ultraviolet laser beam having a wavelength of about 266 nm such as one described above. A laser beam having a wavelength of about 266 nm is capable of machining the workpiece by the heating action as well as dissociating molecular bonds in organic materials such as C—H bonds and C—C bonds. That is, when the support is, for example, a resin film such as a polyimide film, cutting of such a scintillator panel takes place in such a manner that the scintillator layer is cut by the heating action while the support comprised of a resin film such as a polyimide film is cut by the dissociation of molecular bonds. Thus, the resin film as the support is not thermally deformed. Consequently, no stress will be applied to the joint between the substrate and the scintillator layer, and the occurrence of crystal breakage at the cut can be prevented. Laser cutting may be suitably adopted particularly when the support of the scintillator panel is a resin film.

4-6. Methods for Forming Protective Layers in Scintillator Panels

A protective layer may be provided in the scintillator panel. The protective layer may be formed by directly coating the surface of the scintillator layer with a protective coating liquid including the aforementioned materials for the protective layer, or may be provided by stacking or bonding via an adhesive a separately prepared protective layer onto the phosphor layer. Alternatively, the materials for the protective layer may be deposited onto the scintillator panel to form the protective layer.

Compact detectors such as dental detectors used for oral radiography require washing or alcohol disinfection as a whole including the housings due to their use in the mouth. Thus, the housings themselves have high moisture proofness. The protective layers in the scintillator panels are not necessarily required in such cases.

When the protective layer is provided in the inventive scintillator panel, it is preferable to form the protective layer such that the entire surface of the scintillator layer and a portion of the reflective layer are covered with the continuous protective layer. From viewpoints such as easy production and easy processing of the film, it is particularly preferable that polyparaxylylene be deposited by a chemical vapor deposition (CVD) method to form a polyparaxylylene film as the protective layer on the scintillator panel.

Further, a polyparaxylylene film as the protective layer may be advantageously formed on the scintillator panel such that the surface roughness (the arithmetic average roughness (Ra)) will be 0.5 µm to 5.0 µm. In an embodiment in which the scintillator panel is coupled to a light-receiving element, this configuration makes it possible to effectively prevent the optical diffusion of light due to regular reflection and total reflection by the plane of the scintillator and the plane of the light-receiving element.

Figure 10:
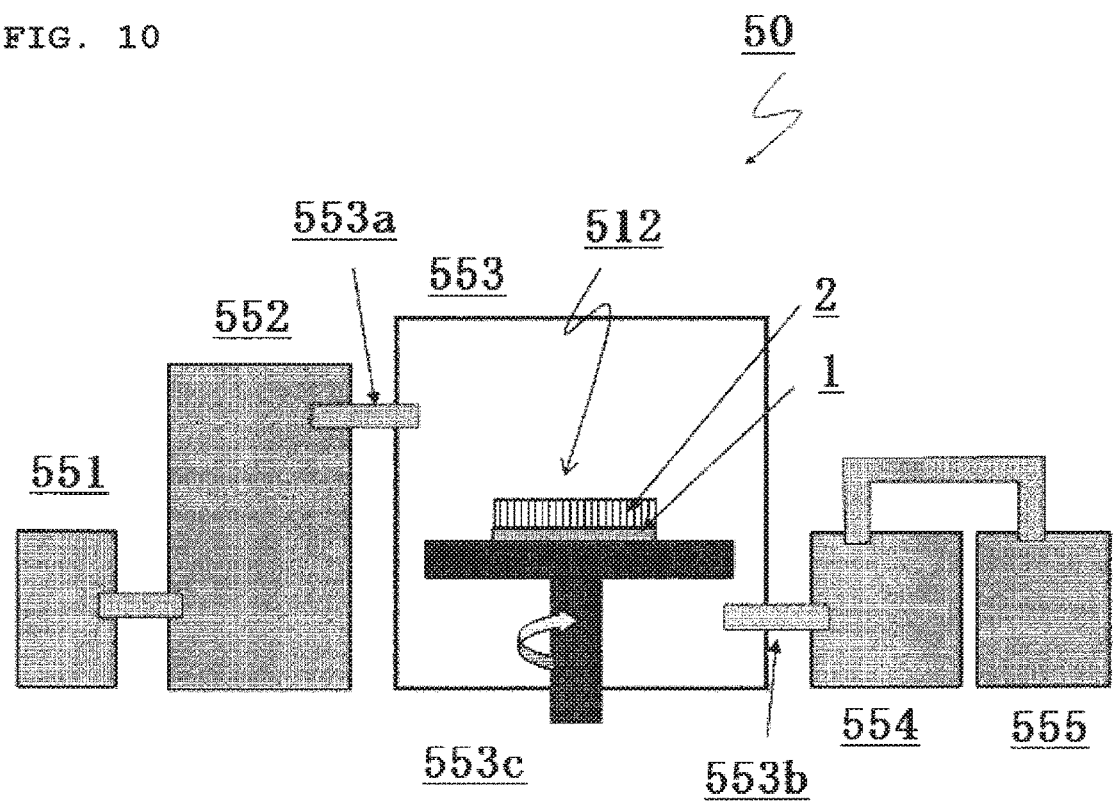
FIG. 10 is a schematic view illustrating a typical example of methods for forming a polyparaxylylene protective film on the surface of a scintillator layer of a scintillator panel.

FIG. 10 illustrates an example of the formation of a polyparaxylylene film as the protective layer on the surface of a phosphor layer 2 of a scintillator panel 10.

A CVD apparatus 50 includes a vaporization chamber 551 into which diparaxylylene that is the raw material for the polyparaxylylene is fed and vaporized, a pyrolysis chamber 552 in which the vaporized diparaxylylene is heated and converted into radicals, a deposition chamber 553 in which the radicals of diparaxylylene are deposited onto the scintillator panel 10 having a scintillator, a cooling chamber 554 for performing deodorization and cooling, and an evacuation system 555 having a vacuum pump. Here, as illustrated in FIG. 10, the deposition chamber 553 has an inlet 553$a$ through which the radicals of diparaxylylene from the pyrolysis chamber 552 are introduced, an outlet 553$b$ through which excess polyparaxylylene is discharged, and a turntable (a deposition table) 553$c$ configured to support the workpiece during the deposition of the polyparaxylylene film.

The scintillator panel 10 is placed on the turntable 553$c$ in the deposition chamber 553 such that the scintillator layer 2 comes upward. Next, the radicals of diparaxylylene generated by vaporization at 175° C. in the vaporization chamber 551 and heating at 690° C. in the pyrolysis chamber 552 are introduced through the inlet 553$a$ into the deposition chamber 553 and are deposited in a thickness of 2 to 15 µm to form a protective layer (a polyparaxylylene film) for the scintillator layer 2.

Here, the inside of the deposition chamber 553 is maintained at a vacuum degree of, for example, 1 to 100 Pa, (preferably 13 Pa). The turntable 553$c$ is rotated at a speed of, for example, 0.5 to 20 rpm (preferably 4 rpm). The excess polyparaxylylene is discharged through the outlet 553$b$ to the cooling chamber 554 for performing deodorization and cooling, and the evacuation system 555 having a vacuum pump.

In another embodiment, a hot melt resin may be used as the material for the protective layer. The hot melt resin may also serve as an adhesive for bonding the scintillator panel to the surface of a planar light-receiving element.

The protective layer of a hot melt resin may be formed by any of the following methods which are described as examples.

A release sheet coated with a releasing agent is provided, and a hot melt resin is applied onto the release sheet. The side coated with the hot melt resin is arranged on the surface of the phosphor layer of the scintillator panel, and the layers are bonded to each other under the application of a pressure with a hot roller. After cooling, the release sheet is removed. In another method, the sheet coated with a hot melt resin is arranged on the surface of the scintillator layer, and resin films are arranged on respective other surfaces (meaning not in contact with each other) of the hot melt resin-coated sheet and the scintillator layer. After the peripheral portions of the resin films are sealed (tightly closed) under a reduced pressure, the assembly is heat treated at atmospheric pressure.

In the latter method, the resin films are suitably sealant films or polyethylene terephthalate (PET) dry laminate films. Such films are more advantageous in that uniform bond pressure by atmospheric pressure is obtained in the entire plane of contact between the hot melt resin and the scintillator layer.

When the protective layer is disposed on the scintillator panel, a layer including an inorganic substance such as SiC, $SiO_2$, SiN, or $Al_2O_3$ may be stacked on the protective layer by a method such as deposition or sputtering.

Since the performances of the scintillator panels are evaluated with respect to radiographic image detectors in which units of the scintillator panels and light-receiving elements described later have been incorporated, the evaluation of such performances will be discussed in detail after the radiographic image detectors are described.

5. Evaluation and Use Application of Deposition Substrates and Scintillator Panels In the deposition substrates of the invention, the surface state of the scintillator layer formation scheduled surface is configured such that a phosphor can be deposited on the surface to form uniform columnar phosphor crystals. Thus, it becomes possible to provide scintillator panels which can give radiographic images such as X-ray images with excellent sharpness and excellent uniformity of sharpness and which exhibit excellent cuttability. With these characteristics, the deposition substrates are suitably used in applications such as scintillator panels (for radiographic detectors).

The scintillator panels of the invention can give radiographic images such as X-ray images with excellent sharpness and excellent uniformity of sharpness, and exhibit excellent cuttability. With these characteristics, for example, the scintillator panels may be suitably coupled to light-receiving elements for use in applications such as radiographic image detectors.

As mentioned above, the deposition substrates of the invention may be used in scintillator panel applications. Further, as will be described below, the scintillator panels of the invention may be coupled to light-receiving elements for use in radiographic image detector applications. Furthermore, the methods for evaluating the deposition substrates, and the methods for evaluating the performances of the scintillator panels with respect to radiographic image detectors will be described below.

5-1. Radiographic Image Detectors 5-1-1. Coupling of Scintillator Panels to Light-Receiving Elements The scintillator panel of the invention may be coupled to a light-receiving element which has a plurality of twodimensionally arranged light-receiving pixels and is configured to convert light produced in the scintillator panel into electricity.

The light-receiving element may have a film which separates the light-receiving element from the scintillator panel. Hereinafter, light-receiving elements having such films and light-receiving elements having no such films will be collectively referred to as "light-receiving elements".

The scintillator panel of the invention is preferably coupled to a planar light-receiving element by a coupling method which can suppress deteriorations in the sharpness of the obtainable radiographic images due to optical diffusion at the plane of contact. A general method for coupling the scintillator panel to the planar light-receiving element is to bring the surface of the scintillator of the scintillator panel and the surface of the light-receiving element into intimate contact together by any pressing technique, or to couple the two components with a jointing agent, for example, an adhesive or an optical oil, which has an intermediate refractive index between the refractive index of the scintillator of the scintillator panel and the refractive index of the light-receiving section of the planar light-receiving element. (In the case where a protective layer is disposed on the scintillator layer of the scintillator panel, the "surface of the scintillator layer" will be appropriately interpreted as the "surface of the protective layer" unless otherwise mentioned. The same applies hereinafter.)

Examples of the adhesives for coupling the surface of the scintillator layer of the scintillator panel to the surface of the light-receiving element include room-temperature vulcanizing (RTV) adhesives such as acrylic adhesives, epoxy adhesives and silicone adhesives. In particular, examples of elastic adhesive resins include rubber adhesives. Exemplary resins of the rubber adhesives include block copolymers such as styrene isoprene styrene, synthetic rubbers such as polybutadiene and polybutylene, and natural rubbers. Suitable examples of commercially available rubber adhesives include one-part RTV rubber KE420 (manufactured by Shin-Etsu Chemical Co., Ltd.). Examples of the silicone adhesives include silicone adhesives of peroxide-crosslinking type or addition condensation type. These adhesives may be used singly or as a mixture. Further, the adhesives may be mixed together with acrylic or rubber-based pressure-sensitive adhesives. Furthermore, adhesives may be used in which silicone components have been introduced as pendant groups to the polymer main chain or side chains of acrylic adhesives.

Optical greases are also usable. Further, other materials such as optical oils which exhibit tackiness with respect to the scintillator panels and the light-receiving elements are also usable. Any known optical oils having tackiness and high transparency may be used. Suitable examples of commercially available optical oils include KF96H (1000000 CS, manufactured by Shin-Etsu Chemical Co., Ltd.) and Cargille Immersion Oil Type 37 (manufactured by Cargille Laboratories, Inc., refractive index fluid). Any known optical greases having tackiness and high transparency may be used. Suitable examples of commercially available optical greases include silicone oil KF96H (1000000 CS, manufactured by Shin-Etsu Chemical Co., Ltd.).

When the scintillator panel is coupled to the light-receiving element via an adhesive, a pressure of 10 to 10,000 g/cm$^2$, more preferably 10 to 500 g/cm$^2$ is usually applied until the adhesive solidifies. By the application of pressure, air bubbles are removed from the adhesive layer. In the case where a hot melt resin has been used as the protective layer, the scintillator panel and the light-receiving element are placed in contact with each other, and, under a pressure of 10 to 500 g/cm$^2$, are heated to a temperature that is 10° C. or more higher than the melting onset temperature of the hot melt resin, then allowed to stand for 1 to 2 hours, and gradually cooled. Quenching tends to result in damages to the light-receiving element due to the stress of shrinkage of the hot melt resin. Preferably, the temperature is cooled to 50° C. or below at a rate of not more than 20° C./hour.

Of the above methods, however, the method of bringing the surfaces into intimate contact together by any pressing technique has an inconvenience in that the light emitted from the scintillator panel inevitably causes unfavorable effects by being scattered in the gap (the air layer) at the joint between the surface of the scintillator layer of the scintillator panel and the surface of the light-receiving element.

Even when the other method is adopted by coupling the scintillator panel and the light-receiving element via a jointing agent having an intermediate refractive index between the scintillator and the light-receiving element, it is difficult to equate all the refractive indexes of the scintillator layer of the scintillator panel, the jointing agent and the light-receiving element, with the result that light is scattered at the interface between the scintillator and the jointing agent and at the interface between the jointing agent and the light-receiving element. The scattering of light emitted from the scintillator panel deteriorates the sharpness of the obtainable radiographic images (but the objects of the invention are still achieved).

These problematic deteriorations in the sharpness of radiographic images may be remedied by subjecting the surface of the scintillator layer of the scintillator panel and the surface of the light-receiving element to an anti-scattering treatment, for example, by providing an anti-optical diffusion layer on the surface of the scintillator layer of the scintillator panel, by providing an antireflection layer on at least one of the surface of the scintillator layer of the scintillator panel and the surface of the light-receiving element, or by controlling the surface roughness (Ra) of either or both of the opposed surfaces, namely, the surface of the scintillator layer and the surface of the light-receiving element to 0.5 μm to 5.0 μm. The implementation of the above known coupling method in combination with any of these anti-scattering treatments makes it possible to effectively prevent the scattering of light and to obtain radiographic images with excellent sharpness and excellent uniformity of sharpness.

Here, the anti-optical diffusion layer is a layer which has an optical transmittance of 60% to 99% with respect to 550 nm wavelength light and is disposed on the scintillator panel to serve also as a protective layer. This layer has a function to attenuate the intensity of light propagating through the protective layer (the anti-optical diffusion layer). While the intensity of the light emitted from the scintillator toward the light-receiving element is not substantially decreased because the optical path of such light in the anti-optical diffusion layer is sufficiently short, the anti-optical diffusion layer effectively removes scattered light traveling a long optical path within the anti-optical diffusion layer at an angle nearly parallel to the surface of the light-receiving element.

The antireflection layer prevents a phenomenon in which the light emitted from the scintillator layer of the scintillator panel is repeatedly reflected and propagated between the surface of the scintillator layer of the scintillator panel and the surface of the light-receiving element, and consequently prevents a false detection of such light by incorrect light-receiving sections (pixels) remote from the correct positions of light. The antireflection layer is a resin layer having a lower refractive index than the scintillator layer when it is disposed on the surface of the scintillator layer, and is a resin layer having a lower refractive index than the light-receiving element when it is disposed on the surface of the light-receiving element. By providing such an antireflection layer on at least one of the surface of the scintillator layer of the scintillator panel and the surface of the light-receiving element, it becomes possible to prevent repeated reflection of the emitted light between the surface of the scintillator layer and the surface of the light-receiving element. More preferably, the antireflection layer is designed such that its optical transmittance with respect to 550 nm wavelength light will be 60% to 99% in order to add effects similar to those obtained with the aforementioned protective layer serving also as the anti-optical diffusion layer.

Further, controlling the surface roughness (arithmetic average roughness (Ra)) of either or both of the opposed surfaces of the scintillator layer and of the light-receiving element to 0.5 μm to 5.0 μm suppresses the occurrence of regular reflection and total reflection by irregularities in the light incidence plane. As a result, it becomes possible to effectively prevent the optical diffusion of the light emitted from the scintillator layer between the surface of the scintillator layer and the surface of the light-receiving element.

In order to obtain combined effects in the prevention of optical diffusion, it is more preferable that the anti-optical diffusion layer and the antireflection layer disposed on the scintillator layer and the light-receiving element be treated such that the arithmetic average roughness of their planes (surfaces) placed in contact with the surface of the scintillator panel or the light-receiving element will be 0.5 μm to 5.0 μm.

Examples of the anti-optical diffusion layers and the antireflection layers include layers containing materials such as polyparaxylylenes, polyurethanes, vinyl chloride copolymers, vinyl chloride vinyl acetate copolymers, vinyl chloride vinylidene chloride copolymers, vinyl chloride acrylonitrile copolymers, butadiene acrylonitrile copolymers, polyamide resins, polyvinyl butyrals, polyester resins, cellulose derivatives (such as nitrocellulose), styrene butadiene copolymers, various synthetic rubber resins, phenolic resins, epoxy resins, urea resins, melamine resins, phenoxy resins, silicone resins, acrylic resins and urea formamide resins. These materials may be used singly, or two or more may be mixed together. The anti-optical diffusion layer and the antireflection layer are preferably polyparaxylylene films formed by, in particular, a chemical vapor deposition (CVD) method from viewpoints such as that such layers may be easily formed on the surface of the scintillator layer of the scintillator panel or the surface of the light-receiving element, and that such layers also have a function as protective layers for the scintillator layer. (In this case, a separate protective layer is not necessarily provided because the polyparaxylylene film serves as a protective layer, an anti-optical diffusion layer and an antireflection layer.)

When the optical transmittance of the anti-optical diffusion layer is adjusted by the addition of a coloring material, a blue coloring material is preferably used from the viewpoint that the blue coloring materials absorb long-wavelength red light which is more prone to scatter than other wavelength light. Examples of the blue coloring materials include ultramarine blue, Prussian blue (iron ferrocyanide), phthalocyanine, anthraquinone, indigoid and carbonium.

5-1-2. Radiographic Image Detectors Including Imaging Panels Incorporating Scintillator Panels Coupled with Light-Receiving Elements Hereinbelow, an example of the applications of the inventive scintillator panels will be described with reference to FIGS. 4 and 5 illustrating a radiographic image detector 100 including a radiographic scintillator panel 10.

In the radiographic image detector 100, the scintillator panel coupled with a light-receiving element is incorporated in an imaging panel.

Figure 4:
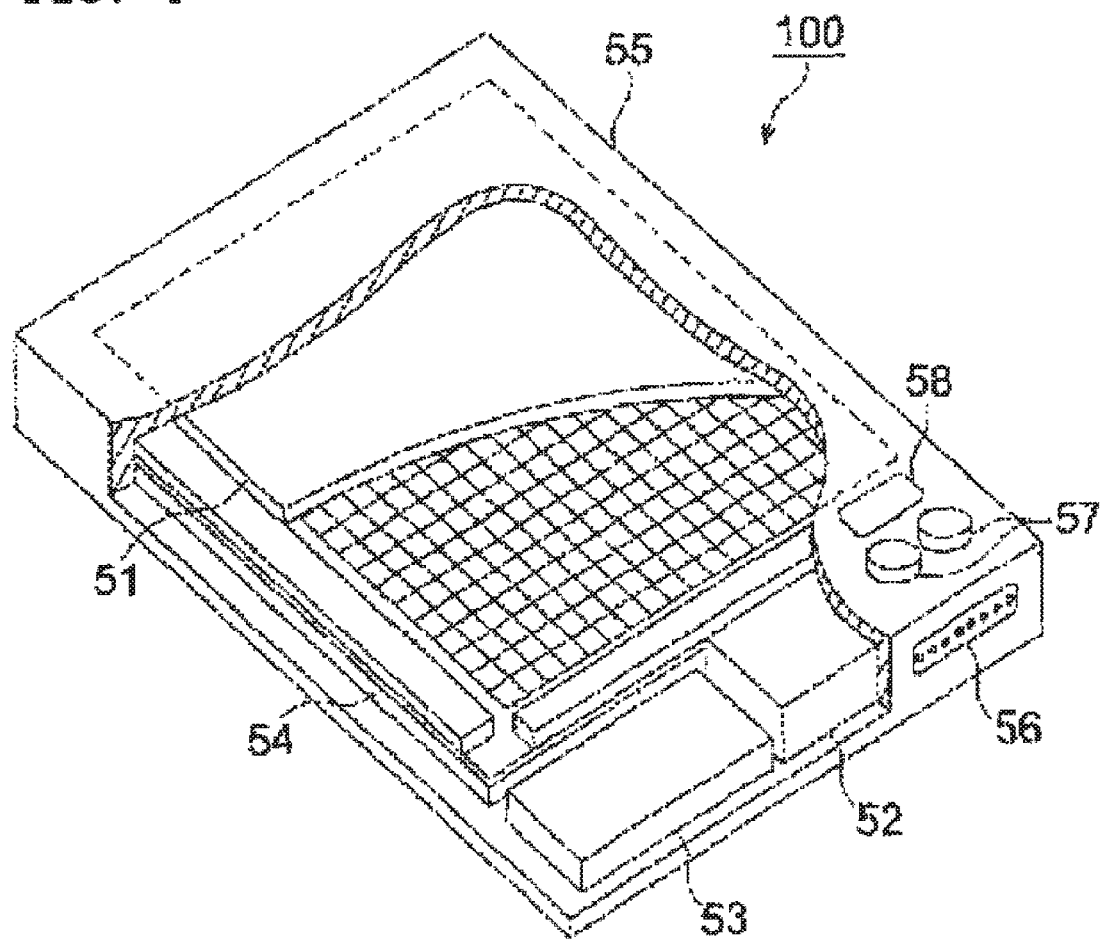
FIG. 4 is a partially broken schematic perspective view illustrating a configuration of a radiographic image detector 100 as an example of radiographic image detectors.
Figure 5:
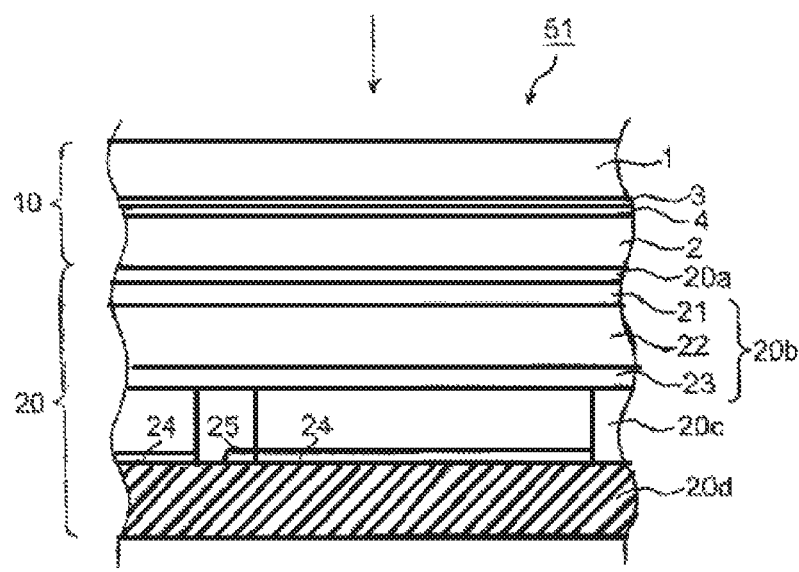
FIG. 5 is an enlarged sectional view of an imaging panel 51 as an example of imaging panels.

FIG. 4 is a partially broken schematic perspective view illustrating a configuration of the radiographic image detector 100. FIG. 5 is an enlarged sectional view of the imaging panel 51.

As illustrated in FIG. 4, the radiographic image detector 100 includes the imaging panel 51, a control section 52 configured to control the operations of the radiographic image detector 100, a memory section 53 configured to store image signals output from the imaging panel 51 in a medium such as a rewritable special memory (for example, a flash memory), and a power supply section 54 that supplies electrical power required to drive the imaging panel 51 and to acquire image signals. These and other components are accommodated in a housing 55. The housing 55 is provided with a communication connector 56 for establishing a communication between the radiographic image detector 100 and an external device as required, an operation section 57 for switching the operations of the radiographic image detector 100, and a display section 58 configured to display messages such as that the radiographic image detector is ready for imaging, or that the memory section 53 has stored a predetermined volume of image signals.

The radiographic image detector 100 including the power supply section 54 and the memory section 53 capable of storing radiographic image signals may be detachably connected via the connector 56 to a computer to which the images will be forwarded. According to this configuration, the radiographic image detector 100 does not have to be located at a fixed position with the computer and may be transported from one place to another.

As illustrated in FIG. 5, the imaging panel 51 includes the radiographic scintillator panel 10, and an output substrate 20 that absorbs electromagnetic waves from the radiographic scintillator panel 10 and outputs the image signals.

In the imaging panel 51, the radiographic scintillator panel 10 is arranged such that the scintillator layer is in contact with the light-receiving element, and is configured to emit electromagnetic waves corresponding to the intensities of the incident radiations.

The output substrate 20 is disposed opposite to the radiation-illuminated side of the radiographic scintillator panel 10, and includes a separator film 20a, the light-receiving element 20b, an image signal output layer 20c, and a base 20d sequentially in the order of increasing distance from the radiographic scintillator panel 10.

The separator film 20a separates the radiographic scintillator panel 10 and the adjacent layers (in the imaging panel 51, the output substrate 20).

The light-receiving element 20b includes a transparent electrode 21, a charge generation layer 22 that generates electric charges by being excited by the electromagnetic waves incident thereon through the transparent electrode 21, and a counter electrode 23 that makes a pair with the transparent electrode 21. These are disposed in the order of the transparent electrode 21, the charge generation layer 22 and the counter electrode 23 as viewed from the separator film 20a side.

The transparent electrode 21 is capable of transmitting electromagnetic waves which are to be photoelectric converted and is made of, for example, a conductive transparent material such as indium tin oxide (ITO), $SnO_2$ or ZnO.

The charge generation layer 22 is disposed in the form of a thin film on the surface of the transparent electrode 21 opposite to the surface in contact with the separator film 20a. The charge generation layer 22 includes photoelectric conversion compounds, namely, organic compounds that undergo charge separation when illuminated with light. The organic compounds which produce charge separation are a conductive compound serving as an electron donor by donating electric charges, and another conductive compound serving as an electron acceptor. When electromagnetic waves such as radiations are incident on the charge generation layer 22, the electron donor is excited to release electrons, and the released electrons are transferred to the electron acceptor. In this manner, charges, namely, hole and electron carriers are generated in the charge generation layer 22.

Examples of the conductive compounds as the electron donors include p-type conductive polymer compounds. Preferred p-type conductive polymer compounds are those compounds having a basic skeleton of polyphenylene vinylene, polythiophene, poly(thiophene vinylene), polyacetylene, polypyrrole, polyfluorene, poly(p-phenylene) or polyaniline.

Examples of the conductive compounds as the electron acceptors include n-type conductive polymer compounds. Preferred n-type conductive polymer compounds are those compounds having a basic skeleton of polypyridine, and particularly preferred compounds are those having a basic skeleton of poly(p-pyridyl vinylene).

The thickness of the charge generation layer 22 is preferably not less than 10 nm (particularly not less than 100 nm) in order to ensure a sufficient amount of optical absorption, and is preferably not more than 1 μm (particularly not more than 300 nm) in order to avoid an excessively high electric resistance.

The counter electrode 23 is disposed on the surface of the charge generation layer 22 opposite to the surface on which the electromagnetic waves (the light emitted from the scintillator layer 2 of the radiographic scintillator panel 10) are incident. For example, the counter electrode 23 may be selected from general metal electrodes such as gold, silver, aluminum and chromium as well as from transparent electrodes similar to the transparent electrode 21. In order to achieve good characteristics, the electrode is preferably formed from a material with a low work function (not more than 4.5 eV) selected from metals, alloys, electrical conductive compounds and mixtures of these substances.

Between the charge generation layer 22 and each of the electrodes (the transparent electrode 21 and the counter electrode 23), a buffer layer may be disposed which serves as a buffer zone preventing the reaction between the charge generation layer 22 and the electrodes. For example, the buffer layers may be formed using such materials as lithium fluoride, and poly(3,4-ethylenedioxythiophene):poly(4-styrene sulfonate) or 2,9-dimethyl-4,7-diphenyl[1,10]phenanthroline.

The image signal output layer 20c stores the charges generated in the light-receiving element 20b, and outputs signals based on the stored charges. This layer is comprised of capacitors 24 that are charge storage elements for storing the charges generated in the light-receiving element 20b with respect to each pixel, and transistors 25 that are image signal output elements outputting the stored charges as signals.

Examples of the transistors 25 include thin film transistors (TFTs). The TFTs may be inorganic semiconductor TFTs utilized in devices such as liquid crystal displays or may be organic semiconductor TFTs. TFTs formed on plastic films are preferable. Examples of the TFTs formed on plastic films include amorphous silicon semiconductor TFTs on plastic films, and TFTs obtained utilizing the fluidic self assembly (FSA) technology developed by Alien Technology Corp., USA, specifically, TFTs on flexible plastic films obtained by arranging fine single crystal silicon CMOS (Nanoblocks) on embossed plastic films. Further, TFTs including organic semiconductors described in literature such as Science, 283, 822 (1999), Appl. Phys. Lett., 771488 (1998), and Nature, 403, 521 (2000) may be utilized.

The transistors 25 used in the invention are preferably TFTs fabricated by the FSA technology or organic semiconductor TFTs, and are particularly preferably organic semiconductor TFTs. The fabrication of organic semiconductor TFTs does not entail large facilities such as vacuum deposition apparatuses in contrast to silicon TFTs, and may be accomplished at low costs by utilizing a printing technology or an inkjet technology. Further, organic semiconductor TFTs allow the processing temperature to be decreased, and thus may be formed on heat-labile plastic substrates.

To the transistor 25 are electrically connected the capacitor 24 for storing the charges generated in the light-receiving element 20b, and a collector electrode (not shown) serving as one of the electrodes of the capacitor 24. The capacitor 24 stores the charges generated in the light-receiving element 20b, and the stored charges are read out by the driving of the transistor 25. That is, the signals of the respective pixels for the radiographic image may be output by the driving of the transistors 25.

The base 20d serves as a support of the imaging panel 51, and may be comprised of a material similar to the support 1.

Next, there will be described the mechanism in which the radiographic image detector 100 detects a radiographic image.

First, the radiographic image detector 100 is illuminated with radiations such as X-rays incident from the radiographic scintillator panel 10 side toward the base 20d side of the imaging panel 51.

The radiations incident on the radiographic image detector 100 are absorbed as radiation energy by the scintillator layer 2 of the radiographic scintillator panel 10 in the radiographic image detector 100. The radiations are then converted into visible light in the scintillator layer 2, and the visible light (electromagnetic waves) corresponding to the intensities of the radiations is emitted from the scintillator layer 2. A portion of the emitted visible light (electromagnetic waves) enters the output substrate 20 and reaches the charge generation layer 22 through the separator film 20a and the transparent electrode 21 of the output substrate 20. The visible light (electromagnetic waves) is absorbed in the charge generation layer 22, and hole-electron pairs (charge separation) are formed in accordance with the intensities of the absorbed visible light (electromagnetic waves).

The holes and the electrons generated in the charge generation layer 22 are transported to the respective electrodes (the transparent electrode 21 and the counter electrode 23) by the action of an internal electric field produced by the application of bias voltage from the power supply section 54, resulting in the passage of photocurrent.

The holes transported to the counter electrode 23 side are stored in the capacitors 24 of the image signal output layer 20c. When the transistors 25 connected to the capacitors 24 are driven, the stored holes are output as image signals, which are then stored in the memory section 53.

Because of the incorporation of the radiographic scintillator panel 10, the radiographic image detector 100 achieves a high photoelectric conversion efficiency and an improved S/N ratio during low-dose imaging of radiographic images, and can eliminate (or reduce) image unevenness and linear noise.

5-3. Methods for Evaluating Performances of Deposition Substrates 5-3-1. Surface Roughness of Reflective Layer in Deposition Substrate The surface roughness of the reflective layer in the deposition substrate is evaluated in accordance with the evaluation method described later in EXAMPLES.

The surface roughness of the reflective layer in the deposition substrate is evaluated based on the arithmetic average roughness (Ra) measured in accordance with JIS (JIS B 0601-2001). The surface roughness (Ra) of the inventive deposition substrate is a value measured with SURFCOM 1400D manufactured by TOKYO SEIMITSU CO., LTD. (cutoff: 0.08 mm, measurement length: 4.0 mm).

5-3-2. Measurement of Volatile Content

The volatile content in the deposition substrate is measured in accordance with the evaluation method described later in EXAMPLES.

The deposition substrate is heat treated at 200° C. for 3 minutes, and the volatile content in the deposition substrate is determined based on the weights before and after the heat treatment.

Herein, the volatile content is defined by the following equation.

Volatile content(mass %)=$[(M-N)/N]\times 100$

M is the mass of the deposition substrate before the heat treatment, and N is the mass of the deposition substrate after the heat treatment at 200° C. for 3 minutes.

5-3-3. Measurement of Reflectance of Reflective Layer in Deposition Substrate

The reflectance of the reflective layer in the deposition substrate is measured in accordance with the evaluation method described later in EXAMPLES.

The reflectance of the reflective layer in the deposition substrate is measured with respect to 550 nm wavelength light with use of spectrocolorimeter SE-2000 (manufactured by NIPPON DENSHOKU INDUSTRIES CO., LTD.) in accordance with JIS Z-8722.

5-4. Methods for Evaluating Performances of Scintillator Panels 5-4-1. Method for Evaluating Cuttability of Scintillator Panel The cuttability of the scintillator panel is evaluated in accordance with the evaluation method described later in EXAMPLES.

The scintillator panel is coupled to a light-receiving element having an effective pixel area larger than the scintillator panel. The unit is then illuminated with X-rays to give a solid image. The solid image is analyzed to determine the number of image defects that have occurred in two continuous pixels at the periphery of the obtained image.

In the invention, the detection of the occurrence of image defects in two continuous pixels is understood to indicate that a crack has occurred in that location during cutting. Here, the term "image defects" means that the signal values of the corresponding pixels are 50% or below of the average signal value of adjacent surrounding pixels.

5-4-2. Method for Evaluating Sharpness of Scintillator Panel

The sharpness of the scintillator panel is evaluated in accordance with the evaluation method described later in EXAMPLES.

With an X-ray illuminator having a tube voltage of 80 kVp, a FPD including the radiographic image detector and a hard disk is illuminated with X-rays through lead slits (slit thickness 2 mm, slit gap 10 μm). The image data detected in the radiographic image detector is recorded on the hard disk. Thereafter, the image data recorded on the hard disk is analyzed with a computer to determine the MTF value (at a spatial frequency of 1 cycle/mm) of the X-ray image recorded on the hard disk, as the indicator of sharpness. A larger value of MTF, which is an abbreviation for modulation transfer function, indicates higher sharpness of the X-ray image.

5-4-3. Method for Evaluating Uniformity of Sharpness of X-Ray Image Obtained Via Scintillator Panel An X-ray image obtained via the scintillator panel is evaluated in accordance with the evaluation method described later in EXAMPLES.

To evaluate the uniformity of sharpness of an X-ray image obtained via the scintillator panel, the MTF (1 cycle/mm) is measured by the aforementioned sharpness evaluation method with respect to at least ten points on the X-ray detection plane of the FPD located at equal intervals, and the MTF distribution (%) is calculated by the following equation based on the average MTF value ($M_{AVG}$), the maximum MTF value ($M_{MAX}$) and the minimum MTF value ($M_{MIN}$) of the obtained MTF values (1 cycle/mm). The lower the MTF distribution (%), the higher the uniformity of sharpness of the X-ray image.

MTF distribution (%)=$(M_{MAX}-M_{MIN})/M_{AVG}\times 100$ 5-4-4. Method for Evaluating Sensitivity (Brightness) of Scintillator Panel The sensitivity (brightness) of the scintillator panel is evaluated in accordance with the evaluation method described later in EXAMPLES.

With an X-ray illuminator having a tube voltage of 80 kVp, the radiographic image detector is illuminated with X-rays. The obtained X-ray image data is analyzed to determine the average signal value of the entirety of the X-ray image, thereby evaluating the sensitivity of the scintillator panel. The average signal value of a radiographic image detector including a scintillator panel No. 1 is taken as 100.

5-4-5. Method for Evaluating X-Ray Durability of Scintillator Panel

The X-ray durability of the scintillator panel is evaluated in accordance with the evaluation method described later in EXAMPLES.

With an X-ray illuminator having a tube voltage of 80 kVp, X-rays are applied from the support side toward the scintillator layer side of the scintillator panel until the radiation dose reaches 1000 R. Next, the sensitivity of the scintillator panel is evaluated, namely, the brightness of the scintillator panel after the treatment is expressed relative to the (initial) brightness of the scintillator panel before the treatment taken as 100.

5-4-6. Method for Evaluating Surface Roughness of Scintillator Panel and Light-Receiving Element The surface roughness of the scintillator panel and a light-receiving element is evaluated in accordance with the evaluation method described later in EXAMPLES.

The surface roughness of the scintillator panel and a light-receiving element is evaluated based on the arithmetic average roughness (Ra) measured in accordance with JIS (JIS B 0601-2001). The arithmetic average roughness (Ra) in the invention is a value measured with SURFCOM 1400D manufactured by TOKYO SEIMITSU CO., LTD.

5-4-7. Measurement of Column Diameters of Columnar Phosphor Crystals in Scintillator Panel To measure the column diameters of the columnar phosphor crystals in the scintillator panel, the columnar phosphor crystals are polished until the height of the columnar phosphor crystals from the plane of contact between the scintillator layer and the reflective layer (the length from the plane of contact toward the scintillator layer) becomes 10 μm, and thereafter the surface of the polished columnar phosphor crystals is micrographed with a scanning electron microscope (SEM). With respect to the micrograph, fifty cross sections of the columnar phosphor crystals are arbitrarily sampled and their column diameters are measured, the results being averaged. The column diameters are calculated as the diameters of circles having the same areas as the cross sectional areas at the above height.

EXAMPLES

The present invention will be described in detail based on examples hereinbelow without limiting the scope of the invention.

Hereinafter, the term "average particle diameter" indicates "area average particle diameter".

1. Fabrication of Deposition Substrates 1-1. First Deposition Substrates

Example 1: Deposition Substrate No. 1

With a 125 μm thick polyimide film (UPILEX-125S manufactured by UBE INDUSTRIES, LTD.) as a support, a deposition substrate No. 1 was fabricated as follows.

10 Parts by mass of rutile-form titanium dioxide with an average particle diameter of 0.6 μm as light-scattering particles, 10 parts by mass of a polyester resin (VYLON 550 manufactured by TOYOBO CO., LTD., Tg: −15° C.) as a binder resin, and 40 parts by mass of cyclohexanone and 40 parts by mass of methyl ethyl ketone (MEK) as solvents were mixed together. The mixture was dispersed with a sand mill to give a first resin coating liquid (a reflective coating liquid 1). The first resin coating liquid was applied onto the polyimide film support 500 mm in width with a comma coater. The first resin coating liquid was then dried at 180° C. for 3 minutes to form a 50 μm thick first resin layer on the support. Further, a second resin coating liquid (a reflective coating liquid 2) having the same composition as the first resin coating liquid except that the second liquid did not contain any titanium dioxide was applied onto the first resin layer. The second resin coating liquid was dried under the similar conditions to form a 5 μm thick second resin layer free from light-scattering particles. In this manner, a deposition substrate No. 1 was fabricated. (See Table 1. Tables 1-1 to 1-4 may be collectively referred to as Table 1. The same applies hereinafter.)

The deposition substrate No. 1 was subjected to various tests described later.

Examples 2 to 7: Deposition Substrates Nos. 2 to 7

Deposition substrates Nos. 2 to 7 were fabricated in the same manner as in EXAMPLE 1, except that the thickness of the second resin layer free from light-scattering particles was changed as described in Table 1.

The deposition substrates Nos. 2 to 7 were subjected to various tests described later.

Example 8: Deposition Substrate No. 8

A deposition substrate No. 8 was fabricated in the same manner as in EXAMPLE 1, except that the light-scattering particles were a mixture of 7 parts by mass of rutile-form titanium dioxide with an average particle diameter of 0.6 μm and 3 parts by mass of barium sulfate with an average particle diameter of 0.3 μm.

The deposition substrate No. 8 was subjected to various tests described later.

Example 9: Deposition Substrate No. 9

A deposition substrate No. 9 was fabricated in the same manner as in EXAMPLE 1, except that the light-scattering particles were a mixture of 9 parts by mass of rutile-form titanium dioxide with an average particle diameter of 0.6 μm and 1 part by mass of hollow particles with an average particle diameter of 0.3 μm (SX866 manufactured by JSR Corporation).

The deposition substrate No. 9 was subjected to various tests described later.

Example 10: Deposition Substrate No. 10

A deposition substrate No. 10 was fabricated in the same manner as in EXAMPLE 1, except that 0.05 parts by mass of a fluorescent whitening agent (OB-01 manufactured by Eastman Chemical Company) was added to the second resin coating liquid.

The deposition substrate No. 10 was subjected to various tests described later.

Example 11: Deposition Substrate No. 11

A deposition substrate No. 11 was fabricated in the same manner as in EXAMPLE 1, except that β-copper phthalocyanine was added to the first resin coating liquid and the second resin coating liquid each in an amount of 0.1 wt % relative to the polyester resin in order to adjust the reflectance.

The deposition substrate No. 11 was subjected to various tests described later.

Example 12: Deposition Substrate No. 12

A deposition substrate No. 12 was fabricated in the same manner as in EXAMPLE 1, except that the drying temperature for the first and second resin coating liquids was changed from 180° C. to 160° C.

The deposition substrate No. 12 was subjected to various tests described later.

Example 13: Deposition Substrate No. 13

A deposition substrate No. 13 was fabricated in the same manner as in EXAMPLE 1, except that the drying temperature for the first and second resin coating liquids was changed from 180° C. to 150° C.

The deposition substrate No. 13 was subjected to various tests described later.

Comparative Example 1: Deposition Substrate No. R1

A deposition substrate No. R1 was fabricated in the same manner as in EXAMPLE 1, except that the second resin layer was not formed on the first resin layer on the support.

The deposition substrate No. R1 was subjected to various tests described later.

1-2. Second Deposition Substrates

Example 14: Deposition Substrate No. 14

A deposition substrate No. 14 was fabricated in the same manner as in EXAMPLE 1, except that the light-scattering particles were rutile-form titanium dioxide with an average particle diameter of 0.28 μm and that the second resin layer was not formed.

The deposition substrate No. 14 was subjected to various tests described later.

Example 15: Deposition Substrate No. 15

A first resin layer was formed in a thickness of 50 μm in the same manner as in EXAMPLE 14. Next, a second resin coating liquid was prepared in the same manner in which the second resin coating liquid was prepared in EXAMPLE 1, except that 10 parts by mass of rutile-form titanium dioxide with an average particle diameter of 0.28 μm was added as the light-scattering particles. The coating liquid was applied onto the surface of the first resin layer, and a second resin layer with a thickness of 0.5 μm was formed on the first resin layer. A deposition substrate No. 15 was thus fabricated.

The deposition substrate No. 15 was subjected to various tests described later.

Example 16: Deposition Substrate No. 16

A deposition substrate No. 16 was fabricated in the same manner as in EXAMPLE 15, except that the light-scattering particles added to the second resin coating liquid were changed to rutile-form titanium dioxide with an average particle diameter of 0.50 μm.

The deposition substrate No. 16 was subjected to various tests described later.

Comparative Example R2: Deposition Substrate No. R2

A deposition substrate No. R2 was fabricated in the same manner as in EXAMPLE 15, except that the light-scattering particles added to the second resin coating liquid were changed to rutile-form titanium dioxide with an average particle diameter of 0.60 μm.

The deposition substrate No. R2 was subjected to various tests described later.

1-3. Third Deposition Substrates

Example 17: Deposition Substrate No. 17

A deposition substrate No. 17' was fabricated in the same manner as in EXAMPLE 15, except that the light-scattering particles added to the second resin coating liquid were changed to rutile-form titanium dioxide with an average particle diameter of 0.60 μm. (In the fabrication of third deposition substrates, the deposition substrates before the following compression treatment are indicated with an apostrophe (').) Next, the deposition substrate No. 17' was subjected to the compression treatment with a calendering machine under the conditions in which the total load was 2000 kg, the upper roll temperature was 40° C., the lower roll temperature was 40° C., and the roll speed was 0.1 m/min. A deposition substrate No. 17 was thus fabricated.

The deposition substrate No. 17 was subjected to various tests described later.

Example 18: Deposition Substrate No. 18

A deposition substrate No. 18 was fabricated in the same manner as in EXAMPLE 17, except that the conditions in the compression treatment were changed to total load 200 kg, upper roll temperature 25° C., lower roll temperature 25° C., and roll speed 1 m/min.

The deposition substrate No. 18 was subjected to various tests described later.

Comparative Example 3: Deposition Substrate No. R3

A deposition substrate No. R3 was fabricated in the same manner as in EXAMPLE 17, except that the conditions in the compression treatment were changed to total load 100 kg, upper roll temperature 25° C., lower roll temperature 25° C., and roll speed 10 m/min.

The deposition substrate No. R3 was subjected to various tests described later.

2. Evaluations of Deposition Substrates

The deposition substrates were evaluated in accordance with the following methods, the results being shown in Table 1.

2-1. Evaluation of Reflective Layers in Deposition Substrates (Surface Roughness of Reflective Layer)

The surface roughness of the reflective layer was evaluated based on the arithmetic average roughness (Ra) measured in accordance with JIS (JIS B 0601-2001). The surface roughness (Ra) of the inventive deposition substrate is a value measured with SURFCOM 1400D manufactured by TOKYO SEIMITSU CO., LTD.

(Measurement of Volatile Content)

The deposition substrate was heat treated at 200° C. for 3 minutes, and the volatile content in the deposition substrate was determined based on the weights before and after the heat treatment.

Herein, the volatile content is defined by the following equation.

$$\text{Volatile content(mass \%)} = [(M-N)/N] \times 100$$

M is the mass of the deposition substrate before the heat treatment, and N is the mass of the deposition substrate after the heat treatment at 200° C. for 3 minutes.

(Measurement of Reflectance of Reflective Layer in Deposition Substrate)

The reflectance of the reflective layer in the deposition substrate was measured with respect to 550 nm wavelength light with use of spectrocolorimeter SE-2000 (manufactured by NIPPON DENSHOKU INDUSTRIES CO., LTD.) in accordance with JIS Z-8722.

2-2. Evaluation of Scintillator Layer Formation Scheduled Surfaces of Deposition Substrates The deposition substrate was cut with a cutter and the cross section was observed with a SEM to determine whether or not the light-scattering particles were exposed on the scintillator layer formation scheduled surface.

Here, the scintillator layer formation scheduled surface was the surface of the second resin layer opposite to the surface in contact with the first resin layer for the deposition substrates Nos. 1 to 13, 15 to 18, R2 and R3, and was the surface of the first resin layer opposite to the surface in contact with the support for the deposition substrates Nos. 14 and R1.

3. Fabrication of Scintillator Panels and Radiographic Image Detectors 3-1. Fabrication of Scintillator Panels Using Deposition Substrates Nos. 1 to 18 and R1 to R3

Examples 19 to 36

The Deposition Substrates Nos. 1 to 18 were Used in the Respective Examples) and COMPARATIVE EXAMPLES 4 to 6 (the Deposition Substrates Nos. R1 to R3 were Used in the Respective Comparative Examples)

(Formation of Scintillator Layer)

The deposition substrates Nos. 1 to 18 and R1 to R3 were each cut to a 50 cm×50 cm size with use of a punching machine. Next, each deposition substrate was set to a substrate holder 85 of a deposition apparatus illustrated in FIG. 3, and a phosphor was deposited onto the scintillator layer formation scheduled surface of the deposition substrate as described below. Thus, scintillator panels Nos. 1' to 18' and R1' to R3' were fabricated in which a scintillator (phosphor) layer was disposed on the deposition substrate. (Here, the scintillator panels before additional activation are indicated with an apostrophe (').)

An activator-free phosphor raw material (pure CsI), and a mixture of a phosphor raw material (CsI) and 0.3 mol % of an activator (TlI) were packed as deposition materials into resistance-heating crucibles, thus preparing deposition sources 88a and 88b, respectively. The deposition substrate was placed onto the rotatable holder 85 such that the surface of the support of the deposition substrate was in contact with the holder 85. The gap between the deposition substrate and the deposition sources 88 was adjusted to 400 mm.

Next, the deposition apparatus was evacuated, and the degree of vacuum in the deposition apparatus was adjusted to 0.5 Pa by introducing Ar gas. While rotating the deposition substrate together with the holder 85 at 10 rpm, the holder 85 was heated to maintain the temperature of the deposition substrate at 150° C. Next, the resistance-heating crucible (the deposition source 88a) was heated to allow the activator-free phosphor raw material (pure CsI) to be deposited in a thickness of 30 μm on the scintillator layer formation scheduled surface of the deposition substrate, thereby forming a scintillator underlayer. Next, the temperature of the deposition substrate was raised to 200° C. At the same time, the degree of vacuum in the deposition apparatus was adjusted to 0.1 Pa, and the resistance-heating crucible containing the phosphor activator mixture (the deposition source 88b) was started to be heated, thereby depositing a scintillator main layer onto the scintillator layer formation scheduled surface of the deposition substrate. The deposition was terminated when the thickness of the scintillator layer became 400 μm. Thus, a scintillator panel was obtained in which the scintillator layer was disposed in the prescribed thickness on the scintillator layer formation scheduled surface of the deposition substrate.

(Heat Treatment for Scintillator Layer)

The scintillator panels 1' to 18' and R1' to R3' were subjected to the following heat treatment to give scintillator panels 1 to 18 and R1 to R3.

The scintillator panel obtained above in which the scintillator layer was disposed on the scintillator layer formation scheduled surface of the reflective layer was placed together with a europium iodide-packed crucible in a closed space evacuated to 0.5 Pa, of the deposition apparatus shown in FIG. 3. A heat treatment was performed at 250° C. for 1 hour. During the treatment, the crucible was heated to 600° C. to induce additional activation of the phosphor (CsI) with europium iodide. In the samples of the scintillator panels after the activation treatment, the decay time of the radiation-induced emission (the time required for the emission intensity to decay to 1% after the interruption of the radiations (relative to the emission intensity during the illumination with the radiations taken as 100%)) was reduced to ⅕ of the decay time of the scintillator panels without the additional activation.

(Cutting into Prescribed Size)

The scintillator panels Nos. 1 to 18 and R1 to R3 in which the scintillator layer was disposed on the scintillator layer formation scheduled surface of the deposition substrate were cut to half the size with a laser cutting apparatus illustrated in FIG. 9.

(Coupling of Scintillator Panels to Light-Receiving Elements)

The half-cut scintillator panels Nos. 1 to 18 and R1 to R3 were each coupled to a surface of the light-receiving element in Aero DR1417 manufactured by KONICA MINOLTA, INC. via a hot melt resin (Kuran Better manufactured by KURABO INDUSTRIES LTD., melting point=67° C., thickness=30 μm), in such a manner that the coupling surfaces of the scintillator panel and the light-receiving element were brought into contact with the hot melt resin, and the resultant stack was heated to 90° C., allowed to stand for 1 hour and gradually cooled (cooling rate: 5° C./min) under the application of 100 g/cm² pressure. Thus, radiographic image detectors Nos. 1 to 18 and R1 to R3 were manufactured. The surface roughness Ra of the surface of the light-receiving element was 0.2 μm.

3-2. Fabrication of Scintillator Panels with Different Levels of Surface Roughness of Scintillator Layers Examples 37 to 40

The Deposition Substrate No. 14 was Used

Radiographic image detectors Nos. 19 to 22 were manufactured in the same manner as in EXAMPLE 32 (in which the deposition substrate No. 14 was used), except that the scintillator layer was formed on the scintillator layer formation scheduled surface of the deposition substrate in such a manner that the vacuum degree was varied during the latter half of deposition (after the thickness of the scintillator layer became about 350 μm) by periodically changing the amount of Ar gas introduced into the deposition apparatus so that the surface roughness Ra of the scintillator layer would be the value described in Table 1.

As a result of this variation in vacuum degree during the latter half of deposition, the surface roughness of the scintillator layer in the scintillator panel of the radiographic image detectors manufactured in EXAMPLES 37 to 39 was in the range of 0.5 μm to 5.0 μm in terms of arithmetic average roughness Ra (anti-scattering treatment).

In the radiographic image detector manufactured in EXAMPLE 40, the surface roughness of the scintillator layer in the scintillator panel was above 5.0 μm.

In the invention, treatments for controlling the surface roughness (Ra) of the surface of the scintillator layer in the scintillator panel and/or the surface of a light-receiving element to 0.5 μm to 5.0 μm are referred to as anti-scattering treatments.

The amounts of variation in vacuum degree were as follows.

Example 37

A variation in vacuum degree of from 0.1 Pa to 0.05 Pa was applied in a cycle of 5 minutes.

Example 38

A variation in vacuum degree of from 0.1 Pa to 0.05 Pa was applied in a cycle of 2 minutes.

Example 39

A variation in vacuum degree of from 0.2 Pa to 0.05 Pa was applied in a cycle of 5 minutes.

Example 40

A variation in vacuum degree of from 0.2 Pa to 0.05 Pa was applied in a cycle of 2 minutes.

3-3. Fabrication of Scintillator Panel Fitted with Anti-Optical Diffusion Layer

Example 41: The Deposition Substrate No. 14 was Used

A radiographic image detector No. 23 was manufactured in the same manner as in EXAMPLE 32 (in which the deposition substrate No. 14 was used), except that the scintillator panel No. 14 in which the scintillator layer was disposed on the deposition substrate was subjected to the compression treatment with a calendering machine under the conditions in which the total load was 100 kg, the upper roll temperature was 25° C., the lower roll temperature was 25° C., and the roll speed was 10 m/min so as to crush the ends of the columnar crystals and to fill the gaps between the columnar crystals, thereafter the compression-treated scintillator panel was set to a CVD apparatus illustrated in FIG. 10 to form an anti-optical diffusion layer (refractive index 1.59, optical transmittance 98%, also serving as a protective layer) comprised of a 5 μm thick, continuous polyparaxylylene film over the entire surface of the scintillator layer and the lateral sides of the reflective layer in the scintillator panel, and subsequently the scintillator panel fitted with the anti-optical diffusion layer was subjected to cutting with the laser cutting apparatus.

3-4. Fabrication of Scintillator Panel Fitted with Anti-Optical Diffusion Layer Having Controlled Surface Roughness Example 42: The Deposition Substrate No. 14 was Used A radiographic image detector No. 24 was manufactured in the same manner as in EXAMPLE 41 (in which the deposition substrate No. 14 was used), except that the surface roughness of the polyparaxylylene anti-optical diffusion layer was changed by depositing the polyparaxylylene into the anti-optical diffusion layer through a screen mask (wire diameter 13 μm, mesh pitch 43 μm) arranged 1.0 mm away from the surface of the scintillator layer.

In the resultant radiographic image detector, the surface roughness of the anti-optical diffusion layer in the scintillator panel was in the range of 0.5 μm to 5.0 μm in terms of Ra (anti-scattering treatment).

4. Evaluations of Scintillator Panels

The scintillator panels were evaluated in accordance with the following methods, the results being shown in Table 1.

(Evaluation of Cuttability of Scintillator Panel)

Poor cuttability of scintillator panels causes the occurrence of image defects in the images obtained by illuminating with X-rays radiographic image detectors including the scintillator panels. The cuttability of the scintillator panel was evaluated based on the occurrence of such image defects in the following manner.

With an X-ray illuminator having a tube voltage of 80 kVp, the radiographic image detector including the scintillator panel was illuminated with X-rays to give a solid image. The solid image was analyzed to determine the number of image defects that had occurred in two or more continuous pixels at the periphery of the obtained image. The smaller the number of such image defects, the higher the cuttability of the scintillator panel.

(Method for Evaluating Sharpness of X-Ray Image Obtained Via Scintillator Panel)

With an X-ray illuminator having a tube voltage of 80 kVp, X-rays were applied to the light-receiving plane of a FPD including the radiographic image detector through lead slits (slit thickness 2 mm, slit gap 10 μm). The image data (slit image) detected in the radiographic image detector was recorded on a hard disk incorporated in the FPD. Thereafter, the image data recorded on the hard disk was analyzed with a computer to determine the MTF value (at a spatial frequency of 1 cycle/mm) of the X-ray image recorded on the hard disk, as the indicator of sharpness. A larger value of MTF, which is an abbreviation for modulation transfer function, indicates higher sharpness of the X-ray image.

(Evaluation of Uniformity of Sharpness of X-Ray Image Obtained Via Scintillator Panel)

To evaluate the uniformity of sharpness of an X-ray image obtained via the scintillator panel, the MTF (1 cycle/mm) was measured by the aforementioned sharpness evaluation method with respect to twenty points on the X-ray detection plane of the FPD located at equal intervals, and the MTF distribution (%) was calculated by the following equation based on the average MTF value ($M_{AVG}$), the maximum MTF value ($M_{MAX}$) and the minimum MTF value ($M_{MIN}$) of the obtained MTF values (1 cycle/mm). The lower the MTF distribution (%), the higher the uniformity of sharpness of the X-ray image.

$$\text{MTF distribution (\%)}=(M_{MAX}-M_{MIN})/M_{AvG}\times 100$$

(Method for Evaluating Sensitivity of Scintillator Panel)

With an X-ray illuminator having a tube voltage of 80 kVp, X-rays were applied to the light-receiving plane of a FPD including the radiographic image detector. The obtained X-ray image data was analyzed to determine the average signal value of the entirety of the X-ray image, thereby evaluating the sensitivity of the scintillator panel. The average signal value of the radiographic image detector including the scintillator panel No. 1 was taken as 100.

(X-Ray Durability of Scintillator Panel)

With an X-ray illuminator having a tube voltage of 80 kVp, X-rays were applied to the light-receiving plane of a FPD including the scintillator panel in a direction extending from the support side toward the scintillator layer side of the scintillator panel in the FPD until the radiation dose reached 1000 R. Next, the brightness of the scintillator panel after the treatment was expressed relative to the (initial) brightness of the scintillator panel before the treatment taken as 100, thereby evaluating the X-ray durability of the scintillator panel.

(Method for Evaluating Surface Roughness of Scintillator Panel and Light-Receiving Element)

The surface roughness of the scintillator panel and the light-receiving element was evaluated based on the arithmetic average roughness (Ra) measured in accordance with JIS (JIS B 0601-2001). The arithmetic average roughness (Ra) was measured with SURFCOM 1400D manufactured by TOKYO SEIMITSU CO., LTD. (cutoff: 0.08 mm, measurement length: 4.0 mm).

(Measurement of Column Diameters of Columnar Phosphor Crystals in Scintillator Panel)

To measure the column diameters of the columnar phosphor crystals in the scintillator panel, the columnar phosphor crystals were polished until the height of the columnar phosphor crystals from the plane of contact between the scintillator layer and the reflective layer (the length from the plane of contact toward the scintillator layer) became 10 μm, and thereafter the surface of the polished columnar phosphor crystals was micrographed with a scanning electron microscope (SEM). With respect to the micrograph, fifty cross sections of the columnar phosphor crystals were arbitrarily sampled and their column diameters were measured, the results being averaged. The column diameters were calculated as the diameters of circles having the same areas as the cross sectional areas at the above height.

TABLE 1-1

Evaluations of deposition substrates

| | | | First resin layer | | | Second resin layer | | | | Evaluations of reflective layer | | | | Deposition substrate |
|---|---|---|---|---|---|---|---|---|---|---|---|---|---|---|
| | | | Light-scattering particles | | | Light-scattering particles | | | Thickness | | | | | |
| | RD*1 No. | SD*2 No. | Materials | Particle diameter*3 | Additives | Materials | Particle diameter*3 | Additives | (μm) | DT*4 (° C.) | Ra*5 (μm) | OF*6 (%) | VC*7 (%) | LSP*11 exposure*12 |
| EX. | 1 | 1 | TiO₂ | 0.6 | — | — | — | — | 5 | 180 | 0.64 | 80.0 | 1.3% | Absent |
| EX. | 2 | 2 | TiO₂ | 0.6 | — | — | — | — | 0.04 | 180 | 0.62 | 80.4 | 1.1% | Absent |
| EX. | 3 | 3 | TiO₂ | 0.6 | — | — | — | — | 0.05 | 180 | 0.66 | 80.4 | 1.2% | Absent |
| EX. | 4 | 4 | TiO₂ | 0.6 | — | — | — | — | 0.1 | 180 | 0.64 | 80.0 | 1.3% | Absent |
| EX. | 5 | 5 | TiO₂ | 0.6 | — | — | — | — | 10 | 180 | 0.63 | 80.0 | 1.3% | Absent |
| EX. | 6 | 6 | TiO₂ | 0.6 | — | — | — | — | 20 | 180 | 0.61 | 79.6 | 1.3% | Absent |
| EX. | 7 | 7 | TiO₂ | 0.6 | — | — | — | — | 30 | 180 | 0.6 | 78.8 | 1.2% | Absent |
| EX. | 8 | 8 | TiO₂ and BaS*8 | TiO₂: 0.6 BaS: 0.3 | — | — | — | — | 5 | 180 | 0.64 | 86.0 | 1.5% | Absent |
| EX. | 9 | 9 | TiO₂ and H particles*9 | TiO₂: 0.6 H: 0.3 | — | — | — | — | 5 | 180 | 0.75 | 84.0 | 3.2% | Absent |
| EX. | 10 | 10 | TiO₂ | 0.6 | — | — | — | FWA*10 | 5 | 180 | 0.64 | 84.8 | 1.4% | Absent |
| EX. | 11 | 11 | TiO₂ | 0.6 | Coloring material | — | — | Coloring material | 5 | 180 | 0.64 | 64.4 | 1.3% | Absent |
| EX. | 12 | 12 | TiO₂ | 0.6 | — | — | — | — | 5 | 160 | 0.64 | 80.0 | 5.0% | Absent |
| EX. | 13 | 13 | TiO₂ | 0.6 | — | — | — | — | 5 | 150 | 0.64 | 80.0 | 7.0% | Absent |
| COMP. EX. | R1 | R1 | TiO₂ | 0.6 | — | — | — | — | — | 180 | 1.02 | 80.0 | 2.1% | Present |

TABLE 1-2

Evaluations of deposition substrates

| | | | First resin layer | | | Second resin layer | | | | Evaluations of reflective layer | | | | Deposition substrate |
|---|---|---|---|---|---|---|---|---|---|---|---|---|---|---|
| | | | Light-scattering particles | | | Light-scattering particles | | | | | | | | |
| | RD*1 No. | SD*2 No. | Materials | Particle diameter*3 | Additives | Materials | Particle diameter*3 | Additives | Thickness (μm) | DT*4 (° C.) | Ra*5 (μm) | OF*6 (%) | VC*7 (%) | LSP*11 exposure*12 |
| EX. | 14 | 14 | TiO₂ | 0.28 | — | — | — | — | — | 180 | 0.8 | 79.2 | 2.0% | Present |
| EX. | 15 | 15 | TiO₂ | 0.28 | — | TiO₂ | 0.28 | — | 0.5 | 180 | 0.81 | 79.2 | 1.3% | Present |
| EX. | 16 | 16 | TiO₂ | 0.28 | — | TiO₂ | 0.5 | — | 0.5 | 180 | 0.91 | 79.2 | 1.3% | Present |
| COMP. EX. | R2 | R2 | TiO₂ | 0.28 | — | TiO₂ | 0.6 | — | 0.5 | 180 | 0.95 | 79.6 | 1.2% | Present |
| EX. | 17 | 17 | TiO₂ | 0.28 | — | TiO₂ | 0.6 | — | 0.5 | 180 | 0.11 | 79.2 | 1.0% | Present |
| EX. | 18 | 18 | TiO₂ | 0.28 | — | TiO₂ | 0.6 | — | 0.5 | 180 | 0.49 | 79.2 | 1.1% | Present |
| COMP. EX. | R3 | R3 | TiO₂ | 0.28 | — | TiO₂ | 0.6 | — | 0.5 | 180 | 0.58 | 79.2 | 1.2% | Present |
| EX. | 19 | 14 | TiO₂ | 0.28 | — | — | — | — | — | 180 | 0.8 | 79.2 | 2.0% | Present |
| EX. | 20 | 14 | TiO₂ | 0.28 | — | — | — | — | — | 180 | 0.8 | 79.2 | 2.0% | Present |
| EX. | 21 | 14 | TiO₂ | 0.28 | — | — | — | — | — | 180 | 0.8 | 79.2 | 2.0% | Present |
| EX. | 22 | 14 | TiO₂ | 0.28 | — | — | — | — | — | 180 | 0.8 | 79.2 | 2.0% | Present |
| EX. | 23 | 14 | TiO₂ | 0.28 | — | — | — | — | — | 180 | 0.8 | 79.2 | 2.0% | Present |
| EX. | 24 | 14 | TiO₂ | 0.28 | — | — | — | — | — | 180 | 0.8 | 79.2 | 2.0% | Present |

TABLE 1-3

Evaluations of scintillator panels

| | | | Scintillator panel | | Evaluations of radiographic image detector | | | | | |
|---|---|---|---|---|---|---|---|---|---|---|
| | RD*[1] No. | SD*[2] No. | Ra*[5] (μm) | Crystal diameter*[13] (μm) | Average MTF*[14] (%) | MTF distribution (%) | Sensitivity | Cuttability*[15] (Number of defects) | X-ray durability*[16] | Remarks |
| EX. | 1 | 1 | 0.3 | 0.3 | 0.62 | 5% | 100 | 0 | 90 | |
| EX. | 2 | 2 | 0.3 | 2.5 | 0.59 | 15% | 101 | 10 | 90 | |
| EX. | 3 | 3 | 0.3 | 0.5 | 0.62 | 8% | 101 | 0 | 90 | |
| EX. | 4 | 4 | 0.3 | 0.4 | 0.61 | 4% | 100 | 0 | 90 | |
| EX. | 5 | 5 | 0.3 | 0.3 | 0.61 | 3% | 100 | 0 | 90 | |
| EX. | 6 | 6 | 0.3 | 0.3 | 0.6 | 3% | 99 | 0 | 90 | |
| EX. | 7 | 7 | 0.3 | 0.3 | 0.58 | 2% | 97 | 0 | 90 | |
| EX. | 8 | 8 | 0.3 | 0.3 | 0.62 | 4% | 115 | 0 | 95 | LSP used |
| EX. | 9 | 9 | 0.3 | 1.0 | 0.61 | 4% | 110 | 3 | 98 | Hollow particles added |
| EX. | 10 | 10 | 0.3 | 0.3 | 0.62 | 5% | 112 | 0 | 95 | Fluorescent whitening agent added |
| EX. | 11 | 11 | 0.3 | 0.3 | 0.75 | 5% | 61 | 0 | 88 | Coloring material added |
| EX. | 12 | 12 | 0.3 | 1.5 | 0.61 | 8% | 100 | 12 | 90 | |
| EX. | 13 | 13 | 0.3 | 4.0 | 0.58 | 10% | 100 | 42 | 90 | |
| COMP. EX. | R1 | R1 | 0.3 | 5.5 | 0.52 | 25% | 100 | 123 | 90 | |

TABLE 1-4

Evaluations of scintillator panels

| | | | Scintillator panel | | Evaluations of radiographic image detector | | | | | |
|---|---|---|---|---|---|---|---|---|---|---|
| | RD*[1] No. | SD*[2] No. | Ra*[5] (μm) | Crystal diameter*[13] (μm) | Average MTF*[14] (%) | MTF distribution (%) | Sensitivity | Cuttability*[15] (Number of defects) | X-ray durability*[16] | Remarks |
| EX. | 14 | 14 | 0.3 | 0.4 | 0.61 | 6% | 98 | 0 | 90 | |
| EX. | 15 | 15 | 0.3 | 0.4 | 0.61 | 6% | 98 | 0 | 90 | |
| EX. | 16 | 16 | 0.3 | 4.2 | 0.6 | 6% | 98 | 9 | 90 | |
| COMP. EX. | R2 | R2 | 0.3 | 5.3 | 0.53 | 27% | 99 | 108 | 90 | |
| EX. | 17 | 17 | 0.3 | 0.2 | 0.62 | 4% | 98 | 0 | 90 | Calendering |
| EX. | 18 | 18 | 0.3 | 4.2 | 0.61 | 5% | 98 | 8 | 90 | Calendering |
| COMP. EX. | R3 | R3 | 0.3 | 5.6 | 0.55 | 20% | 98 | 87 | 90 | Calendering |
| EX. | 19 | 14 | 0.5 | 0.4 | 0.65 | 4% | 98 | 0 | 90 | Anti-scattering treatment |
| EX. | 20 | 14 | 1.0 | 0.4 | 0.71 | 3% | 98 | 0 | 90 | Anti-scattering treatment |
| EX. | 21 | 14 | 5.0 | 0.4 | 0.65 | 4% | 98 | 0 | 90 | Anti-scattering treatment |
| EX. | 22 | 14 | 6.0 | 0.4 | 0.61 | 6% | 98 | 0 | 90 | |
| EX. | 23 | 14 | 0.2 | 0.4 | 0.64 | 6% | 98 | 0 | 90 | Anti-optical diffusion layer |
| EX. | 24 | 14 | 0.7 | 0.4 | 0.73 | 6% | 96 | 0 | 90 | Anti-optical diffusion layer Anti-scattering treatment |

*1: RD=radiographic detector
*2: SD=deposition substrate
*3: Particle diameter of light-scattering particles=area average particle diameter (μm)
*4: DT=drying temperature
*5: Ra=surface roughness of reflective layer
*6: OF=optical reflectance (550 nm wavelength) of deposition substrate
*7: VC=volatile content in deposition substrate
*8: $TiO_2$:BaS=7:3 (parts by weight)
*9: $TiO_2$:H particles=9:1 (parts by weight), H particles=hollow particles
*10: FWA=fluorescent whitening agent
*11: LSP=light-scattering particles
*12: LSP exposure=presence or absence of light-scattering particles exposed on scintillator layer formation scheduled surface of deposition substrate
*13: Crystal diameter=columnar crystal diameter measured at 10 μm from crystal-reflective layer interface
*14: Average MTF with N=20
*15: Cuttability was evaluated based on the number of defects at the image periphery.
*16: X-ray durability was evaluated based on brightness after illumination until 1000 R.

REFERENCE SIGNS LIST

10: SCINTILLATOR PANEL
1: SUPPORT
2: SCINTILLATOR LAYER
2a: COLUMNAR PHOSPHOR CRYSTAL
3: REFLECTIVE LAYER
61: MIDDLE LINE
62: LIGHT-SCATTERING PARTICLE
63: BINDER RESIN
81: DEPOSITION APPARATUS
82: VACUUM CONTAINER
83: VACUUM PUMP
84: DEPOSITION SUBSTRATE
85: HOLDER
86: ROTATING MECHANISM
87: ROTATING SHAFT
88 (88a and 88b): DEPOSITION SOURCES
89: SHUTTER
29: FEED STEP
39: APPLICATION STEP
49: DRYING STEP
59: HEAT TREATMENT STEP
69: RECOVERY STEP
79: DRYING STEP
109: PRODUCTION APPARATUS
201: SUPPORT
202: ROLL OF SUPPORT WOUND AROUND CORE
301: BACKUP ROLL
302: APPLICATION HEAD
303: VACUUM CHAMBER
304: APPLICATOR
401: DRYER
402: INLET
403: OUTLET
801: DRYER
802: INLET
803: OUTLET
501: HEAT TREATMENT APPARATUS
502: HEAT TREATMENT GAS INLET
503: OUTLET
601: RECOVERED ROLL OF SUPPORT WOUND AROUND CORE
a: CONVEYOR ROLL
b: CONVEYOR ROLL
c: CONVEYOR ROLL
d: CONVEYOR ROLL
32: DICING APPARATUS
221: GROOVE
321: BLADE
321a: ROTATIONAL SHAFT
322: DICING TABLE
323: NOZZLE
324: SUPPORT MEMBER
33: LASER CUTTING APPARATUS
331: LASER BEAM GENERATOR
332: SUPPORT TABLE
333: PURGE CHAMBER
334: DISCHARGE PIPE
335: TRANSLUCENT WINDOW
50: DEPOSITION APPARATUS
551: VAPORIZATION CHAMBER
552: PYROLYSIS CHAMBER
553: DEPOSITION CHAMBER
553a: INLET
553b: OUTLET
553c: TURNTABLE (DEPOSITION TABLE)
554: COOLING CHAMBER
555: EVACUATION SYSTEM
512: DEPOSITION OF PROTECTIVE LAYER (POLYPARAXYLYLENE FILM)
100: RADIOGRAPHIC IMAGE DETECTOR
51: IMAGING PANEL
52: CONTROL SECTION
53: MEMORY SECTION
54: POWER SUPPLY SECTION
55: HOUSING
56: CONNECTOR
57: OPERATION SECTION
58: DISPLAY SECTION
20: OUTPUT SUBSTRATE
20a: SEPARATOR FILM
20b: LIGHT-RECEIVING ELEMENT
20c: IMAGE SIGNAL OUTPUT LAYER
20d: BASE
21: TRANSPARENT ELECTRODE
22: CHARGE GENERATION LAYER
23: COUNTER ELECTRODE
24: CAPACITOR
25: TRANSISTOR

What is claimed is:

1. A scintillator panel comprising,
a deposition substrate comprising a support and a reflective layer disposed on the support, and
a scintillator layer formed on the reflective layer by deposition,
wherein the reflective layer includes light-scattering particles and a binder resin,
the light-scattering particles are buried in the binder resin, and
the reflective layer includes a region free from the light-scattering particles extending from the surface of the reflective layer opposite to the surface in contact with the support toward the surface in contact with the support, and a thickness of the region is 0.05 µm to 20 µm.

2. The scintillator panel according to claim 1, further comprising a layer free from light-scattering particles on the surface of the reflective layer opposite to the surface in contact with the support.

3. The scintillator panel according to claim 1, wherein the light-scattering particles include at least one selected from alumina, yttrium oxide, zirconium oxide, titanium dioxide, barium sulfate, silica, zinc oxide, calcium carbonate, glasses and resins.

4. The scintillator panel according to claim 1, wherein the light-scattering particles include at least one type of particles selected from hollow particles having a hollow portion within the particle, and porous particles.

5. The scintillator panel according to claim 1, wherein the light-scattering particles include at least titanium dioxide.

6. The scintillator panel according to claim 1, the scintillator layer including cesium iodide and at least one activator selected from at least thallium compounds, sodium compounds and indium compounds, the scintillator layer having a columnar crystal structure.

7. The scintillator panel according to claim 6, wherein the entire surface of the scintillator layer and a portion of the reflective layer are covered with a continuous protective film.

8. The scintillator panel according to claim 7, wherein the protective film is a protective film formed by a gas-phase method and includes at least one material selected from at least polyparaxylylene, polyurea and silicon dioxide ($SiO_2$).

9. The scintillator panel according to claim 1, wherein the reflective layer has a thickness of 5 to 300 μm.

10. The scintillator panel according to claim 1, wherein the reflective layer has a thickness of 30 to 150 μm.

11. The scintillator panel according to claim 1, wherein the phosphor crystals have an average circular equivalent diameter of not more than 5.0 μm.

12. The scintillator panel according to claim 1, wherein the phosphor crystals have an average circular equivalent diameter of from 0.1 μm to 0.5 μm.

13. The scintillator panel according to claim 1 wherein the scintillator layer is formed directly on the reflective layer by deposition.

* * * * *